United States Patent [19]
Chung

[11] Patent Number: 5,218,697
[45] Date of Patent: Jun. 8, 1993

[54] METHOD AND SYSTEM FOR NETWORKING COMPUTERS HAVING VARYING FILE ARCHITECTURES

[75] Inventor: William H. Chung, Troy, N.Y.

[73] Assignee: Microsoft Corporation, Redmond, Wash.

[21] Appl. No.: 511,358

[22] Filed: Apr. 18, 1990

[51] Int. Cl.⁵ .............................................. G06F 15/16
[52] U.S. Cl. .............................. 395/650; 364/DIG. 1; 364/242.94; 364/282.4
[58] Field of Search ... 364/200 MS File, 900 MS File, 364/DIG. 1

[56] References Cited

U.S. PATENT DOCUMENTS 4,825,354  4/1989  Agrawal et al. .................. 364/200
4,887,204  12/1989 Johnson et al. .................. 364/200

Primary Examiner—Gareth D. Shaw
Assistant Examiner—A. Katbab
Attorney, Agent, or Firm—Seed and Berry

[57] ABSTRACT

An improved, distributed network comprising a central server and at least one foreign server, which provides a method and means for integrating multiple networks with varying file systems is provided. The present invention allows foreign servers to coexist on a single integrated file server while eliminating server-to-server translations, thus improving the performance of the network.

In a preferred embodiment, the central server communicates with central server clients in accordance with a central server network protocol, and converts central server network file service requests from the central server clients into central server file system commands. Foreign servers communicate with foreign server clients in accordance with a foreign server network protocol and convert foreign server network file service requests from foreign server clients into central server file system commands. The foreign servers also inform the central server of file system operations performed on the central server file system by the foreign file servers.

16 Claims, 38 Drawing Sheets

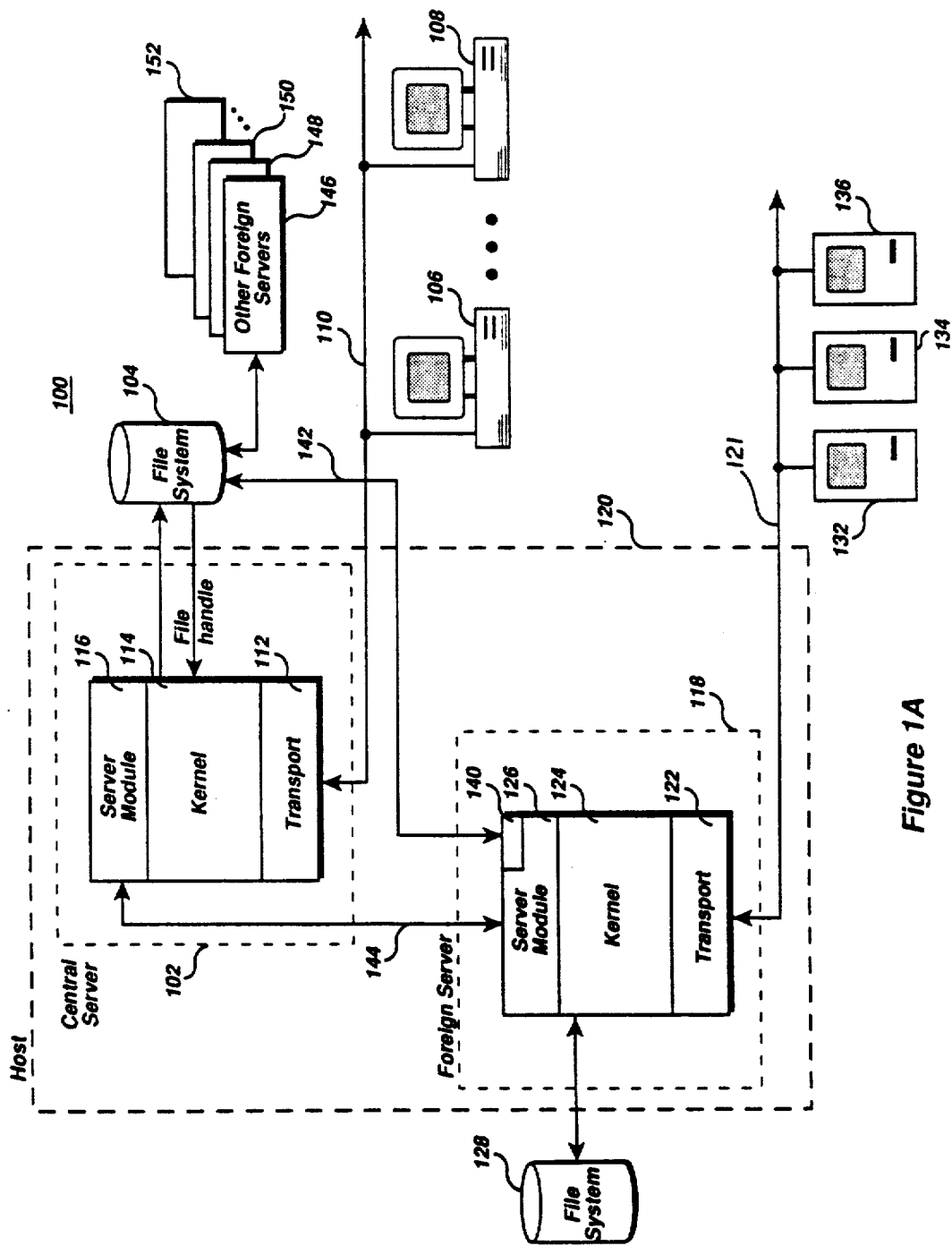

METHOD AND SYSTEM FOR NETWORKING COMPUTERS HAVING VARYING FILE ARCHITECTURES

FIELD OF THE INVENTION

This invention relates to the field of networked computer systems and specifically to a method and means for networking a variety of computer systems, regardless of local operating systems and file structures.

BACKGROUND OF THE INVENTION

Computer networks have been developed to allow files to be shared among a number of remote users or clients. In the past, computer networks were designed to support single computer types with a limited range of file systems. In prior systems, a dedicated file server is required for each type of computer. Recently, several types of computer systems have appeared on the market, each of which have file systems which are not compatible with other systems. As many alternate computer systems now coexist in many office environments, it is highly desirable to provide a method and means for allowing these systems to share files over a computer network.

One approach to networking diverse computer systems is to provide discrete file servers for each type of computer in the system. The discrete file servers may then be coupled through a device which translates the network protocol of one network into the protocol of another network. This approach requires detailed knowledge of the protocols of both networks. In addition, since file requests are routed through two separate file servers, system performance is reduced.

Another approach to networking diverse computer systems is to provide a single file server and a protocol-to-protocol converter for each foreign client in the system. For example, one common network manufactured by Novell, employs a feature referred to as a "Service Protocol Gateway," or SPG, as part of the overall architecture. The SPG translates the file server protocol of a remote user or client system to the file server protocol of the native file server. This approach has a considerable performance degradation since it also requires that the native protocol be processed. In other words, this approach requires placing a gateway between an existing file server and a foreign client or file server. The gateway performs a translation between the file server protocols of the respective systems. Unfortunately, this method often requires modification of the file servers involved, especially if any significant level of integration is to be achieved.

Still another approach to networking computers involves teaching a file server about an alternate file system by adding knowledge about a particular file server protocol to an existing file server. For example, an IBM-PC can be accessed by clients of an Apple Local-Talk network if the IBM-PC is running Apple's network protocol (LocalTalk) and Apple server software (AppleShare). Unfortunately, this method offers no integration of network services. For example, this method allows integration of a foreign client into an existing network but does not allow the foreign client any access to its own user interface or network resources. The foreign client is forced to use the environment of the network it is joining.

The present invention overcomes the above problems by providing a method and means for integration of multiple networks with varying file systems while allowing each client to retain its own native environment in a manner which is totally transparent to users. The present invention also allows many foreign server types to coexist on a single integrated file server while eliminating server-to-server translations, thus improving performance. In addition, the present invention allows a central server to perform network management functions on foreign servers as well as allowing foreign file servers to be added to the system without modifying the central file server.

SUMMARY AND OBJECTS OF THE INVENTION

In summary, the present invention comprises a method and means for networking any type of computer system regardless of the local operating systems and file structures. In other words, the present invention allows multiple client types to access the file system of a central file server. In operation, a foreign file server provides file services to clients which are not recognized by a central file server. The file service requests of clients of a foreign server are directly translated into file service requests in a format recognized by the native file system of the central server without routing the file service requests through the central server. For each file service request, the central server is advised of activities of foreign file servers through a communications mechanism implemented in a series of APIs. The APIs are used to advise the central server of foreign server activities, and are not used to request file services. File services, such as opening and closing files, setinfo and getinfo are performed directly by a file system driver resident in the foreign file server.

Accordingly, it is an object of the present invention to provide a method and means for networking computers having varying file architectures.

It is another object of the present invention to allow multiple file servers to share file resources regardless of the file structures used therewith.

It is another object of the present invention to provide a method and means for providing a networked computer system wherein foreign file servers may be added to the system without modifying the central server.

It is yet another object of the present invention to allow a central server to service multiple client types.

It is still another object of the present invention to improve the speed and performance in a networked computer system having a number of diverse client types and file systems.

It is another object of the present invention to provide a method and system to allow a single file server to support a plurality of logical server types.

BRIEF DESCRIPTION OF THE DRAWINGS

These and other objects may be fully appreciated through the description below and the accompanying drawings in which:

FIG. 1A is a diagram showing the improved distributed processing system of the present invention.

DETAILED DESCRIPTION OF THE INVENTION

Figure 1B:
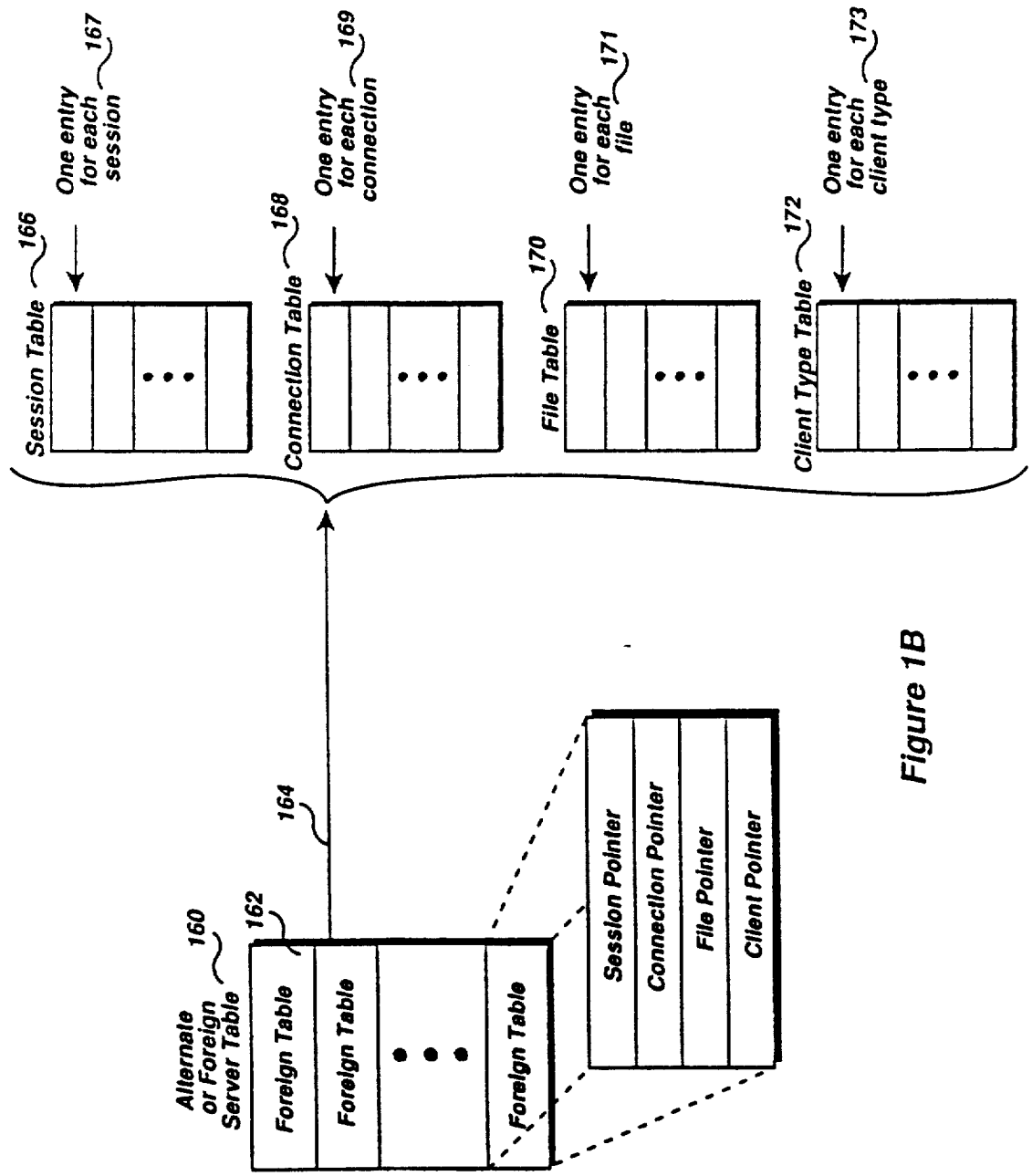
FIG. 1B is a diagram showing the central server table structure used to record activities of foreign file servers.

Referring now to FIG. 1A, a diagram of the improved distributed computer system of the present invention is shown. The present invention is adapted to allow the files resident in a central server to be accessed and modified by not only central file server clients, but by clients of foreign file servers as well. In addition, the present invention provides a method and means for integrating any number of file servers, regardless of the operating system and file structures used with each server. The system 100 comprises a central file server 102, which is coupled to a file system 104. The central file server 102 and file system 104 are adapted to provide file services to a plurality of clients 106, 108. Clients are coupled to the file server 102 through local area network (LAN) communication lines 110. In the preferred practice of the present invention, clients request file services from the central server 102 by sending requests in the form of server message blocks (SMBs) in accordance with the SMB protocol developed by Microsoft, IBM and Intel. Similarly, the central file server 102 responds to file service request SMBs with SMBs which mirror the request SMBs and which may contain the file data requested by a client. The SMB network protocol is described in a document entitled Microsoft Networks/Open Net File Sharing Protocol V 1.9, 1987, available from Microsoft Corporation, One Microsoft Way, Redmond, Wash. While the system 100 is shown with two clients coupled to central file server 102, those skilled in the art will readily appreciate that virtually any number of clients could be coupled to the central file server 102. While the present invention is illustrated as employing a central server which is adapted for use with the SMB protocol, those skilled in the art will appreciate that the principles of the present invention may be used with virtually any network protocol.

In its simplest form, the central server 102 may be thought of as comprising a transport 112, a system kernel 114 and a server module 116. The transport 112 interfaces the network communication lines 110 to the kernel 114 and server module 116. The transport 112 moves data on to or off of network communication lines 110. As in other systems, the kernel 114 is responsible for communicating with the file system 104 and processing file service requests. The server module 116 receives and interprets network file requests and communicates them to kernel 114. The server module 116 also formats and assembles network response messages. For example, in operation, a client may wish to open a file. The client transmits an open file SMB to the central server 102 where it is intercepted by transport 112. The transport 112 routes the open file SMB to server module 116. The server module then unpacks the SMB request and converts it to a conventional operating system file request, such as DosOpen, in the well-known OS/2 operating system. The file system request is then routed to the file system 104 through kernel 114. Once the requested file operation is completed, the kernel 114 routes the requested data (which includes a file handle in the case of a DosOpen) to the server module which packages the requested data in the form of a response SMB. The response SMB is then routed to the requesting client through the transport 112.

The present invention is also adapted to support file service requests from foreign file servers for files which are resident on the central file server 102. While the system 100 is illustrated with a single foreign server 118, the present invention contemplates the use of numerous foreign file servers, and there is virtually no limit to the number of foreign servers which could be supported in accordance with the techniques of the present invention. While the foreign server 118 may be implemented as an independent system, it is contemplated that the foreign server 118 may be integrated with the central file server 102 and the servers 102, 118 wherein the entire system may be implemented within a single process 120 and resident on a single computer system. In its simplest form, the server 118 may be thought of as comprising a transport 122, a kernel 124 and a server module 126, whose functions are identical to transport 112, kernel 114 and server module 116, respectively. It is contemplated that the foreign server 118 may maintain its own file system 128 or share file system 104 and support its own client base as indicated by clients 132, 134 and 136. While in the system 100, the central server 102 may be adapted to service clients operating under the MS-DOS or OS/2 operating systems and using file systems compatible therewith, the foreign file server 118 may be adapted to service clients using a completely different operating system and file system, such as the operating system and file system used with Apple Macintosh computers. For example, the foreign server 118 may be configured to support the Apple LocalTalk and AppleShare local area network protocols.

The present invention provides an efficient method and means for the clients of the foreign file server 118 to have complete and transparent access to files maintained in file system 104. When performing foreign network operations locally, assuming the file server 118 were adapted for use with Macintosh type clients, a client would generate a network file request in the form of an Apple Filing Protocol request (AFP). The Apple Filing Protocol is well known. As with the central file server 112, the request AFP is routed to the server module 126, which disassembles the request AFP and routes the file system request to kernel 124. Kernel 124 then instructs the file system 128 to perform the requested file operation. Once the file operation has been performed, the requested data is routed through the kernel 124 and server module 126 to generate a response AFP. The response AFP is then sent to the requesting client through transport 122.

According to the principles of the present invention, in addition to performing foreign operations locally, the foreign server 118 is adapted to perform file services with file system 104. In prior systems, if a foreign client requests file services from a network server having an incompatible file system, the file service request is routed to the server module of the incompatible system where it is translated into a form which is recognized by its associated kernel. The kernel then translates the file system request into a form which is recognized by the incompatible file system. Therefore, file service requests go through two levels of translation when processing file service requests from foreign file servers. The present invention provides a novel method and means for facilitating file service requests from foreign servers by providing a server module 126 which includes a mapping means 140, which directly converts file service requests from foreign clients 132 to 136 into a form which is recognized by file system 104.

While the present invention provides a novel architecture for distributed computer systems in which the mapping means 140 is only one component, mapping means are a well-known means for converting file protocols. One example of a known mapping means is the LAN MANAGER NETWARE Server (LMNS) available from Racal-Interlan, which converts Novell Netware file system requests into Microsoft LANManager and OS/2 requests.

The translated file service request is directly communicated to file system 104 through channel 142, thus eliminating the second level of translation required if the file service request is routed through server module 116. In addition, the present invention contemplates the use of channel 144 to facilitate communication between central server module 116 and foreign server module 126, so that file system functions are provided in a coordinated manner wherein the central server 102 is fully apprised of the actions of foreign server 118.

For example, the present invention is particularly adapted for use in a multiuser/multitasking environment. In this type of system, files must be protected from multiple users attempting to modify the file simultaneously. If files are not protected from multiple user modification, users may be working with inconsistent versions of the same file. Therefore, in a multiple user environment, files are temporarily locked when modifications are made by a single user and unlocked when the modification is complete. In accordance with the principles of the present invention, the foreign server 118 may access the file system 104 directly. Therefore, the central server must be informed which files are opened and locked by foreign server 118. One advantage of the present invention is that the central server can record and display statistics for file operations for the entire system 100.

While files of the file system 104 are being processed by foreign server module 126, the foreign server module 126 calls a number of application program interfaces (APIs) to instruct the central server module 116 as to file service functions being directly performed on the file system 104. An API may be thought of as a modular unit which performs a known function or procedure. APIs typically employ data structures wherein certain values may be accessed, set and manipulated, and certain values and/or error codes are often returned by APIs. The central server 116 then responds to server APIs with entry points to dynamic linked library (DLL) APIs to confirm communication between the respective file servers. DLLs are a well-known feature of the OS/2 operating system and are specific instances of APIs which are available as common resources to any application or other type of executable code. Therefore, system performance is greatly enhanced by allowing direct file system access from foreign file servers to the central file system 104, and by reducing communication between the central file server and foreign servers to information about the status of files.

While the kernel and server module of the central server are preferably implemented for use with the OS/2 operating system developed by Microsoft, those skilled in the art will appreciate that the present invention may be implemented with virtually any operating system or combination of operating systems. The present invention is adapted for use with a number of foreign file servers, as indicated by foreign file servers 146 to 152.

In accordance with the teachings of the present invention, the activities of foreign servers are tracked on the central server in the form of tables or internal data structures of the type shown in FIG. 1B. On a high level, the central server maintains a repository, or table 160, which stores information for each foreign server active in the system. Each instance 162 of foreign server entries in table 160 includes a reference 164 to four tables 166 to 172. Table 166 maintains information for each session and contains one entry 167 for each session. Table 168 contains one entry 169 for each connection. Table 170 contains one entry 171 for each file, and table 172 contains one entry 173 for each client type supported by the foreign server. The concept of sessions, connections, files and client types is further discussed below.

The data structure for table entry 162 is set forth below:

```
struct alt_srvdata {
    struct alt_srvdata far*asd_nextsd;              /*Next server in asdfreeq. */
    unsigned short          asd_srv_id;             /*Offset of entry in sd asd */
    char                    asd_state;              /*FREE, ACTIVE, CLOSING etc. */
    char                    asd_pad1;
    char                    asd_dllmod_name[MAXPATHLEN];
```

-continued

```
                                                                /*DLL module for AltSrv APIs */
unsigned short              asd_num_cltype;                     /*Number of client types */
struct client_type_info far*asd_cllist;
                                                                /* List of client type structs */
unsigned short              asd_pid;                            /*ID of registering process */
                                                                /*Alt server service stats */
unsigned long               asd_srv_type;                       /*Type of server */
unsigned short              asd_num_conns;                      /*Max number of connections */
unsigned short              asd_num_files;                      /*Max number of open files */
unsigned short              asd_num_sess;                       /*Max number of sessions */
unsigned short              asd_cur_conns;                      /*Active connections */
unsigned short              asd_cur_files;                      /*Currently open files */
unsigned short              asd_sess;                           /*Currently active sessions */
unsigned long               asd_first_file;                     /*Fileid of first open file */
Table for sessions, pointer to first free entry in the table and pool of free session entry structures.
    struct asd_sentry far*far*asd_sess;
    struct asd_sentry far*far*asd_sess1stfree;
    struct asd_sentry far*far*asd_sessfreeq;
Table for connections, pointer to first free entry in the table and pool of free connection entry
structures.
    struct asd_centry far*far*asd_conn;
    struct asd_centry far*far*asd_conn1stfree;
    struct asd_centry far*far*asd_connfreeq;
Table for files, pointer to first free entry in the table and pool of free file entry structures.
    struct asd_fentry far*far*asd_file;
    struct asd_fentry far*far*asd_file1stfree;
    struct asd_fentry far*far*asd_filefreeq;
};      End of alt_srvdata
The data structure for table entry 167 is set forth below:
struct asd_sentry {
struct asd_sentry far*se_nextentry;/*Points to next sess in freeq*/
struct alt_srvdata far*se_server;/*Points to owning server*/
unsigned short              se_sessid;                          /*Contains ID of session*/
char                        se_state;                           /*FREE, ACTIVE etc.*/
char                        se_pad1;
char                        se_cname [CNLEN+1];                 /*Comp that setup session*/
char                        se_username [UNLEN+1];              /*User that made session*/
unsigned long               se_sesstime;                        /*Time session was established*/
unsigned long               se_idletime;                        /*Time last action occurred*/
unsigned long               se_userflags;
unsigned short              se_userhash;                        /*Hash value of user name*/
unsigned short              se_cnhash;
unsigned short              se_numcons;                         /*Currently active connections*/
unsigned short              se_numopens;                        /*Currently open files*/
unsigned short              se_numusers;                        /*Number of logged on users*/
unsigned short              se_cltype;                          /*Index to client type table.*/
struct asd_fentry far*      se_openfileq;                       /*Queue of the open files*/
}; /*End of asd_sentry*/
The data structure for table entry 169 is set forth below:
struct asd_centry {
struct asd_centry far       *ce_nextentry;                      /*Next struct in free queue.*/
struct alt_srvdata far      *ce_server;                         /*Points to owning server*/
struct asd_sentry far       *ce_onwersess;                      /*Session that setup connection*/
unsigned short              ce_connid;                          /*Connection id*/
char                        ce_state;                           /*FREE, ACTIVE, CLOSING etc.*/
char                        ce_pad1;
unsigned short              ce_conntype;
unsigned short              ce_openfiles;                       /*Number of open files*/
unsigned short              ce_numusers;                        /*Number of users*/
unsigned long               ce_conntime;                        /*Time connected*/
char far*                   ce_username;                        /*Name of user*/
struct offer far            *ce_netshare;                       /*Offer structure connected to*/
}; /*End of asd_centry*/
The data structure for table entry 171 is set forth below:
struct asd_fentry}
struct asd_fentry far       *fe_nextentry;                      /*Next file struct in queues*/
struct alt_srvdata far      *fe_server;                         /*Points to owing server*/
struct asd_centry far       *fe_ownerconn;                      /*Connection that opened file*/
unsigned long               fe_fileid;/                         /*ID of the file*/
char                        fe_state;                           /*FREE, ACTIVE etc.*/
char                        fe_pad1;
unsigned short              fe_permissions;
unsigned short              fe_numlocks;                        /*Number of locks*/
char far*                   fe_pathname;                        /*Absolute path and name*/
char far*                   fe_username;                        /*User that opened the file*/
}; /*End of asd_fentry*/
The data structure for table entry 173 is set forth below:
Each of the client type structures is defined in server.h to be:
struct client_type_info {
char                                        cltype_name [CLTYPE_LEN+1];
char                                        cltype_pad1;
}
``` where:
cltype_name is an ASCIIZ string that contains the client type.
cltype_pad1 is character used to provide word alignment of the structures.

The APIS of the present invention may be divided into four basic classifications: initialization and termination of communications channels, session operations connection operations, and file operations. In addition, the present invention may employ existing APIs, such as APIs used for resource allocation and sharing, and message operations. Initialization and termination APIs are used to establish communications channels between the central server and foreign file servers. Session APIs notify the central server of session operations, such as the addition or deletion of sessions, setting session information and getting session information. Connection APIs notify the central server of attempts to access a shared resource by a client. A connection may be thought of as a particular instance of a client access to a shared resource. Operations which may be performed on a connection by a client include connection establishment, termination, setting of file status and retrieval of file status. File APIs notify the central server of file operations performed by clients through a foreign server. Such operations can include operations such as file open and file close.

The overall operation of the present invention may be explained as follows. Upon foreign server start-up, the foreign server calls the I_NetServerRegister API to register its services with the central server. In the register_info_0 data structure passed to the central server, the foreign server specifies a DLL module which contains the APIs used by the central server to communicate with the foreign server. When a client of the foreign server wishes to connect to a central server resource, the foreign server calls the I_NetSessionEntryMake API to establish a session from the specified client to the central server. This session is the parent of later connections and file operations. When the client of the foreign server wishes to access a central server resource, the foreign server calls the I_NetConnectionEntryMake API to notify the central server of the request. Once a session and connection have been established on the central server, the foreign server services its client's file system requests through use of the file APIs described below. When a client of the foreign server wishes to cease access to a central server resource, the foreign server issues a call to the I_NetConnectionEntry Clear API to notify the central server. When all connections of a specific client session have been cleared, the foreign server calls the I_NetSessionEntryClear API to notify the central server to break the connection to the central server resource. When a foreign server wishes to cease operation, it calls the I_NetServerDeregister API to terminate its services with the central server. For each API called by the foreign server, the central server responds with a status code either confirming the operation or indicating an error.

For operations such as central service shutdown initiated by the central server, existing OS/2 local area network APIs and APIs contained within a DLL provided by the foreign server are used to communicate the operations to the foreign server. These APIs are set forth below:

AltSrvMessageBufferSend: sends the message in the buffer being passed, to the user specified.

AltSrvMessageFileSend: Sends the contents of a file to the specified user.

AltSrvSessionDel: deletes the session that the specified user established.

AltSrvFileClose: Closes the file specified in the parameters being passed.

AltSrvShareAdd: Adds a share to the list of shares.

AltSrvShareDel: Deletes the specified share.

In the preferred practice of the present invention, shares may be defined as a network name for server resources which are being offered to others.

If the messaging APIs do not interest the servers, the error value ERROR_NOT_SUPPORTED is returned.

Interface of AltSrv APIs

AltSrvMessageBufferSend

This API sends the message contained in the buffer buf to the user specified in the name parameter. If the server service does not support messaging, ERROR_NOT_SUPPORTED is returned.

```
#include <netcons.h>
include <message.h>
unsigned far pascal
AltSrvMessageBufferSend (name, buf, buflen)

char far *         name;
char far *         buf;
unsigned short     buflen;
``` where:

name is an ASCIIZ string telling the name of the registered user or application to receive the message. To broadcast a message to all clients on the LAN, name points to an asterisk (*).

buf points to the message.

buflen specifies the size (in bytes) of the buf memory area.

Return Codes
| | |
|---|---|
| NERR_Success | No errors encountered |
| ERROR_NETWORK_ACCESS_DENIED | Administrative privileges required |
| ERROR_REM_NOT_LIST | Remote computer found but not listening |
| ERROR_INVALID_PARAMETER | Invalid parameter specified |
| ERROR_NOT_SUPPORTED | This API is not supported |
| NERR_NetNotStarted | Device driver not installed |
| NERR_RemoteErr | Error encountered while remotely executing function |
| NERR_NetworkError | Unexpected network error |
| NERR_NoComputerName | Local computername not defined |
| NERR_NameNotFound | Name not found |
| NERR_PausedRemote | Remote messenger service paused |
| NERR_BadReceive | Message sent but not received |
| NERR_TruncateBroadcast | Message incomplete |
| NERR_InvalidComputer | Invalid computername specified |

AltSrvMessageFileSend

This API is called in order to attempt to send the file specified by filespec to the user specified by the parameter (user). If the server does not support messaging, it returns ERROR_NOT_SUPPORTED.

```
#include <netcons.h>
include <message.h> unsigned far pascal
AltSrvMessageFileSend (name, filespec)

char far *      name;
char far *      filespec;
``` where:

name points to an ASCIIZ string telling the name of the registered user or application to receive the message. To broadcast a message to all clients on the LAN, name points to an asterisk (*).

filespecs points to an ASCIIZ string specifying the pathname of a file to send.

Return Codes
| | |
|---|---|
| NERR_Success | No errors encountered |
| ERROR_NETWORK_ACCESS_DENIED | Administrative privileges required |
| ERROR_REM_NOT_LIST | Remote computer found but not listening |
| ERROR_INVALID_PARAMETER | Invalid parameter specified |
| ERROR_NOT_SUPPORTED | This API is not supported |
| NERR_NetNotStarted | Device driver not installed |
| NERR_RemoteErr | Error encountered while remotely executing function |
| NERR_NetworkError | Unexpected network error |
| NERR_NoComputerName | Local computername not defined |
| NERR_NameNotFound | Name not found |
| NERR_PausedRemote | Remote messenger service paused |
| NERR_BadReceive | Message sent but not received |
| NERR_TruncateBroadcast | Message incomplete |
| NERR_FileError | Error while reading message file |
| NERR_InvalidComputer | Invalid computername specified |

AltSrvSessionDel

This API ends a session between a client and the server service. There is no need to call I_NetSessionEntryClear because the session will be cleared from the central server upon return.

```
#include <netcons.h>
include <shares.h>
unsigned far pascal

AltSrvSessionDel (workstation, reserved, sessid)
char far *              workstation;
unsigned short          reserved;
unsigned long           sessid;
``` where:

workstation points to an ASCIIZ string containing the name of the workstation that established the session being discontinued.

reserved must be 0;

sessid is the number given to the session when the session was established.

Return Codes
NERR_Sucess                     No errors encountered
ERROR_INVALID_PARAMETER         Invalid parameter specified
NERR_NotStarted                 Device driver not installed
NERR_ClientNameNotFound         Invalid client name

AltSrvFileClose

This API closes the file specified by the fileid. There is no need to call I_NetFileEntryClear because the entry will be disposed of upon return of the API.

```
#include <netcons.h>
include <shares.h>
unsigned far pascal
AltSrvFileClose (fileid)
unsigned long fileid;
``` where:
fileid is an integer associated with the file when an entry for this file was made.

Return Codes
NERR_Success                    No error encountered
ERROR_NETWORK_ACCESS_DENIED     Administrative privileges required
NERR_FileIdNotFound             Invalid file I.d. value specified

AltSrvShareAdd

This API is used to inform the alternate servers when a share is being added.

```
#include <netcons.h>
include <shares.h>
#include <access.h>
unsigned far pascal
AltSrvShareAdd (level, buf, buflen)

short           level;
char far *      buf;
unsigned        shortbuflen;
``` where:
level specifies the level of detail (2) provided by the share_info_2 data structure.

buf points to the share_info_2 structure.

buflen specifies the size (in bytes) of the buf memory area.

Return Codes
NERR_Success            No errors encountered
ERROR_NOT_ENOUGH_MEMORY Not enough memory available
ERROR_INVALID_PARAMETER Invalid parameter specified
ERROR_INVALID_LEVEL     Invalid level parameter
NERR_UknownDevDir       Invalid directory
NERR_RedirectedPat      Pathname currently redirected
NERR_DuplicateShar      Device already shared NERR_NoRoom            Server out of resource space
NERR_BufTooSmall      Buf too small for fixed-length data

AltSrvShareDel

This API informs the alternate servers that a share has been deleted. The connections and the file entries that become obsolete by deleting the share will be disposed of properly.

```
#include <netcons.h>
include <shares.h>
#include <access.h>
unsigned far pascal
AltSrvShareDel (netname, reserved)

char far *      netname;
unsigned short  reserved;
``` where:
    netname points to an ASCIIZ string specifying the sharename to be deleted.

reserved must be 0.

Return Codes
| | |
|---|---|
| NERR_Success | No errors encountered |
| ERROR_ACCESS_DENIED | Administrative privileges required |
| ERROR_INVALID_PARAMETER | Invalid parameter specified |
| NERR_NetNameNotFound | Sharename not found |

It should be noted that the above APIs may be implemented in a variety of ways, which are readily apparent to persons of ordinary skill, depending on foreign server implementation.

In addition to the APIs discussed herein, the present invention is also adapted to invoke existing APIs which are currently available in the Microsoft "LanMan" local area network. A detailed technical description of the Microsoft LanMan local area network is set forth in a document "LANManager Programmers Reference." An example of an existing API used in the operation of the present invention is the NetServiceControl API used to instruct servers and clients that a network shutdown is about to occur.

The following external data structures are maintained by the central server in the course of the operation of the present invention.

| SERVER CATEGORY |
|---|
| Structures and Predefined Values |

The following values will be added in the type of software that the computer is running (list of SV_TYPEs) in server.h:

| Manifest | Value | Type of Software |
|---|---|---|
| SV_TYPE_AFP | 64 | Apple Filing Protocol Server |
| SV_TYPE_NOVELL | 128 | Novell File Server |

The following constant will be specified in the netcons.h file:
(specifies the length of the client type string)
define CLTYPE_LEN 12
Also the following structure will be defined in server.h:
struct register_info_0 {

| | |
|---|---|
| unsigned long | rg0_type; |
| unsigned short | rg0_max_connections; |
| unsigned short | rg0_max_openfiles; |
| unsigned short | rg0_max_sessions; |
| char far* | rg0_dllmod_name; |
| unsigned short | rg0_num_cltype; |

}
where:
    rg0_type tells the type of software the computer is running, defined in server.h as:

| Manifest | Value | Type of Software |
|---|---|---|
| SV_TYPE_WORKSTATION | 1 | Workstation |
| SV_TYPE_SERVER | 2 | Server |
| SV_TYPE_SQLSERVER | 4 | SQL |
| SV_TYPE_AFP | 64 | Apple Filing Protocol Server |
| SV_TYPE_AFP | 64 | Apple Filing Protocol Server |
| SV_TYPE_NOVELL | 128 | Novell File Server | rg0_max_connections specifies the maximum number of connections that can be made to this server.
    rg0_max_openfiles specifies the maximum number of files open at the same time that this server supports.
    rg0_max_sessions specifies the maximum number of sessions at any time for this server.
    rg0_dllmod_name is a pointer to an ASCIIZ string containing the name of the -continued

```
        dynamic link module that contains the APIs to be called when adding or deleting
        a share, closing files and sessions and when sending messages to users.
        rg0_num_cltype is an integer specifying the number of client type structures
        that follow the register_info structure. The number of client structure must be 1
        or more.
Each of the client type structures is defined in server.h to be:
struct client_type_info {
    char                        cltype_name [CLTYPE_LEN+1];
    char                        cltype_pad1;
}
where:
        cltype_name is an ASCIIZ string that contains the client type.
        cltype_pad1 is character used to provide word alignment of the structures.
There is the need for communication directed from the central server to the server
services. That communication path is through a dynamic link module that the foreign
servers provide as follows:
        AltSrvMessageBufferSend: sends the message in the buffer being passed, to
        the user specified.
        AltSrvMessageFileSend: sends the contents of a file to the specified user.
        AltSrvSessionDel: deletes the session that the specified user established.
        AltSrvFileClose: closes the file specified in the parameters being passed.
        AltSrvShareAdd: adds a share to the list of shares.
        AltSrvShareDel: deletes the specified share.
                            SESSION CATEGORY
Structures and Predefined Values
        Introduction of level 2 session structure:
            struct session_info_2 {
char far                            *sesi2_cname;
char far                            *sesi2_username;
unsigned short                      sesi2_num_conns;
unsigned short                      sesi2_num_opens;
unsigned short                      sesi2_num_users;
unsigned long                       sesi2_time;
unsigned long                       sesi2_idle_time;
unsigned long                       sesi2_user_flags;
char far*                           sesi2_cltype_name;
}
where:
sesi2_cname is a pointer to an ASCIIZ string that contains the computername of
the Workstation that established the session.
sesi2_username points to an ASCIIZ string that containing the name of the user that
established the session.
sesi2_num_conns tells how many connections have been made during the
session.
sesi2_num_opens tells how many files, devices and pipes have been opened
during the session.
sesi2_num_users specifies how many users have made connections via the
session.
sesi2_time specifies the time of the day when the session was established.
sesi2_idle_time specifies the time of the day the last package was received.
sesi2_user_flags tells how the user established the session. The bit mask for
sesi2_user_flags is defined in shares.h as follows:
Manifest                        Value       Meaning
SESS_GUEST                      1           sesi2_username established the
                                            session using a GUEST
                                            account.
SESS_NOENCRYPTION               2           sesi2_username established the
                                            session without using
                                            password encryption.
sesi2_cltype_name is a pointer to an ASCIIZ string that specifies the type of
client that established the session.
```

CONNECTIONS CATEGORY

All data structures and predefined values used by the following APIs have been previously defined in the LANManager Programmers Reference mentioned above.

FILES CATEGORY

All data structures and predefined values used by the following APIs have been previously defined in the LANManager Programmers Reference mentioned above.

Figure 2A:
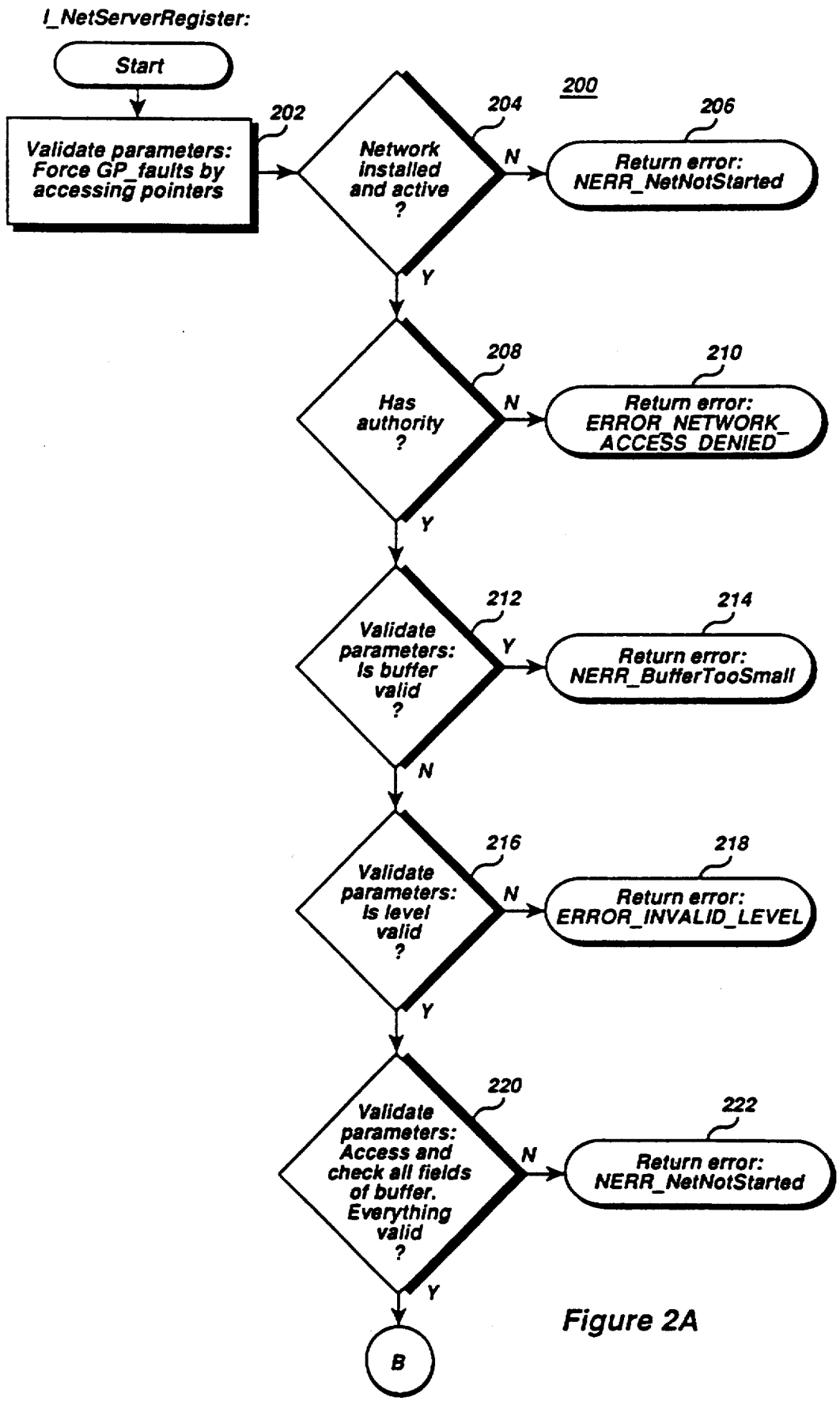
FIGS. 2A to 2C are flow diagrams detailing the operation of the I_NetServerRegister API.
Figure 2B:
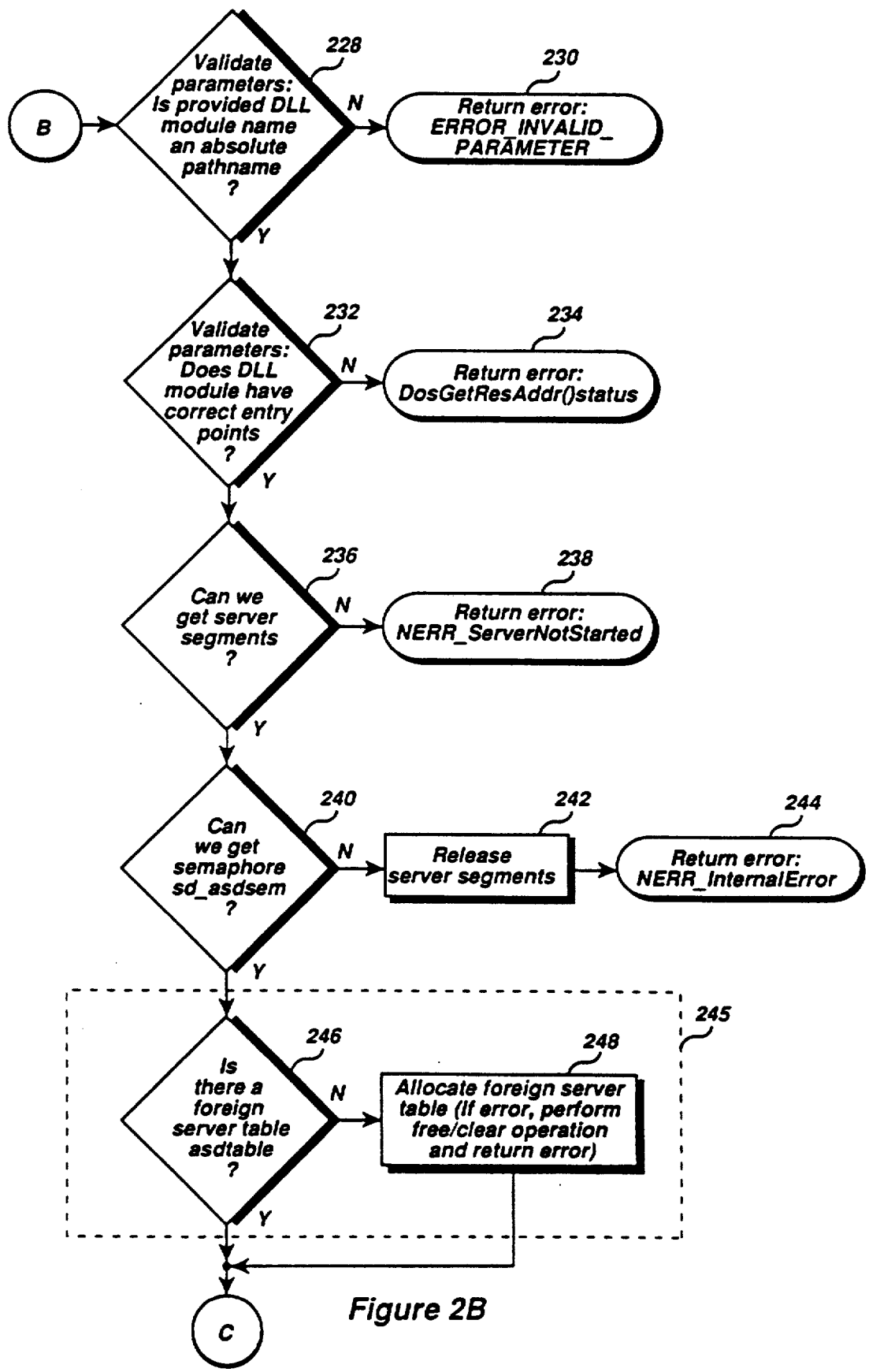
Figure 2C:
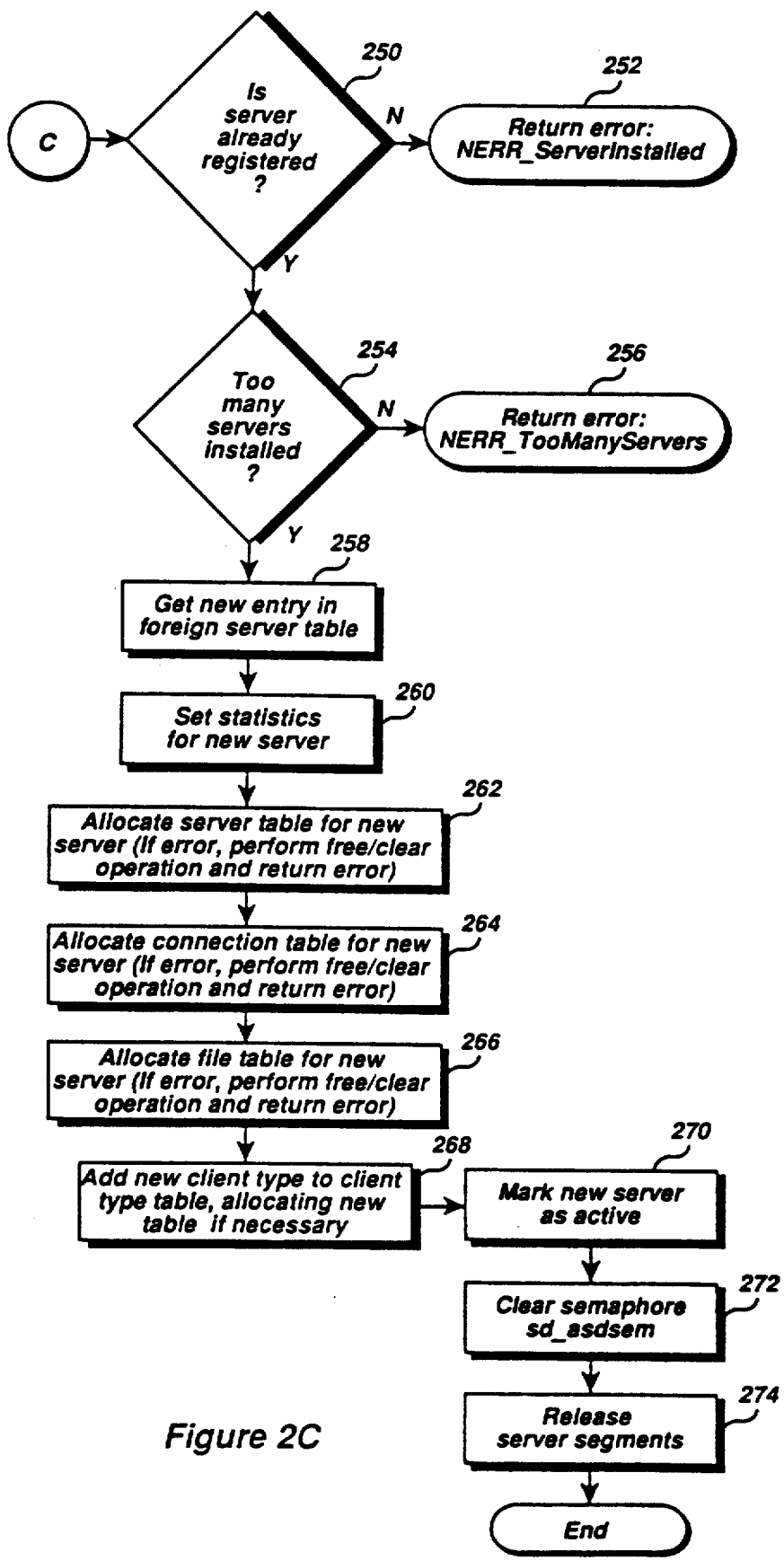

The following figures of the drawings describe the operation of the present invention. FIGS. 2A to 2C are flow diagrams of the I_NetServerRegister, which is an API used to register the foreign service with the file server of the present invention. This is the initial call made from a foreign server to the central to instruct the central server that a foreign server requires file services on the central server. Communication between the central server and the foreign server occurs in three phases:

1. An initial phase wherein the foreign server instructs the central server that its foreign services are available to the central server.

2. An intermediate phase wherein the foreign server processes foreign client requests and reports such actions to the central server.

3. A final stage wherein foreign server notifies central server that its services are no longer available.

The I_NetServerRegister API 200 is called to perform the initial phase. This process is invoked to set up any necessary data structures within the central server. The data structures for this API are set forth below:

---

I_NetServerRegister (admin, Server)

This API validates the data being passed in the buffer and then it will register the server service and will create the entries for the types of clients that the server will serve.
include <netcons.h>
include <server.h>
unsigned far pascal
I_NetServerRegister (level, buf, buflen, server_id)

| | |
|---|---|
| short | level; |
| char far* | buf; |
| unsigned short | buflen; |
| unsigned short far* | server_id; | where:
    level specifies the level of detail of the structure that contains the
    information about the server to be registered (the level must be 0).
    buf is a pointer to a structure that contains the server information.
    buflen specifies that length of the buffer.
    server_id is a pointer to an integer. Upon return from this call, this
    pointer's contents will be an identification number for this server. This
    will be used for later reference of the server.
NOTE: At least one client type must be specified. If not client types are
specified, upon return server_id will be 0xFFFF and the result of calling the API
will be ERROR_INVALID_PARAMETER.
Return Codes

| | |
|---|---|
| NERR_Success | No errors encountered |
| ERROR_NETWORK_ACCESS_DENIED | Administrative privileges required |
| ERROR_INVALID_PARAMETER | Invalid parameter specified |
| ERROR_INVALID_LEVEL | Invalid level parameter |
| NERR_NetNotStarted | Device driver not installed |
| NERR_ServerNotStarted | Server service not installed |
| NERR_ServiceInstalled | Server is already registered |

---

The central server uses these data structures for tracking which foreign servers are active and available to foreign clients. In general, the process 200 is used to validate parameters, to determine whether the network is active, to verify that the caller of the API has authority to use the API, to validate parameter values, to locate central server data in memory, to protect central server data against multiple client access, to perform a requested system function, to unprotect the central server data and to release access to central server data. If an error is detected at any point in the process, all nonrequested system functions are reversed and the appropriate error code is returned to the caller.

When invoked, the process 200 begins with item 202 which performs error checking on the parameter passed to the central server to determine whether the parameters reference is a legal location within memory. Decision 204 then determines whether the network is installed and active. If not, a NERR_NetNotStarted error code is returned to the caller in termination block 206. If decision 204 determines the network is installed and active, control passes to decision 208, which determines whether the caller has authority to invoke the API 200. If not, a ERROR_NETWORK_ACCESS_DENIED error code is returned to the caller in termination block 210. If decision 208 determines the caller has authority to proceed in the API 200, control passes to decisions 212, 216, 220, 228 and 232 to validate any parameters passed the API. Decision 212 determines whether the buffer length parameter passed to the API is correct. If not, error NERR_BufTooSmall is returned by termination block 218. Decision 216 determines whether the data structure level of detail is zero. If not, error ERROR_INVALID_LEVEL is returned by termination block 218. Decision 220 determines whether the pointers stored in the buffer are pointing to valid positions in memory. If not, ERROR_INVALID_PARAMETER is returned by termination block 222. Decision 228 then determines whether the name of the DLL module identified in the buffer is valid. A DLL is a dynamic linked library which is a shared library resource which may be used by any executable file in the system. DLLs are used for two forms of communication:

1. Whenever the foreign server communicates with central server through APIs discussed herein; and
2. Whenever the central server communicates with foreign server, communication is provided through a DLL provided by foreign server.

In the preferred practice of the present invention, the foreign server provides a DLL to the central with known entry points, and is of the form AltSrvXXXYYY, where XXX is the object in which the API acts on and YYY is the operation to be performed on the object, e.g., file=XXX and close=YYY. This technique allows the central server to receive feedback from the foreign servers as to progress or outcome of the called entry point.

If decision 228 determines the DLL module name is not valid, ERROR_INVALID_PARAMETER is returned by termination block 230.

Referring now to FIG. 2B, decision 232 determines whether the provided DLL module has the correct entry points. If not, ERROR_INVALID_PROCNAME is returned by termination block 234. Decision 236 determines whether the caller can access the central server memory. If not, error NERR_ServerNotStarted is returned by termination block 238. Decision 240 determines whether the data structure that contains the entries for the foreign servers can be protected so that multiple access to the data structure is prohibited. If not, e.g., if the protection mechanism fails, item 242 reverses the accessing of the server segments through an internal API call and NERR_InternalError is returned by termination block 244. Loop 245 is invoked to set up any internal data structures, if necessary. Decision 246 determines whether a table for the foreign server entries exists. If not, item 248 allocates a server table. If while allocating a server table, the allocation attempt fails, an error is returned to the caller and all previous operations are reversed using a clear/free operation. The clear/free operation is discussed in further detail below, in conjunction with FIG. 16. The allocate operation is also discussed in further detail below, in conjunction with FIG. 17.

Once the server tables are allocated, decision 250 determines whether the foreign server is already registered, i.e., the foreign server is already known to the central server. If so, NERR_ServiceInstalled is returned by termination block 252. Decision 254 determines whether sufficient table space is available within the central server to accommodate the registering server. If not, NERR_TooManyServers is returned by termination block 256. Items 258-270 then perform the requested operation, such as allocating and initializing all necessary data structures. For each of the functions performed in items 258-270, if an error is encountered, or if the allocation attempt fails, an error is returned to the caller and all previous operations are reversed. Those skilled in the art will appreciate that semaphores are a form of mutual exclusion. Item 272 is invoked to release a semaphore to relinquish control of the data structure. Item 274 is invoked to release server segments by calling an internal API call.

Figure 3A:
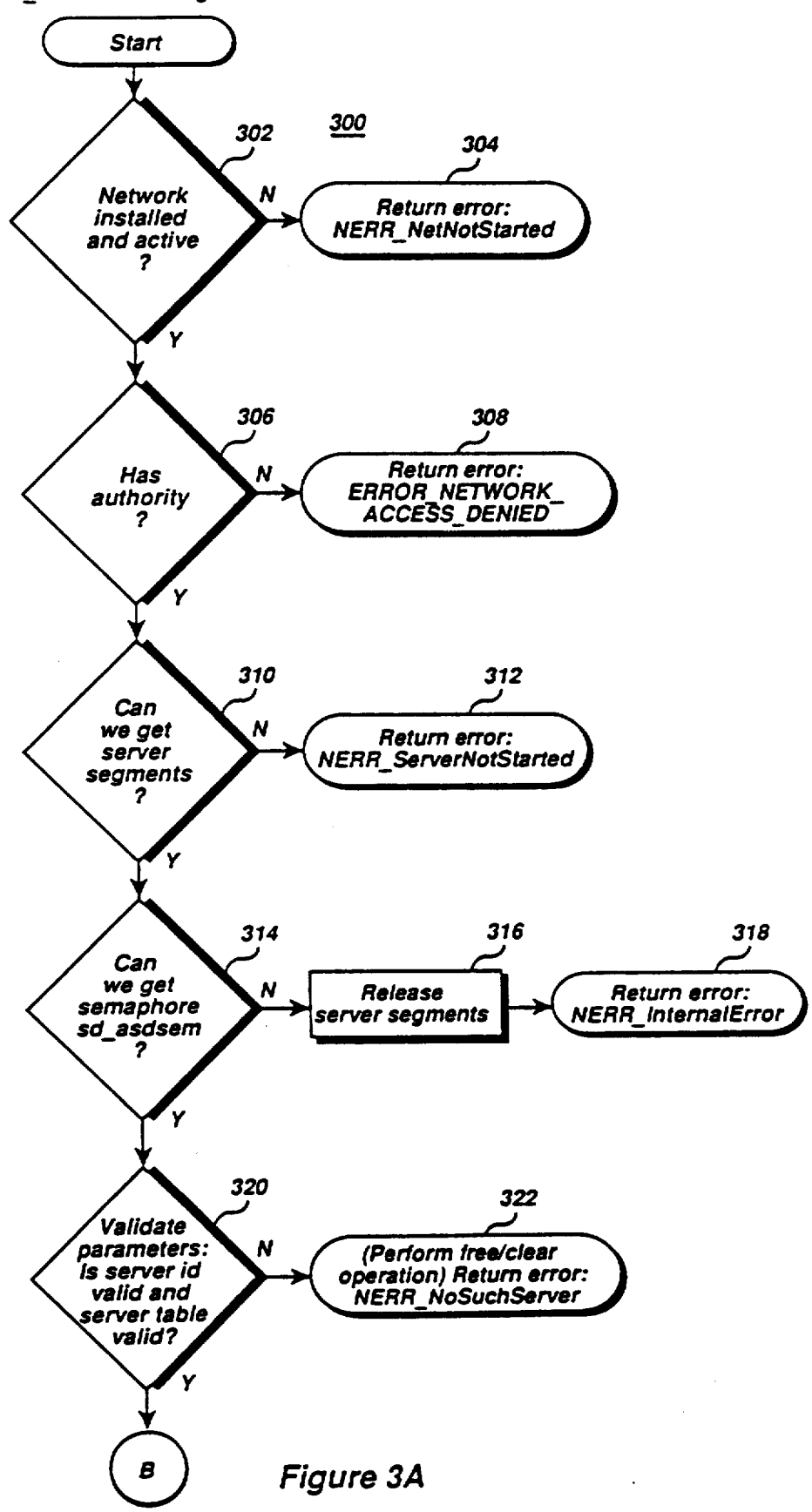
FIGS. 3A and 3B are flow diagrams of the I_NetServerDeregister API.
Figure 3B:
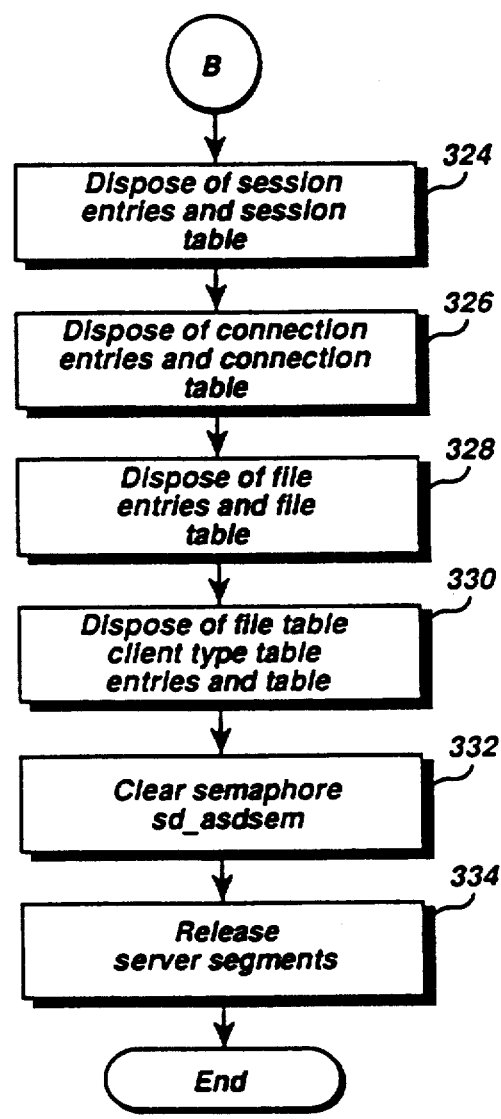

Referring now to FIGS. 3A and 3B, the I_NetServerDeregister API 300 notifies the central server that a foreign server is withdrawing services. This notification allows the central server to perform any necessary operations, such as disposing of any internal data structures and updating any necessary statistics, etc. The data structures used with this API are set forth below:

```
#include <netcons.h>
include <server.h>
unsigned far pascal
I_NetServerDeregister (server_id)
unsigned short         server_id;
where:
    server_id is an integer that specifies the server to
    deregister from a list of available servers.
Return Codes
    NERR_Success                No errors
                                encountered
    ERROR_INVALID_PARAMETER     Invalid para-
                                meter specified
    NERR_NetNotStarted          Device driver
                                not installed
    NERR_ServerNotStarted       Server service
                                not installed
    NERR_NoSuchServer           No entry for
                                such server
```

When invoked, the process 300 begins with decision 302, which determines whether the network is installed and active. If not, a NERR_NetNotStarted error code is returned to the caller in termination block 304. If decision 302 determines the network is installed and active, control passes to decision 306, which determines whether the caller has authority to invoke the API 300. If not, a ERROR_NETWORK_ACCESS_DENIED error code is returned to the caller in termination block 308. If decision 306 determines the caller has authority to proceed in the API 300, control passes to decision 310, which determines whether the caller can access the central server memory. If not, error NERR_ServerNotStarted is returned by termination block 310. Decision 314 determines whether the data structure that contains the entries for the foreign servers can be protected so that multiple access to the data structure is prohibited. If not, e.g., if the protection mechanism fails, item 316 reverses the accessing of the server segments through an internal API call and NERR_InternalError is returned by termination block 318. Decision 320 then determines whether the foreign server identification number value is within a valid range. The foreign server identification number is used to identify foreign servers for communication with the central server. If the foreign server identification number is not within the valid range, NERR_NoSuchServer is returned by termination block 322. Items 324 to 330 are invoked to dispose of allocated data structures as well as the information contained therein. Item 332 is invoked to release a semaphore to relinquish control of the data structure. Item 334 is then invoked to release server segments by calling an internal API call.

Figure 4A:
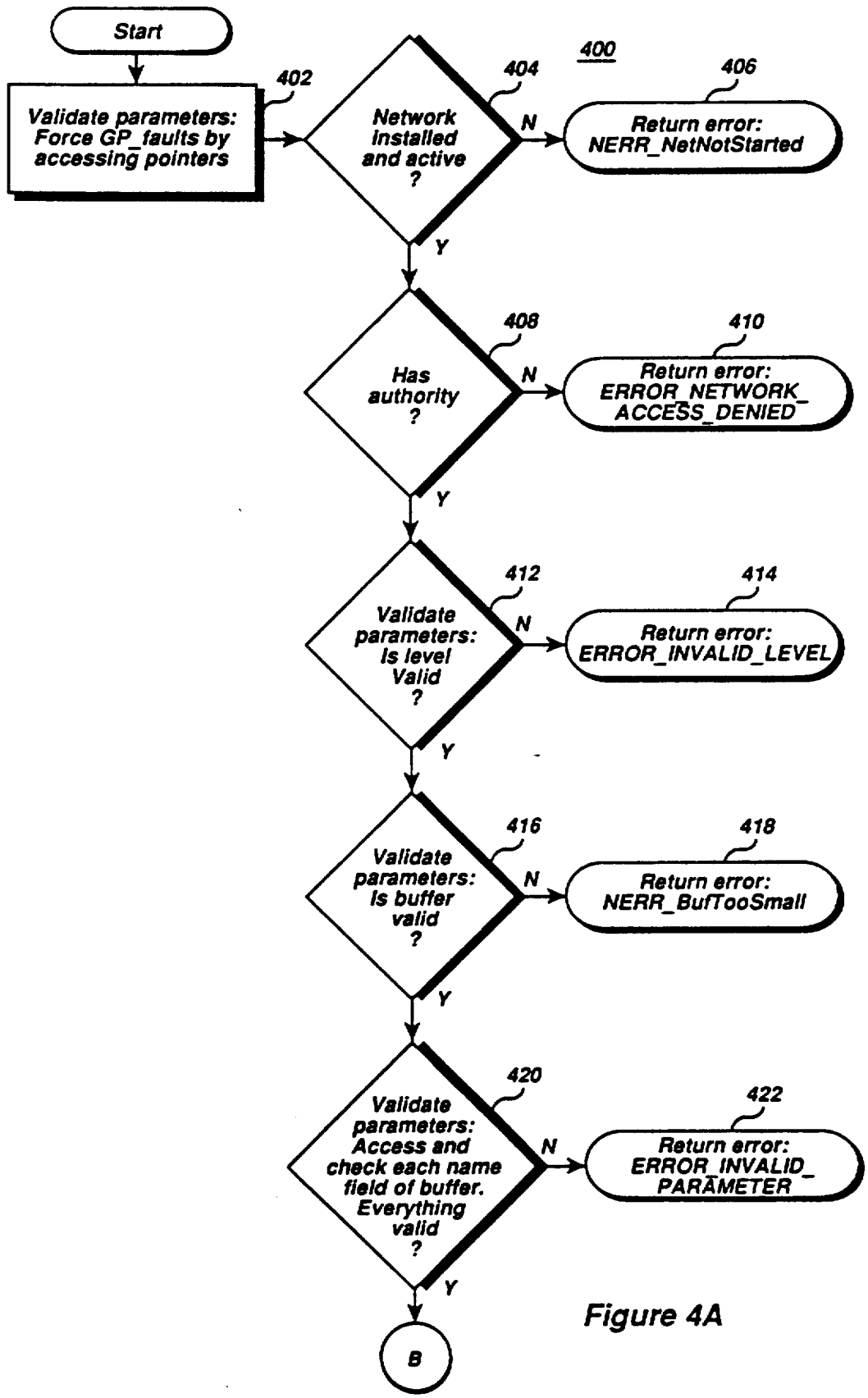
FIGS. 4A and 4B are flow diagrams of the I_NetSessionEntryMake API.
Figure 4B:
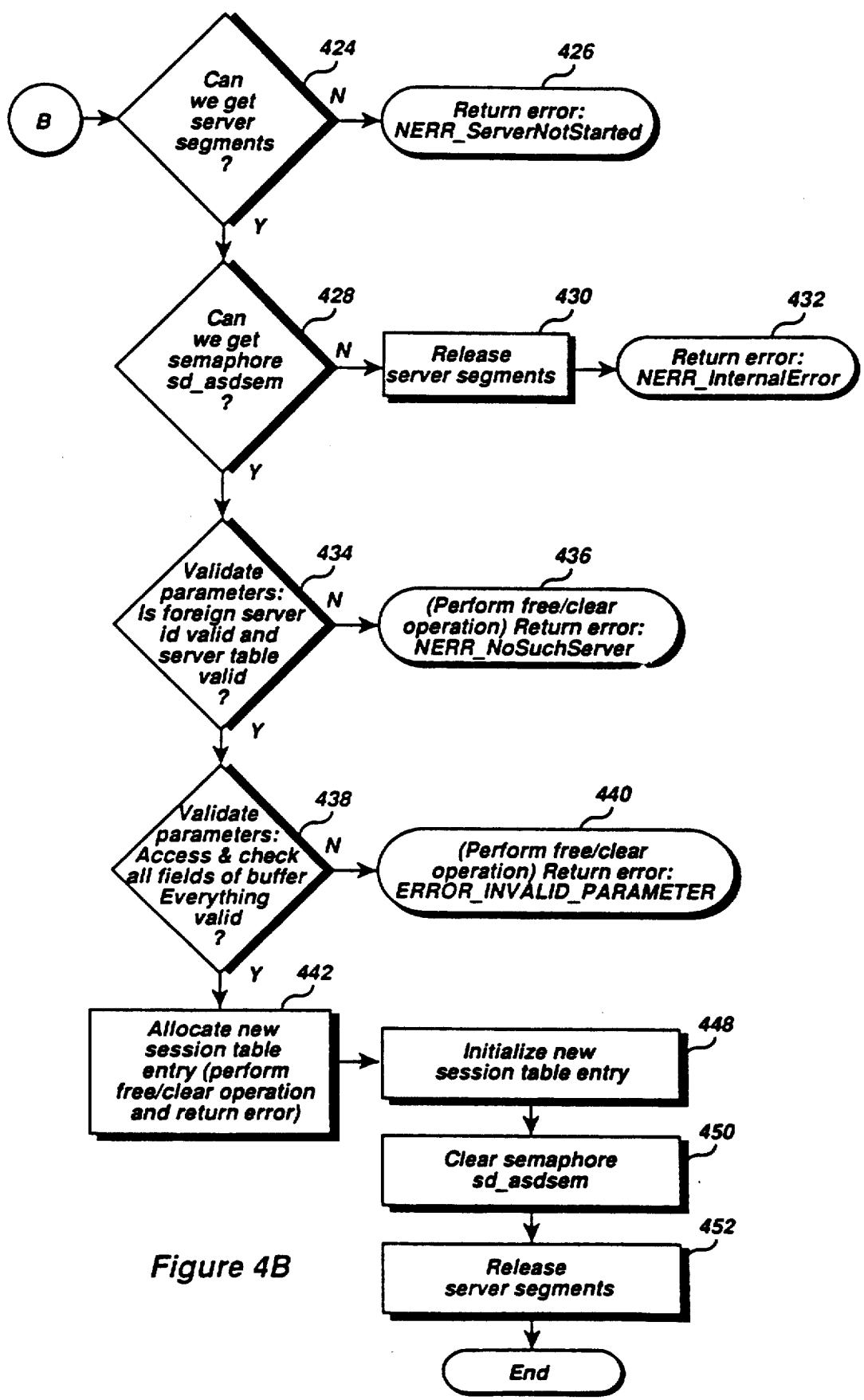

Referring now to FIGS. 4A and 4B, the I_NetSessionEntryMake API 400 is invoked to initialize a new session entry in a data structure in the foreign server and to notify the central server that a new session has been created. In the context of the present invention, sessions may be thought of as a link between two computers, such as a link between a specific workstation and a server, or a client and a server. A session is made up of one or more connections. Connections are a particular instance of a session. Session tables are used for tracking session-related information, such as the owner of the session, whether there are any open files in the session, the number of connections in a session, etc.

The external data structures of the I_NetSessionEntryMake API 400 are set forth below:

```
#include <netcons.h>
include <shares.h>
unsigned far pascal
I_NetSessionEntryMake (server_id, level, buf, buflen, sess_id)
unsigned short         server_id;
short                  level;
char far*              buf;
unsigned shortbuflen;
unsigned short far*    sess_id;
where:
    server_id is an integer that specifies the server that is requesting
    to make an entry in the session table.
    level is the level of detail of the structure being passed (must be 2
    in this release).
    buf is a pointer to the structure that contains the information for
    the new session.
    buflen is an integer that specifies the length of the buffer contain-
    ing the information being passed.
    sess_id is a pointer to a short, which, upon return, contains the id
    of the session in the entry table.
Return Codes
    NERR_Success                No errors encountered
    ERROR_INVALID_PARAMETER     Invalid parameter
                                specified
    ERROR_INVALID_LEVEL         Invalid level parameter
    NERR_NetNotStarted          Device driver not
                                installed
    NERR_ServerNotStarted       server service not
                                installed
    NERR_NoSuchServer           No entry for such server
```

When the API 400 is invoked, the process 400 begins with item 402, which performs error checking on the parameters passed to the central server, to determine whether the parameters reference is a legal location within memory. Decision 404 then determines whether the network is installed and active. If not, a NERR_NetNotStarted error code is returned to the caller in termination block 406. If decision 404 determines the network is installed and active, control passes to decision 408, which determines whether the caller has authority to invoke the API 400. If not, a ERROR_NET- notify the central file server that a session has been terminated. The data structure for this API is set forth below:

---

I_NetSessionEntryClear (admin, Server)
This API provides a way to notify the LAN Manager server that a session for the specified alternate server has been closed. It will dispose of the session entry and will also dispose of any of the connection and file entries associated with the target session. When a session is closed, the servers can call this API directly instead of first deleting all the file entries and disposing of the connections. In addition, this API will update the statistics for the server.
include <netcons.h>
include <shares.h>
unsigned far pascal
I_NetSessionEntryClear (server_id, sess_id)
unsigned short server_id;
unsigned short sess_id;
where:
server_id is an integer that specifies the server that is
requesting to clear an entry on the session table.
sess_id specifies the session that is to be deleted from the session
table.
Return Codes
NERR_Success                No errors encountered
NERR_NetNotStarted          Device driver not installed
NERR_ServerNotStarted       Server service not installed
NERR_NoSuchSession          Entry id is invalid
NERR_NoSuchServer           No entry for such server

---

WORK_ACCESS_DENIED error code is returned to the caller in termination block 410. If decision 408 determines the caller has authority to proceed in the API 400, control passes to decision 412, which determines whether the data structure level of detail is valid. If not, error ERROR_INVALID_LEVEL is returned by termination block 414. Decision 416 then determines whether the buffer length parameter passed to the API is correct. If not, error NERR_BufToSmall is returned by termination block 418. Decision 420 determines whether the pointers stored in the buffer are pointing to valid positions in memory. If not, ERROR_INVALID_PARAMETER is returned by termination block 422. Decision 424 then determines whether the caller can access the central server memory. If not, error NERR_ServerNotStarted is returned by termination block 426. Decision 428 determines whether the data structure that contains the entries for the foreign servers can be protected so that multiple access to the data structure is prohibited. If not, e.g., if the protection mechanism fails, item 430 reverses the accessing of the server segments through an internal API call and NERR_InternalError is returned by termination block 432. Decision 434 then determines whether the foreign server identification number value is within a valid range. If the foreign server identification number is not within a valid range, NERR_NoSuchServer is returned by termination block 436. Decision 438 determines whether the pointers stored in the buffer are pointing to valid positions in memory. If not, ERROR_INVALID_PARAMETER is returned by termination block 440. Item 442 is invoked to allocate a new entry in the new session table. In case of an error, e.g., if the allocation attempt fails, an error is returned to the caller and all previous operations are reversed. Item 448 then initializes and fills the new session table entry. Item 450 is invoked to release a semaphore to relinquish control of the data structure. Item 452 is invoked to release server segments by calling an internal API.

Figure 5A:
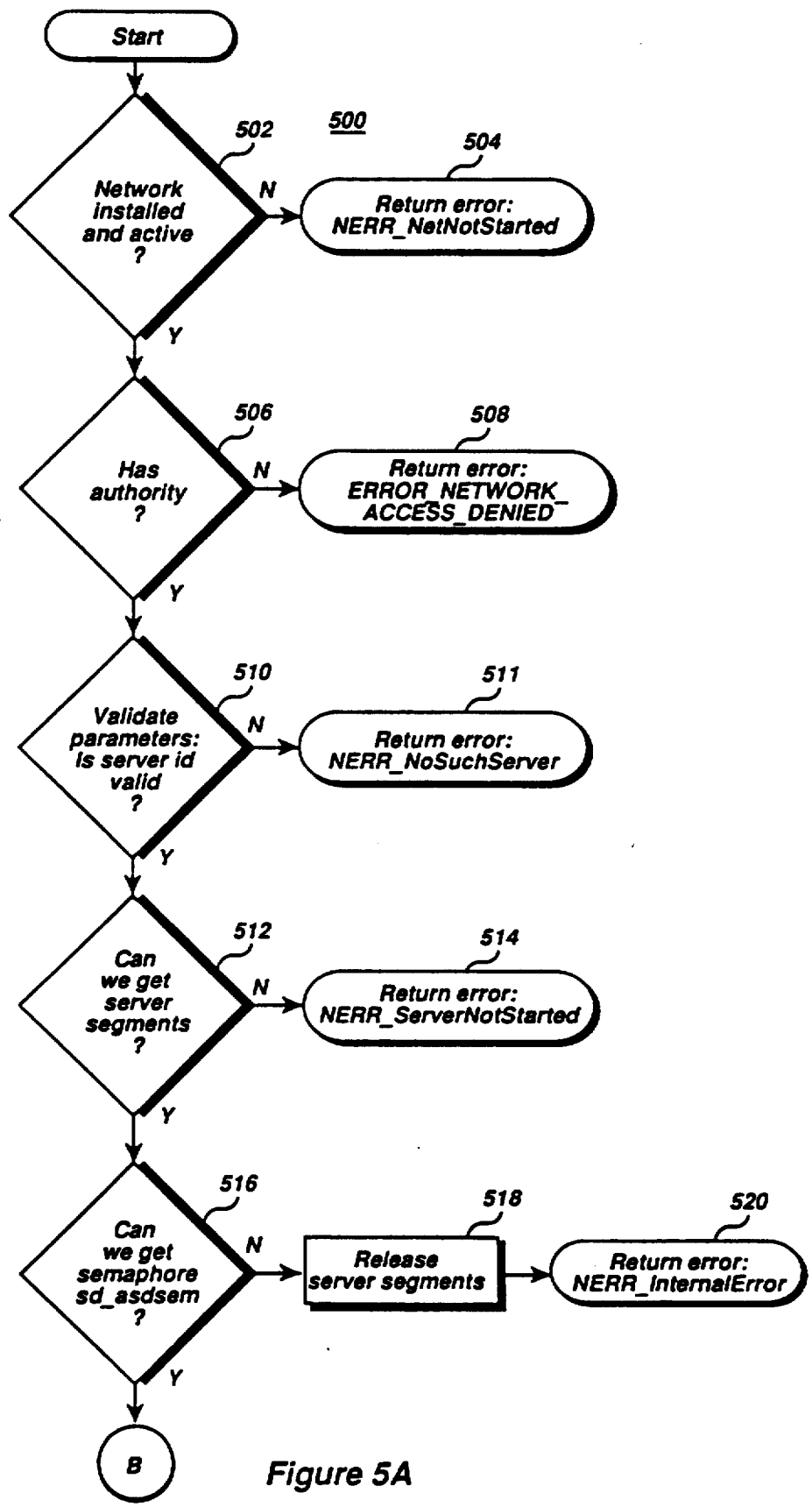
FIGS. 5A and 5B are flow diagrams of the I_NetSessionEntryClear API, which is invoked to terminate a session entry in a data structure in a foreign server and to notify the central file server that a session has been terminated.
Figure 5B:
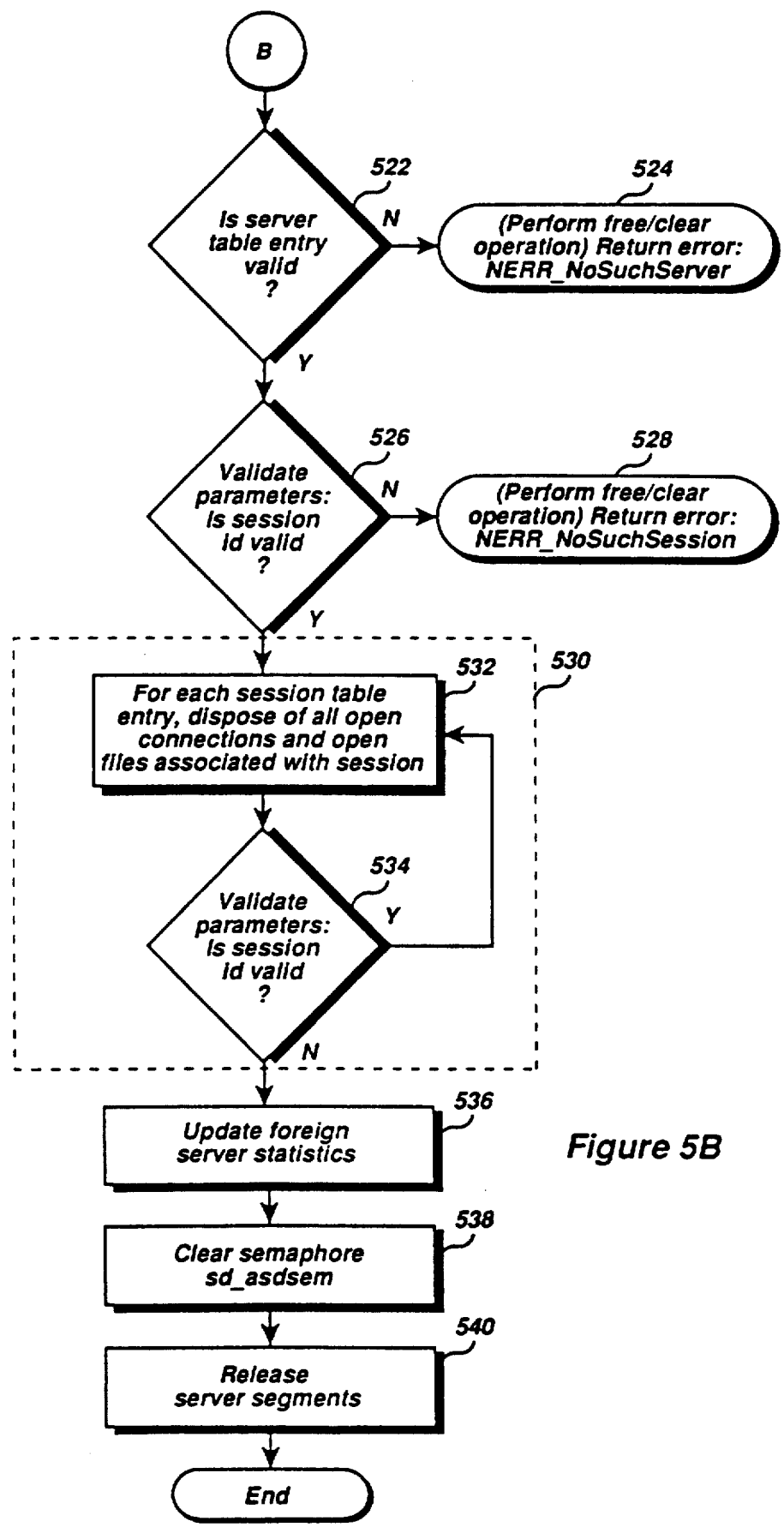

Referring now to FIGS. 5A and 5B, the I_NetSessionEntryClear API 500 is invoked to terminate a session entry in a data structure in a foreign server and to When invoked, decision 502 determines whether the network is installed and active. If not, a Nerr_NetNotStarted error code is returned to the caller in termination block 504. If decision 502 determines the network is installed and active, control passes to decision 502, which determines whether the caller has authority to invoke the API 500. If not, a ERROR_NETWORK_ACCESS_DENIED error code is returned to the caller in termination block 508. If decision 506 determines the caller has authority to proceed in the API 500, control passes to decision 510, which determines whether the foreign server identification number value is within a valid range. If the foreign server identification number is not within a valid range, NERR_NoSuchServer is returned by termination block 511. Decision 512 then determines whether the caller can access the central server memory. If not, error NERR_ServerNotStarted is returned by termination block 514.

Decision 516 determines whether the data structure that contains the entries for the foreign servers can be protected so that multiple access to the data structure is prohibited. If not, e.g., if the protection mechanism fails, item 518 reverses the accessing of the server segments through an internal API call and NERR_InternalError is returned by termination block 520. Decision 522 determines whether foreign server I.D. and entry in the alternate server table is valid. If not, NERR_NoSuchServer is returned by termination block 524. Decision 526 determines whether the session I.D. is valid. The session I.D. is used as an index to the session table. If the session I.D. is not valid, NERR_NoSuchSession is returned by termination block 528. Loop 530, which comprises item 532 and decision 534, then disposes of all open connections and open file entries associated with the session. Item 536 is invoked to update the foreign servers statistics. Item 538 is invoked to release a semaphore to relinquish control of the data structure. Item 540 is invoked to release server segments by calling an internal API.

Figure 6A:
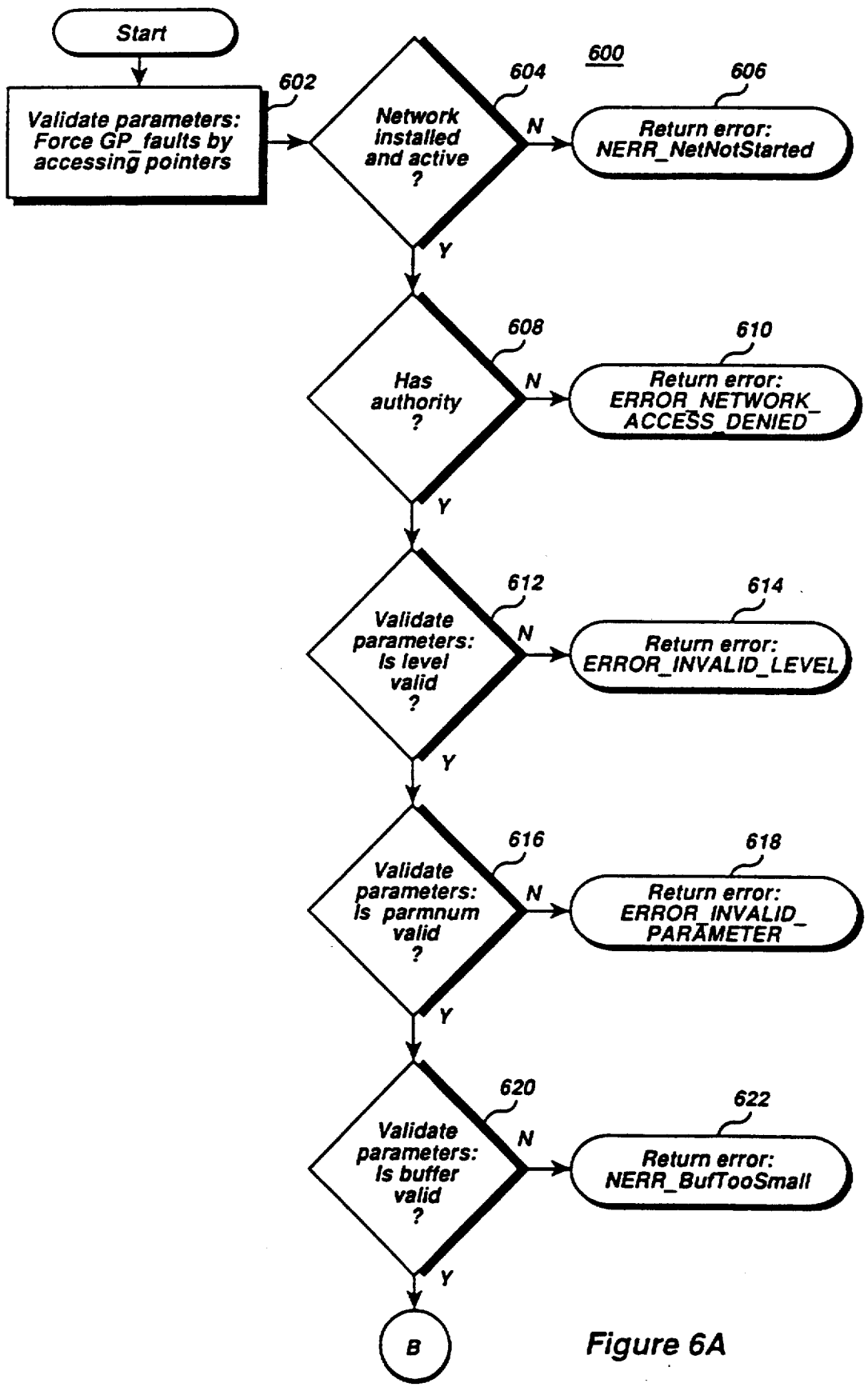
FIGS. 6A to 6C are flow diagrams detailing the operation of the NetSessionEntrySetInfo API, which is invoked to set information about a session.
Figure 6B:
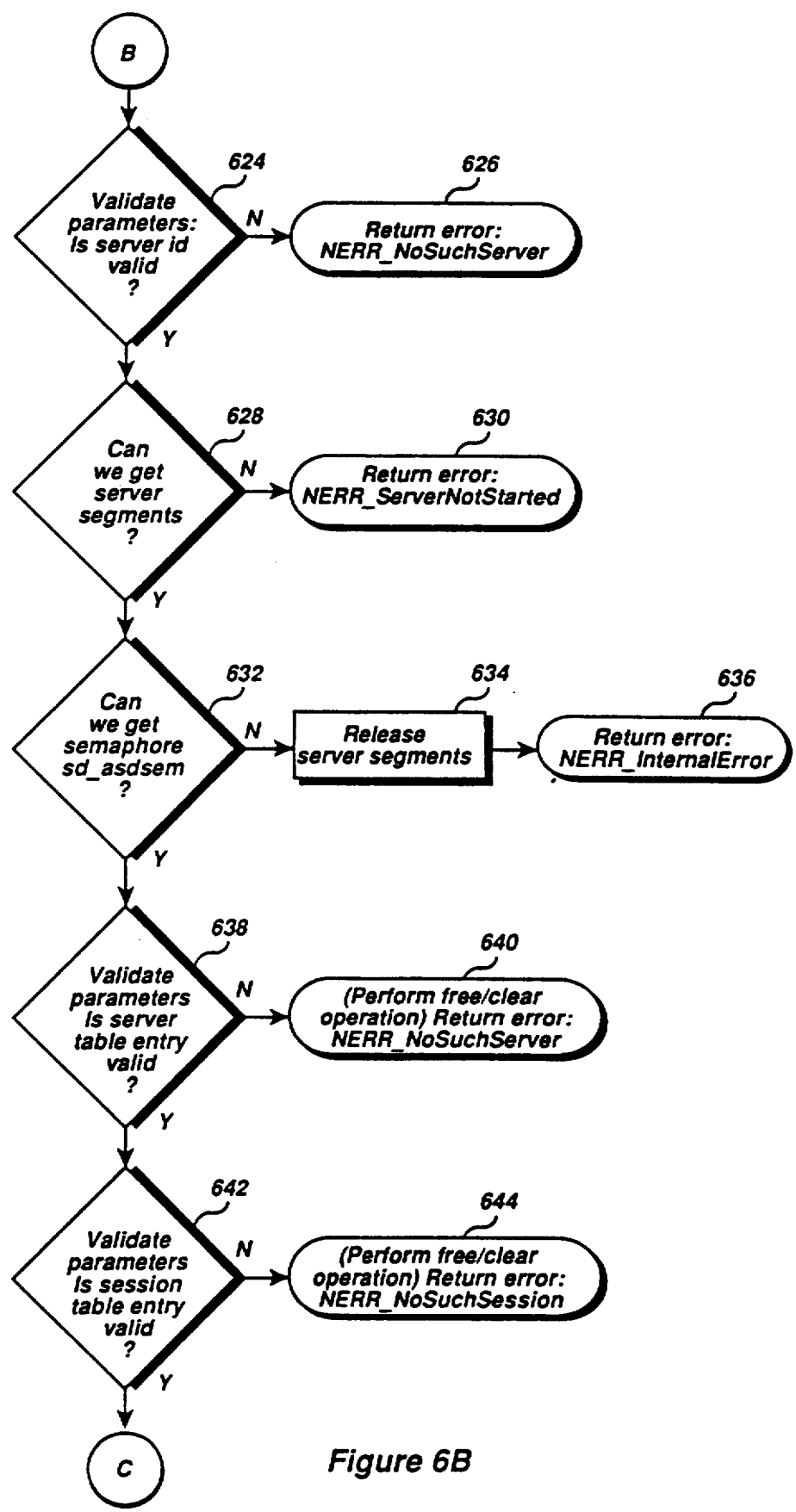
Figure 6C:
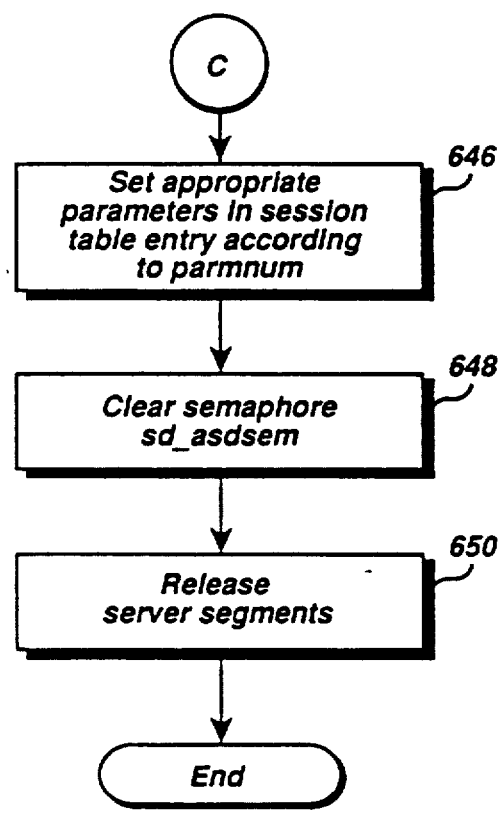

Referring now to FIGS. 6A to 6C, the I_NetSessionEntrySetInfo_API 600 is invoked to set information about a session entry. The data structure for this API is set forth below:

```
I_NetSessionEntrySetInfo (admin, Server)
This API is used to set information about a session. It can reset all the setable fields
of the session entry at once or specify the one to be reset. As a side effect, the
statistics for the specified server are updated if needed.
#include <netcons.h>
include <shares.h>
unsigned far pascal
I_NetSessionEntrySetInfo (server_id, sess_id, level,
buf, buflen, parmnum)
unsigned short              server_id;
unsigned short              sess_id;
short                       level;
char far*                   buf;
unsigned short              buflen;
unsigned short              parmnum;
where:
server_id is an integer that specifies the server that is requesting to set
the information about the entry in the table.
sess_id specifies the session whose information is sought.
level is the level of detail of the structure being sought (must be 2 in this
release).
buf is a pointer to the memory location that contains the structure being
passed.
buflen is an integer that specifies the length of the buffer.
parmnum specifies if a specific component of the structure or all of the
structure is set. A value of 0 specifies that the whole structure is to be
set. Otherwise, parmnum must pass the ordinal
position value for one of the following sess_info_2 data
structure components as defined in shares.h:
Manifest                    Value      Component
SESI_USERS_PARMNUM            5        sesi2_num_users
SESI_IDLE_PARMNUM             7        sesi2_idle_time
Return Codes
NERR_Success                           No errors encountered
ERROR_INVALID_LEVEL                    Invalid level specified.
ERROR_INVALID_PARAMETER                Invalid parameter specified.
NERR_NetNotStarted                     Device driver not installed
NERR_ServerNotStarted                  server service not installed
NERR_NoSuchSession                     Entry id is invalid
NERR_NoSuchServer                      No entry for such server
```

When invoked, the process 600 begins with item 602, which performs error checking on the parameters passed to the central server, to determine whether the parameters reference is a legal location within memory. Decision 604 then determines whether the network is installed and active. If not, a NERR_NetNotStarted error code is returned to the caller in termination block 606. If decision 604 determines the network is installed and active, control passes to decision 608, which determines whether the caller has authority to invoke the API 600. If not, a ERROR_NETWORK_ACCESS_DENIED error code is returned to the caller in termination block 610. If decision 608 determines the caller has authority to proceed with the API 600, control passes to decision 612 to determine whether the level is valid. Decision 616 then determines whether the parameter number (parmnum) is valid. If not, termination block 618 returns error ERROR_INVALID_PARAMETER. Decision 620 determines whether the parameter buffer length (buflen) is valid. If not, termination block 622 returns error NERR_BufTooSmall. Decision 624 determines whether the parameter server identification code (server_id) is valid. If not, termination block 626 returns NERR_NoSuchServer. Decision 628 determines whether the caller can access the central server memory. If not, error NER-R_ServerNotStarted is returned by termination block 630. Decision 632 determines whether the data structure that contains the entries for the foreign servers can be protected so that multiple access to the data structure is prohibited. If not, e.g., if the protection mechanism fails, item 634 reverses the accessing of the server segments through an internal API call and NERR_InternalError is returned by termination block 636. Decision 638 determines whether the server table entry is valid. If not, termination block 640 performs a clear/free operation and returns error NERR_NoSuchServer. Decision 642 then determines whether the session table entry is valid. If not, termination block 644 performs a clear/free operation and returns error NERR_NoSuchServer. Otherwise, control then passes to item 646 to set the appropriate parameters in the session table entry according to the parmnum parameter. The session table entry is set with information from the parameter buffer. Item 648 is invoked to release a semaphore to relinquish control of the data structure. Item 650 is invoked to release server segments by calling an internal API.

Figure 7A:
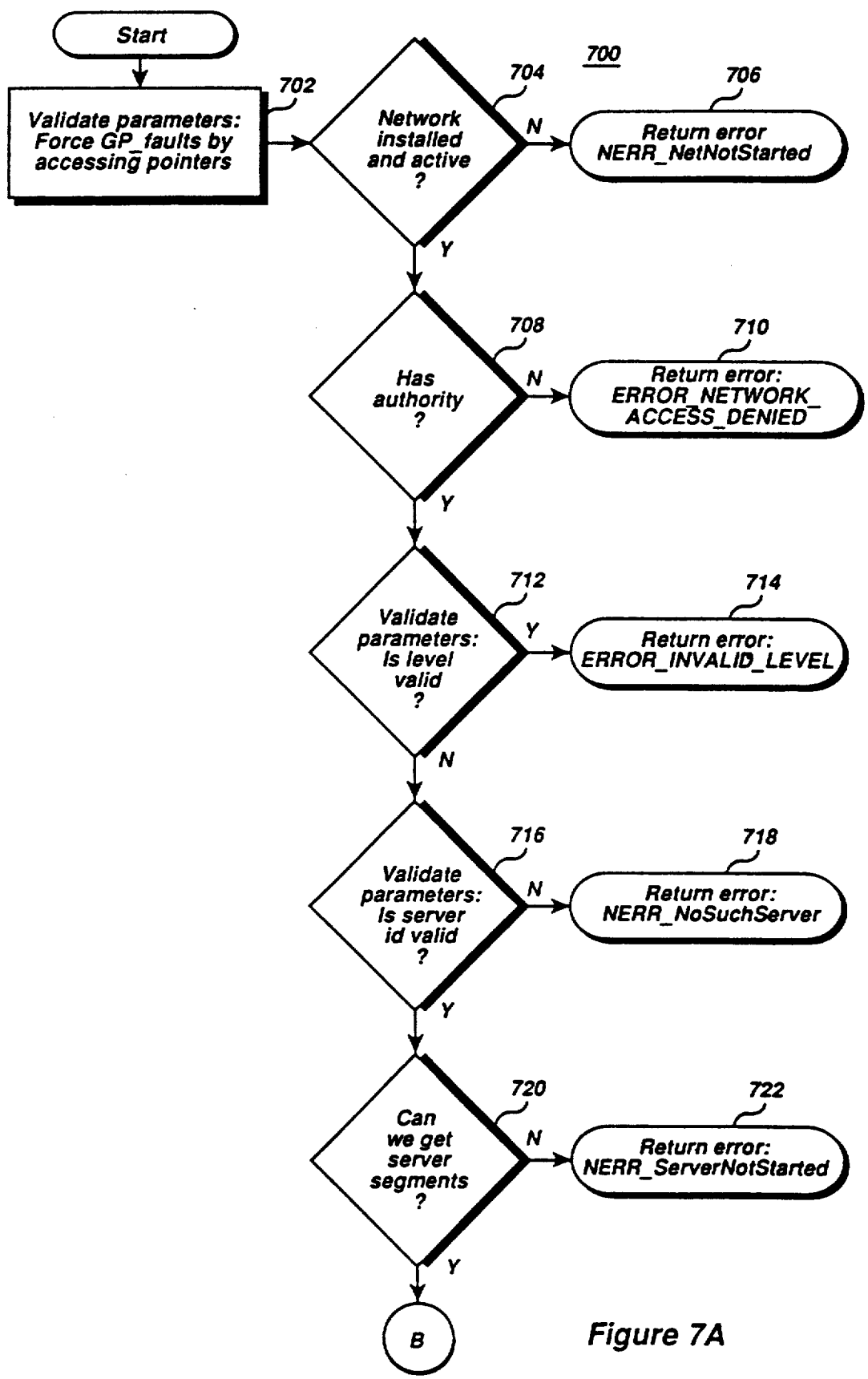
FIGS. 7A and 7B are flow diagrams detailing the operation of the NetSessionEntryGetInfo API, which is invoked to get information about a session.
Figure 7B:
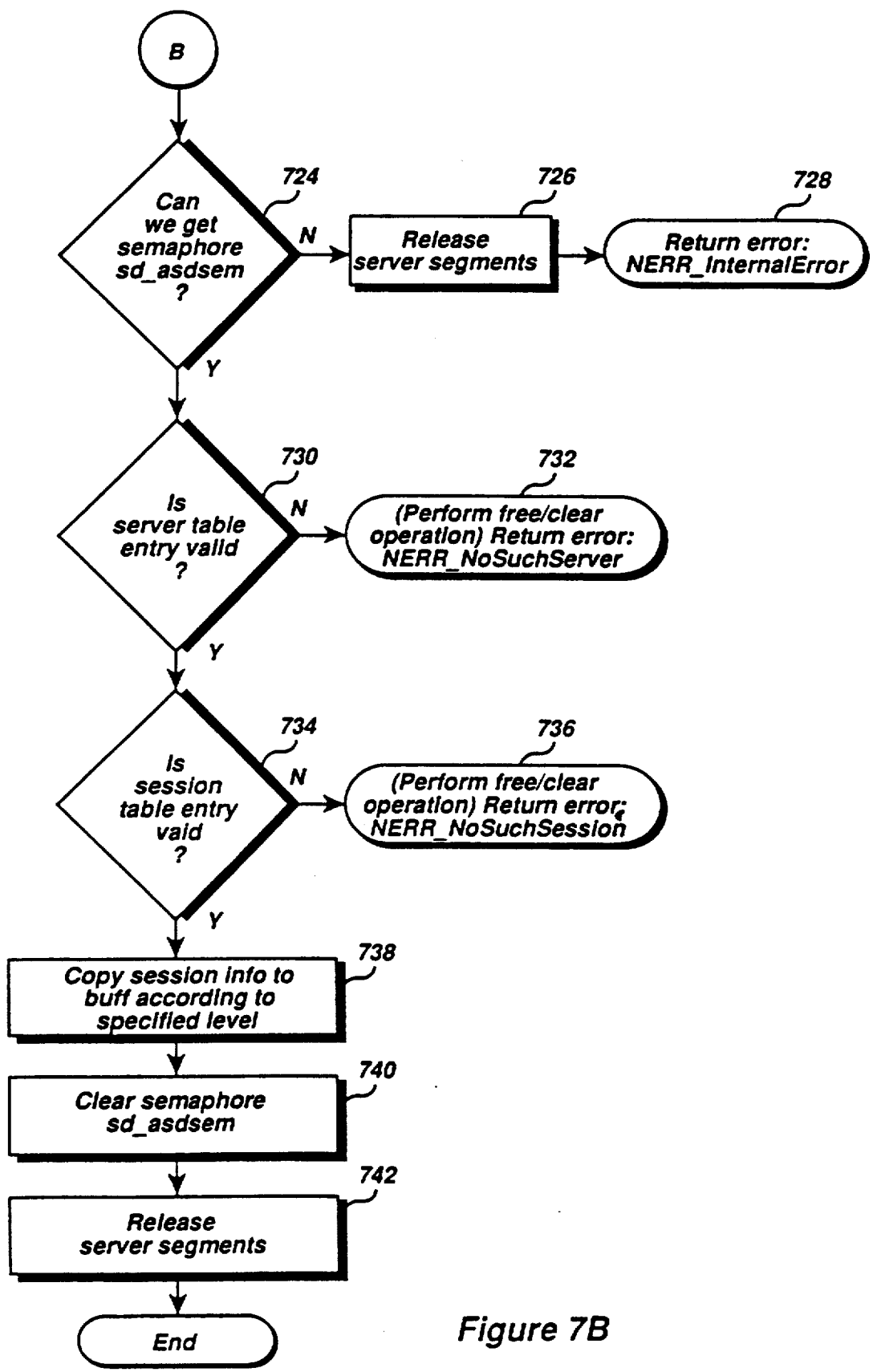
Figure 8A:
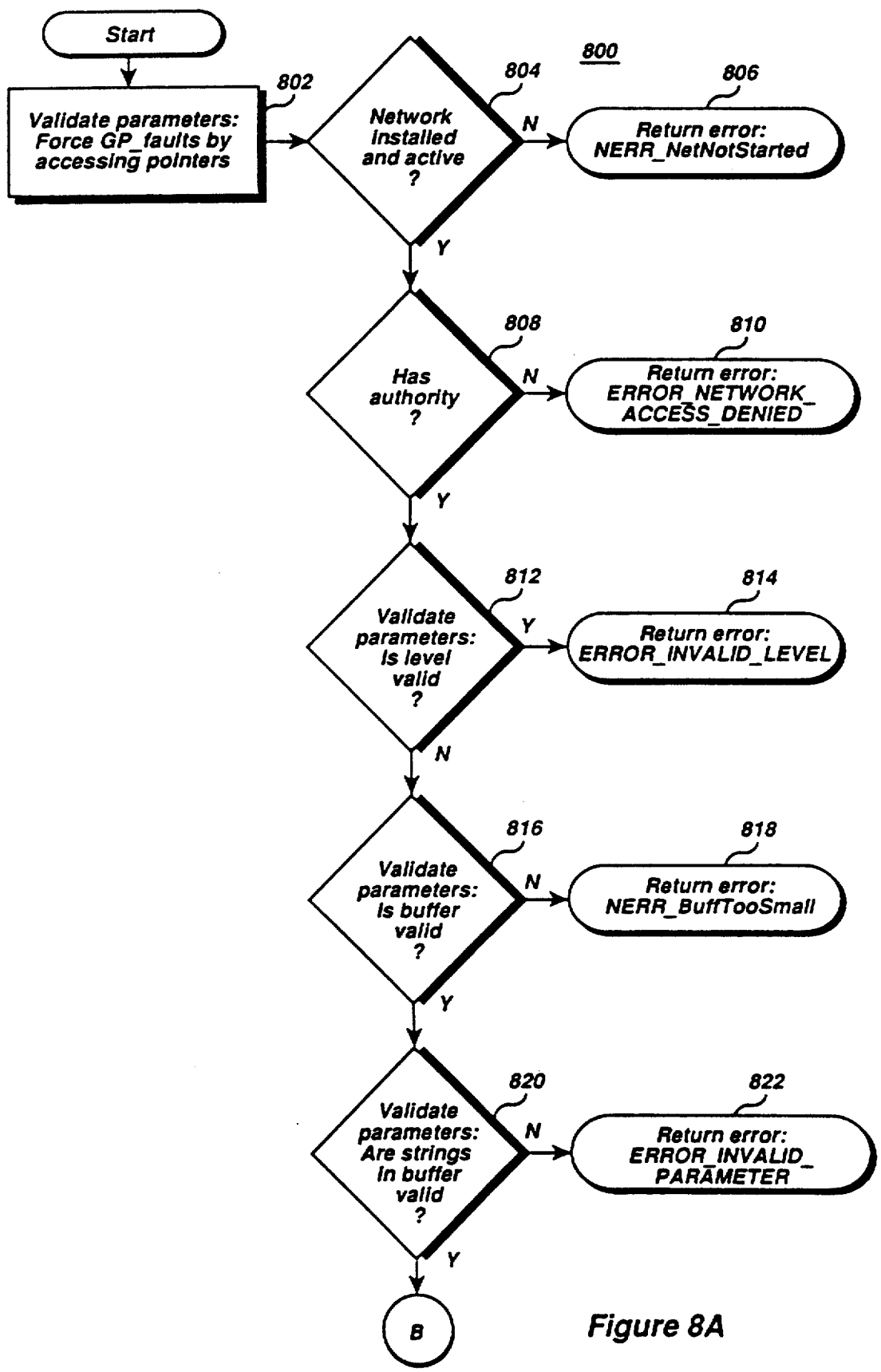
FIGS. 8A and 8D are flow diagrams of the NetConnectionEntryMake API, which is invoked to initialize a new connection entry in a data structure in the foreign server and to notify the central server that a new connection has been created.
Figure 8B:
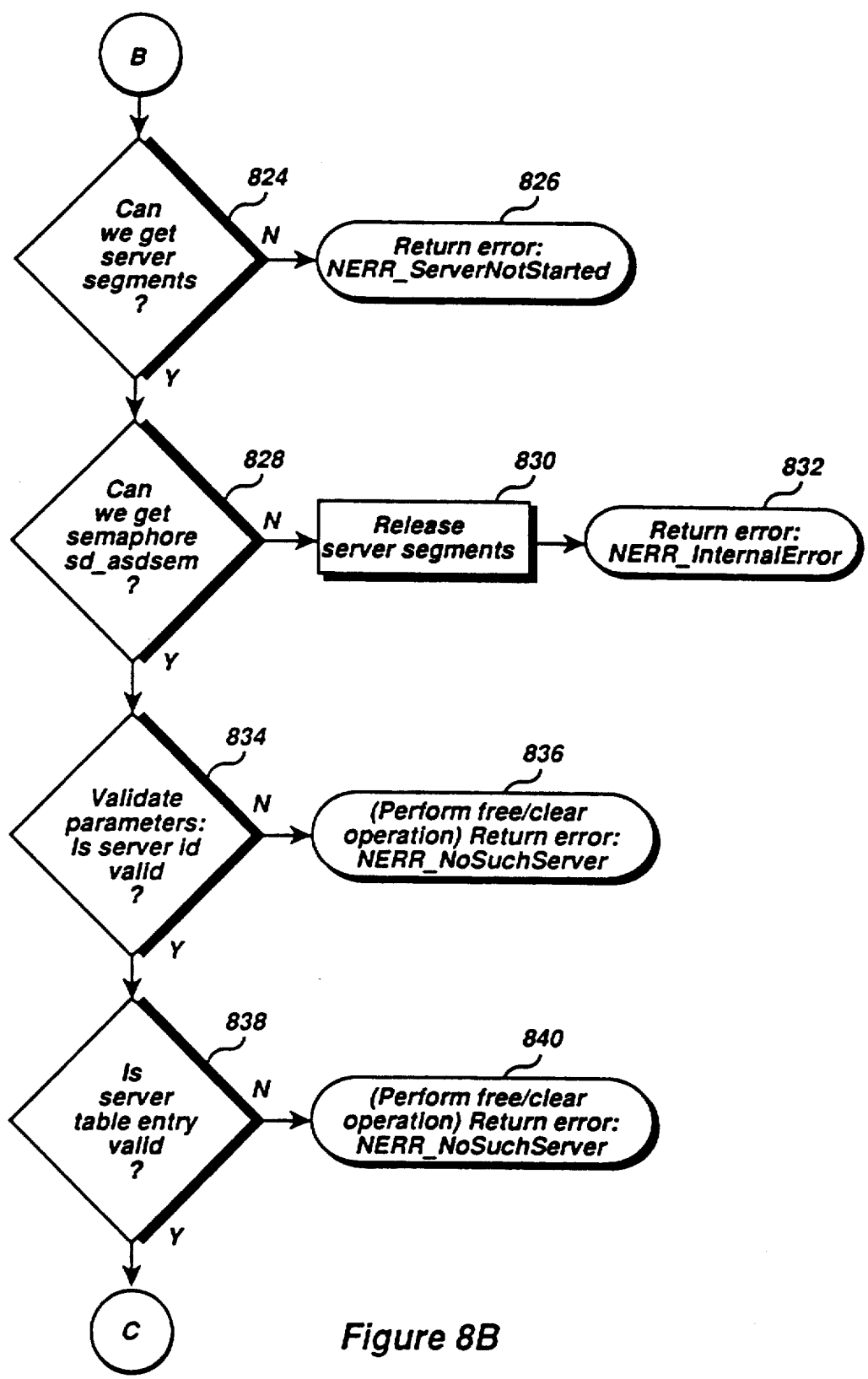
Figure 8C:
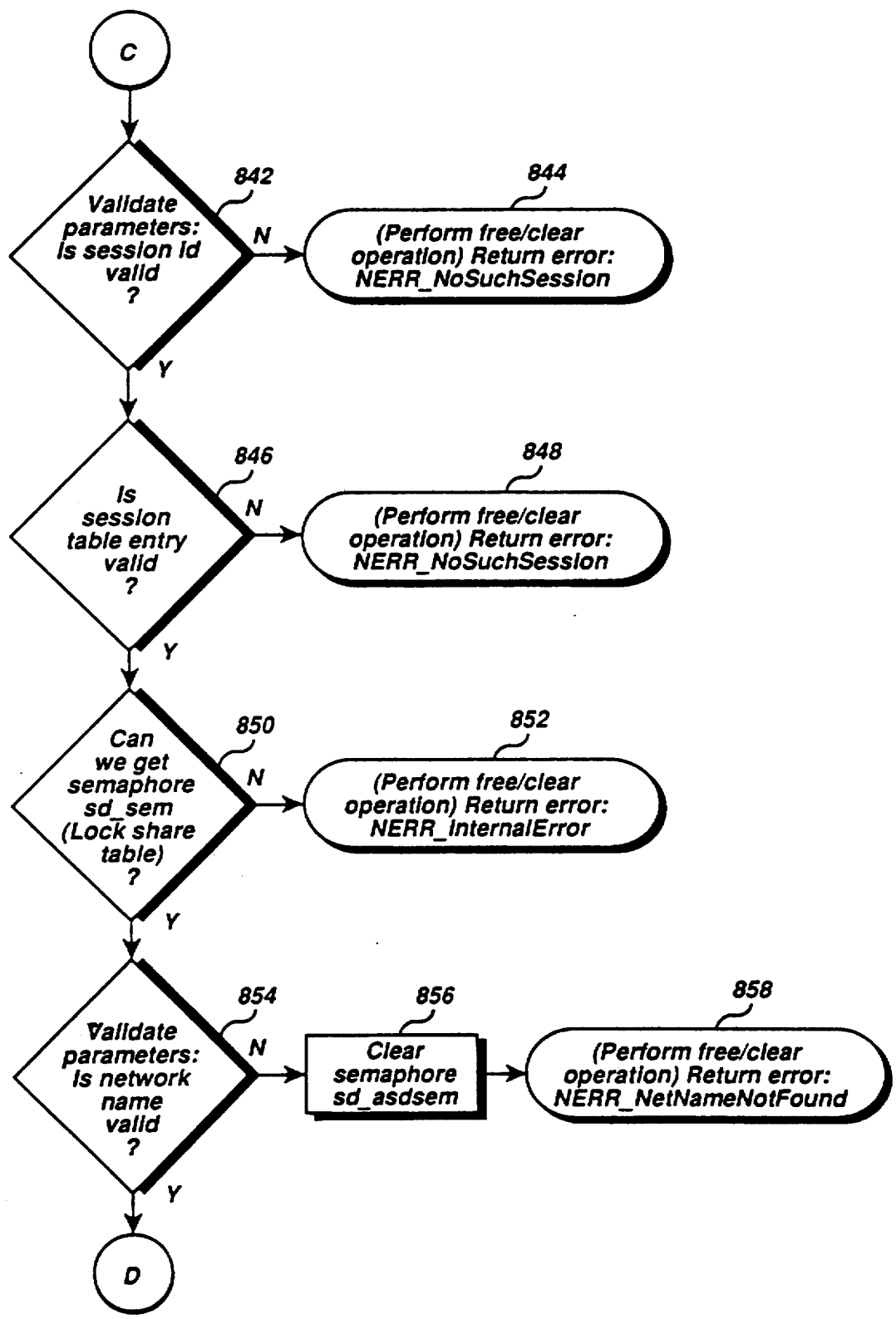
Figure 8D:
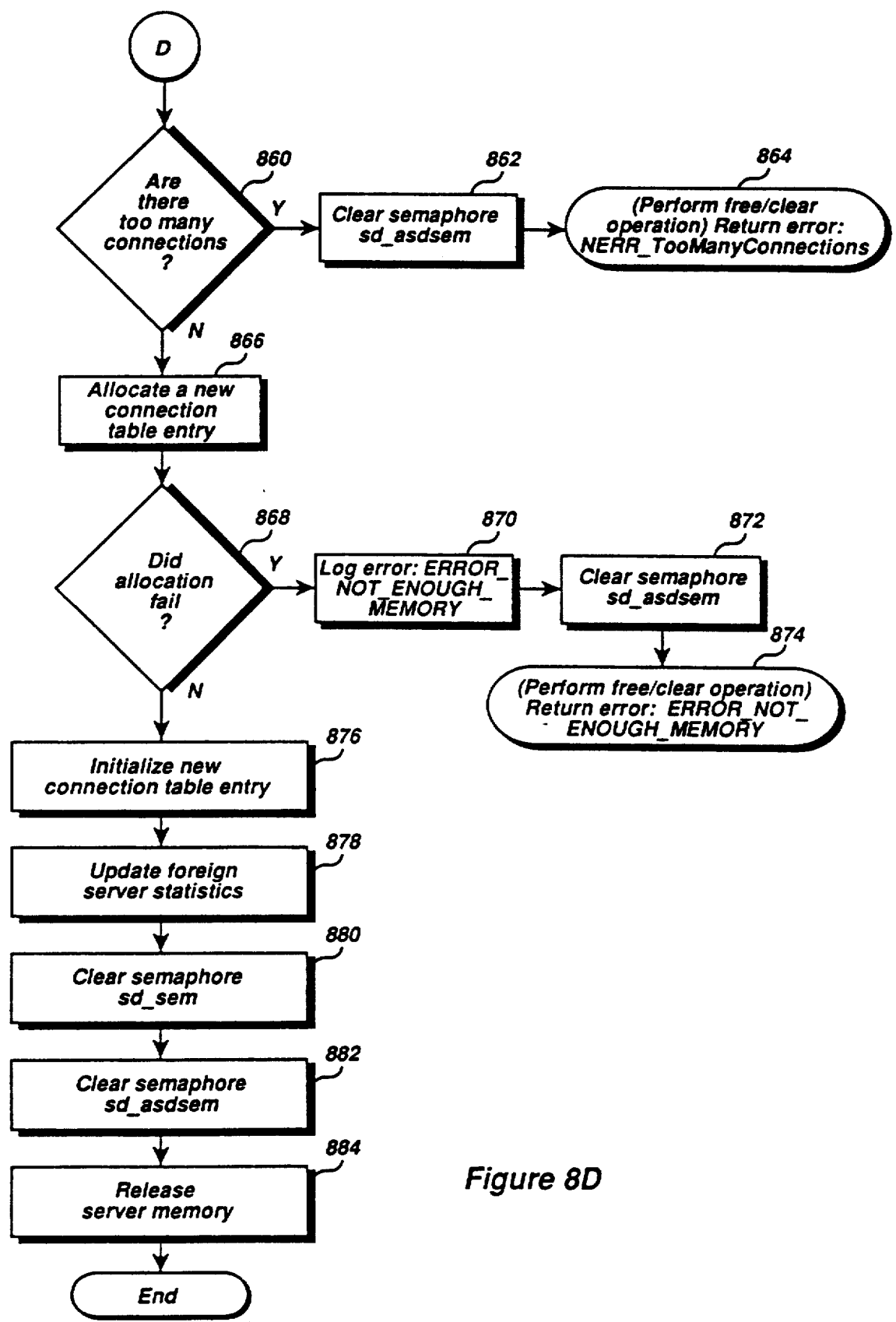

Referring now to FIGS. 7A and 7B, the I_NetSessionEntryGetInfo API 700 is invoked to get information about a session. This API is useful for determining the status of the session, such as how many connections are in the session, what clients are in the session, etc. The data structures for this API are set forth below:

```
I_NetSessionEntryGetInfo (admin, Server)
#include <netcons.h>
include <shares.h>
unsigned far pascal
```

-continued

```
I_NetSessionEntryGetInfo (server_id, sess_id, level,
buf, buflen, totalavail)
unsigned short              server_id;
unsigned short              sess_id;
short                       level;
char far*                   buf;
unsigned short              buflen;
unsigned short far*         totalavail;
where:
server_id is an integer that specifies the server that is requesting to get
the information about the entry in the table.
sess_id specifies the session whose information is sought.
level is the level of detail of the structure being sought (must be 2 in this
release).
buf is a pointer to the memory location that upon return will contain the
information.
buflen is an integer that specifies the length of the buffer.
totalavail points to an unsigned short integer telling how many bytes of
information are available.
Return Codes
NERR_Success                No errors encountered
ERROR_INVALID_PARAMETER     Invalid parameter specified
ERROR_INVALID_LEVEL         Invalid level parameter
ERROR_MORE_DATA             More data available, buffer too
                            small
NERR_NetNotStarted          Device driver not installed
NERR_ServerNotStarted       server service not installed
NERR_BufTooSmall            Buf too small for fixed-length data
NERR_NoSuchSession          Entry id is invalid
NERR_NoSuchServer           No entry for such server
```

When invoked, the process 700 begins with item 702, which performs error checking on the parameters passed to the central server, to determine whether the parameters reference is a legal location within memory. Decision 704 then determines whether the network is installed and active. If not, a NERR_NetNotStarted error code is returned to the caller in termination block 706. If decision 704 determines the network is installed and active, control passes o decision 708, which determines whether the caller has authority to invoke the API 700. If not, a ERROR_NETWORK_ACCESS_DENIED error code is returned to the caller in termination block 710. If decision 708 determines the caller has authority to proceed in the API 700, control passes to decision 712, which determines whether the data structure level of detail is valid. If not, error ERROR_INVALID_LEVEL is returned by termination block 714. Decision 716 determines whether the parameter server_id is valid. If not, termination block 716 returns NERR_NoSuchServer. Decision 720 determines whether the caller can access the central server memory. If not, error NERR_ServerNotStarted is returned by termination block 722. Decision 724 determines whether the data structure that contains the entries for the foreign servers can be protected so that multiple access to the data structure is prohibited. If not, e.g., if the protection mechanism fails, item 726 reverses the accessing of the server segments through an internal API call and NERR_InternalError is returned by termination block 728.

Decision 730 determines whether the server table entry is valid. If not, termination block 732 performs a clear/free operation and returns error NERR_NoSuchServer. Decision 734 then determines whether the session table entry is valid. If not, termination block 736 performs a clear/free operation and returns error NERR_NoSuchServer. Otherwise, control then passes to item 738 to release a semaphore to relinquish control of the data structure. Control then passes to item 740, which copies information to a parameter buffer according to a specified level. Item 742 is then invoked to release server segments by calling an internal API.

Referring now to FIGS. 8A to 8D, the I_NetConnectionEntryMake API 800 establishes a new connection in the connection table. This API is used to inform the central server of new connections. The data structure for this API is set forth below:

```
I_NetConnectionEntryMake (admin, Server)
This API creates a connection entry for the specified server and updates the
statistics for the server and the owning session.
#include <netcons.h>
include <shares.h>
unsigned far pascal
I_NetConnectionEntryMake (server_id, sess_id, level,
buf, buflen, conn_id)
unsigned short              server_id;
unsigned short              sess_id;
short                       level;
char far*                   buf;
unsigned short              buflen;
unsigned short far*         conn_id;
This API creates a new entry in the additional connections entry table.
where:
server_id is an integer that specifies the server that is requesting to
make an entry on the connections table.
```

-continued

```
sess_id is an integer that specifies the session that initiates this
connection.
level specifies the level of detail of the structure passed in the buffer
(must be 1 in this release).
buf points to the structure passed to the API that contains information
about the connection.
buflen specifies the length of the buffer being passed.
conn_id is a pointer to an unsigned long. Upon return, this parameter
contains the id with which the entry was put into the connections table.
Return Codes
NERR_Success                  No errors encountered
ERROR_INVALID_PARAMETER       Invalid parameter specified
ERROR_INVALID_LEVEL           Invalid level parameter
NERR_NetNotStarted            Device driver not installed
NERR_ServerNotStarted         Server service not installed
NERR_NoSuchSession            Session id specifies invalid entry
NERR_NoSuchServer             No entry for such server
```

When invoked, the process 800 begins with item 802, which performs error checking on the parameters passed to the central server to determine whether the parameters reference is a legal location within memory. Decision 804 then determines whether the network is installed and active. If not, a NERR_NetNotStarted error code is returned to the caller in termination block 806. If decision 804 determines the network is installed and active, control passes to decision 808, which determines whether the caller has authority to invoke the API 800. If not, a ERROR_NETWORK_ACCESS_DENIED error code is returned to the caller in termination block 810. If decision 808 determines the caller has authority to proceed in the API 800, control passes to decision 812, which determines whether the data structure level of detail is valid. If not, error ERROR_INVALID_LEVEL is returned by termination block 814. Decision 816 determines whether the buffer length parameter passed to the API is correct. If not, error NERR_BufTooSmall is returned by termination block 818. Decision 820 determines whether the pointers stored in the buffer are pointing to valid positions in memory. If not, ERROR_INVALID_PARAMETER is returned by termination block 822. Decision 824 determines whether the caller can access the central server memory. If not, error NERR_ServerNotStarted is returned by termination block 826. Decision 828 determines whether the data structure that contains the entries for the foreign servers can be protected so that multiple access to the data structure is prohibited. If not, e.g., if the protection mechanism fails, item 830 reverses the accessing of the server segments through an internal API call and NERR_InternalError is returned by termination block 832. Control then passes to decision 834, which determines whether the foreign server identification number value is within a valid range. If the foreign server identification number is not within a valid range, NERR_NoSuchServer is returned by termination block 836. Decision 838 determines whether foreign server I.D and entry in the alternate server table is valid. If not NERR_NoSuchServer is returned by termination block 840. Decision 842 determines whether the session I.D. is valid. The session I.D. is used as an index to the session table. If the session I.D. is not valid, NERR_NoSuchSession is returned by termination block 852. Decision 846 then determines whether the session table entry is valid. If not, termination block 848 performs a clear/free operation and returns error NERR_NoSuchServer. Otherwise, control then passes to item Decision 850 to determine whether the data structure that contains the entries for valid network names can be protected so that multiple access to the data structure is prohibited. If not, e.g., if the protection mechanism fails, termination block 852 reverses the accessing of the server segments through an internal API call and NERR_InternalError is returned. Decision 854 determines whether the specified connection in a central server table refers to a valid network name. If not, item 856 relinquishes control of the valid network name table by a clearing semaphore. Termination block 858 performs a clear/free operation and returns an error NERR_NetNameNotFound. If Decision 854 determines that the specified connection in a central server table refers to a valid network name, decision 860 determines whether the number of specified connections is less than a predetermined number of connections. If so, item 862 relinquishes control of the valid network name table by a clearing semaphore. Termination block 864 performs a clear/free operation and returns NERR_TooManyConnections. If there are not too many connections, item 866 allocates a new connection table entry. Decision 868 then determines whether the allocation failed. If so, item 870 logs the error. Item 872 then relinquishes control of the valid network name table by a clearing semaphore. Termination block 874 then performs a clear/free operation and returns an error ERROR_NOT_ENOUGH_MEMORY. If the allocation does succeed, item 876 initializes the new connection table entry. Item 878 then updates the foreign server statistics and item 880 relinquishes control of the valid network name table by a clearing semaphore. Item 882 is invoked to release a semaphore to relinquish control of the data structure. Item 884 is invoked to release server segments by calling an internal API.

Figure 9A:
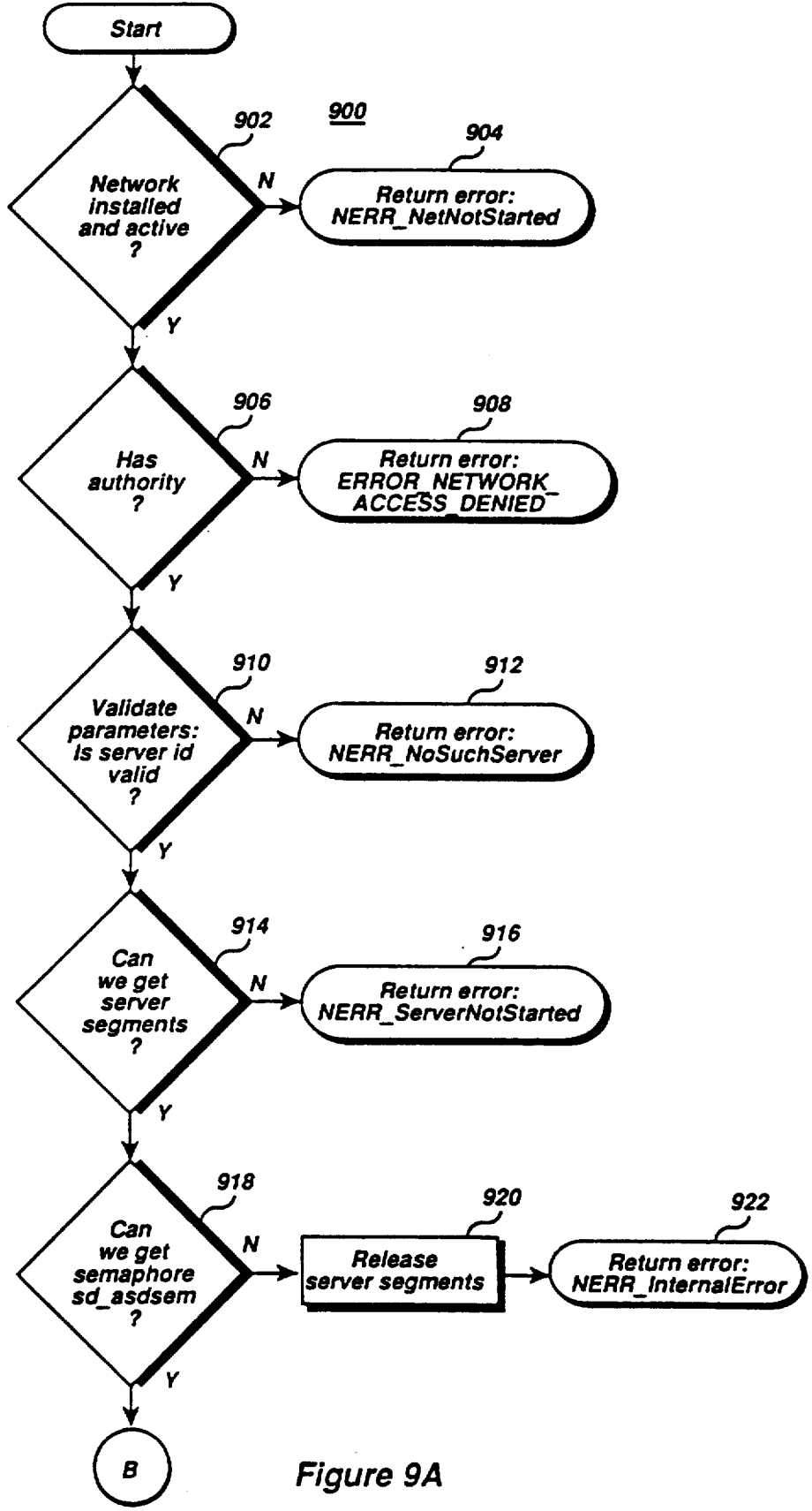
FIGS. 9A and 9B are flow diagrams of the NetConnectionEntryClear API, which is invoked to terminate a connection entry in a data structure in a foreign server and to notify the central file server that a connection has been terminated.
Figure 9B:
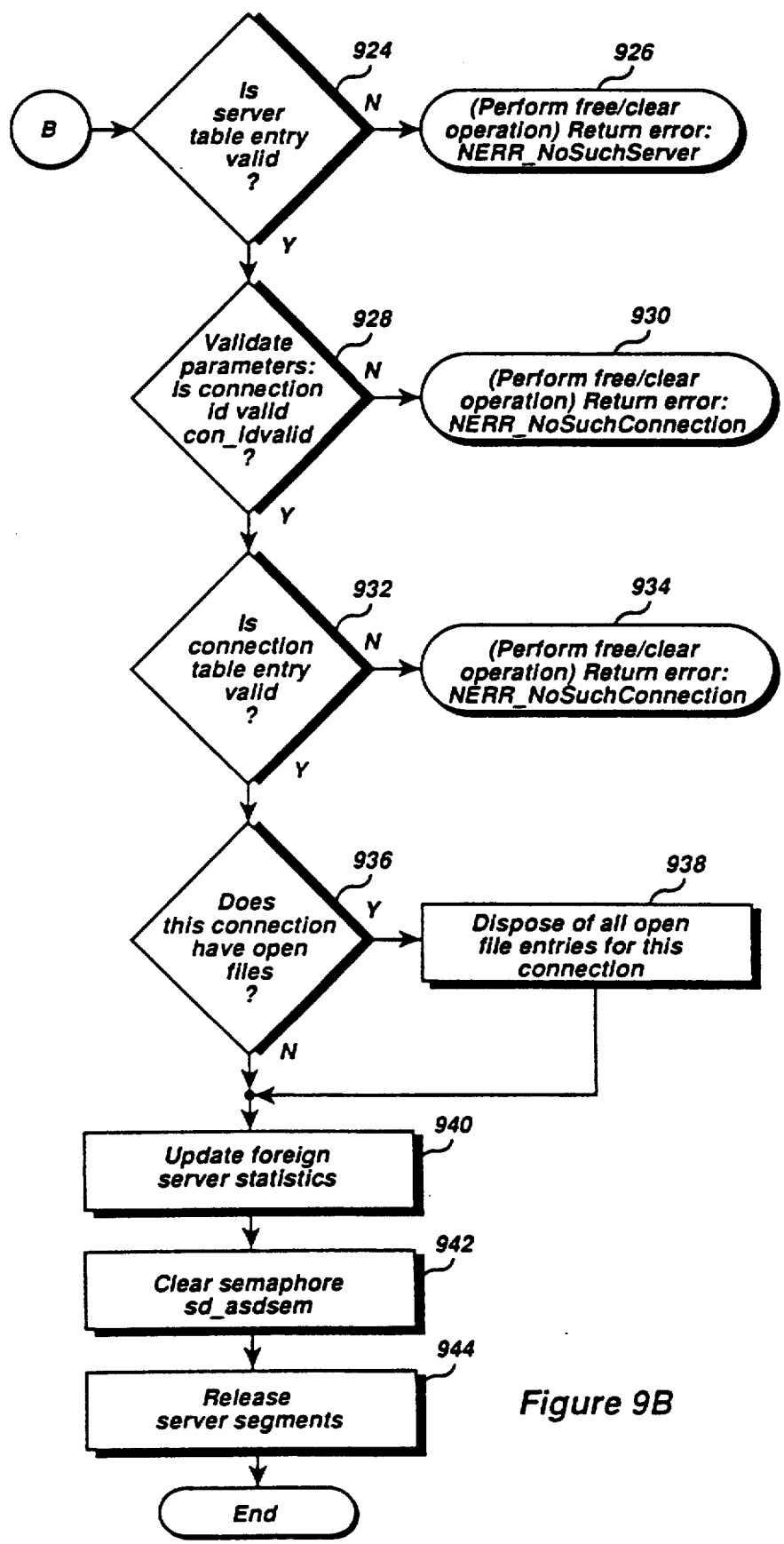

Referring now to FIG. 9A and 9B, flow diagrams of the I_NetConnectionEntryClear. When invoked, decision 902 determines whether the network is installed and active. If not, a NERR_NetNotStarted error code is returned to the caller in termination block 904. If decision 902 determines the network is installed and active, control passes to decision 906, which determines whether the caller has authority to invoke the API 900. If not, a ERROR_NETWORK_ACCESS_DENIED error code is returned to the caller in termination block 908. If decision 906 determines the caller has authority to proceed in the API 200, control passes to decision 910, which determines whether the foreign server identification number value is within a valid range. If the foreign server identification number is not within a valid range, NERR_NoSuchServer is returned by termination block 912. Decision 914 determines whether the caller can access the central server memory. If not, error NERR_ServerNotStarted is returned by termination block 916. Decision 918 determines whether the data structure that contains the entries for the foreign servers can be protected so that multiple access to the data structure is prohibited. If not, e.g., if the protection mechanism fails, item 920 reverses the accessing of the server segments through an internal API call and NERR_InternalError is returned by termination block 922. Decision 924 determines whether foreign server I.D and entry in the alternate server table is valid. If not, NERR_NoSuchServer is returned by termination block 926. Decision 928 determines whether the connection I.D. parameter (conn_id) is valid. If not, a clear/free operation is performed and error NERR_NoSuchConnection is returned by termination block 930. If decision 928 determines the connection is valid, decision 932 checks whether the connection table entry is valid. If not, termination block 934 performs a clear/free operation and returns the error NERR_NoSuchConnection. Decision 936 determines whether the connection has any open files. If so, item 938 disposes of all open file entries for this connection. If the connection has no open files, or when item 938 is complete, control passes to item 940, which updates the foreign server statistics. Item 942 is invoked to release a semaphore to relinquish control of the data structure. Item 944 is invoked to release server segments by calling an internal API.

Figure 10A:
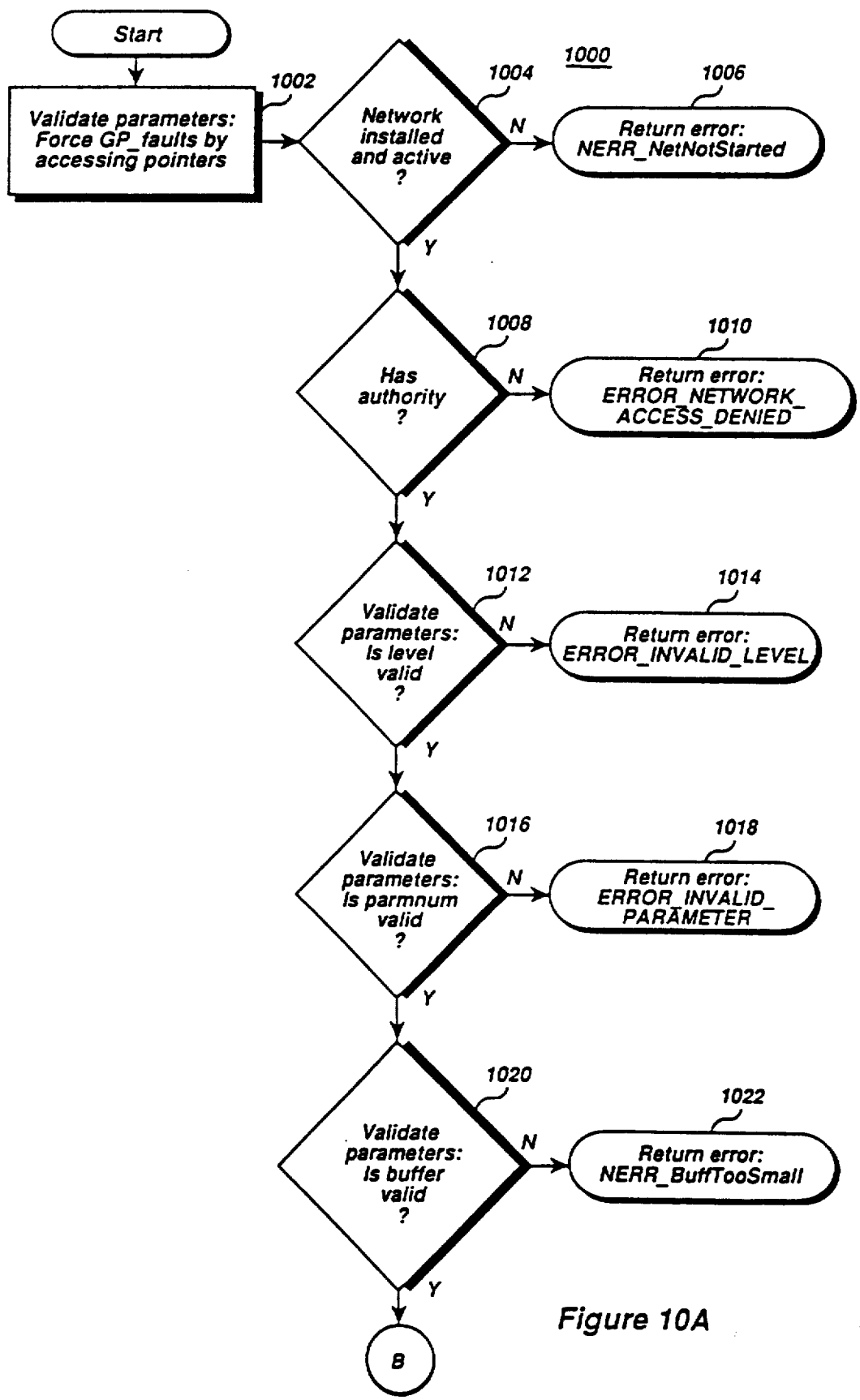
FIGS. 10A to 10C are flow diagrams detailing the operation of the I_NetConnectionEntrySetInfo API of the present invention.
Figure 10B:
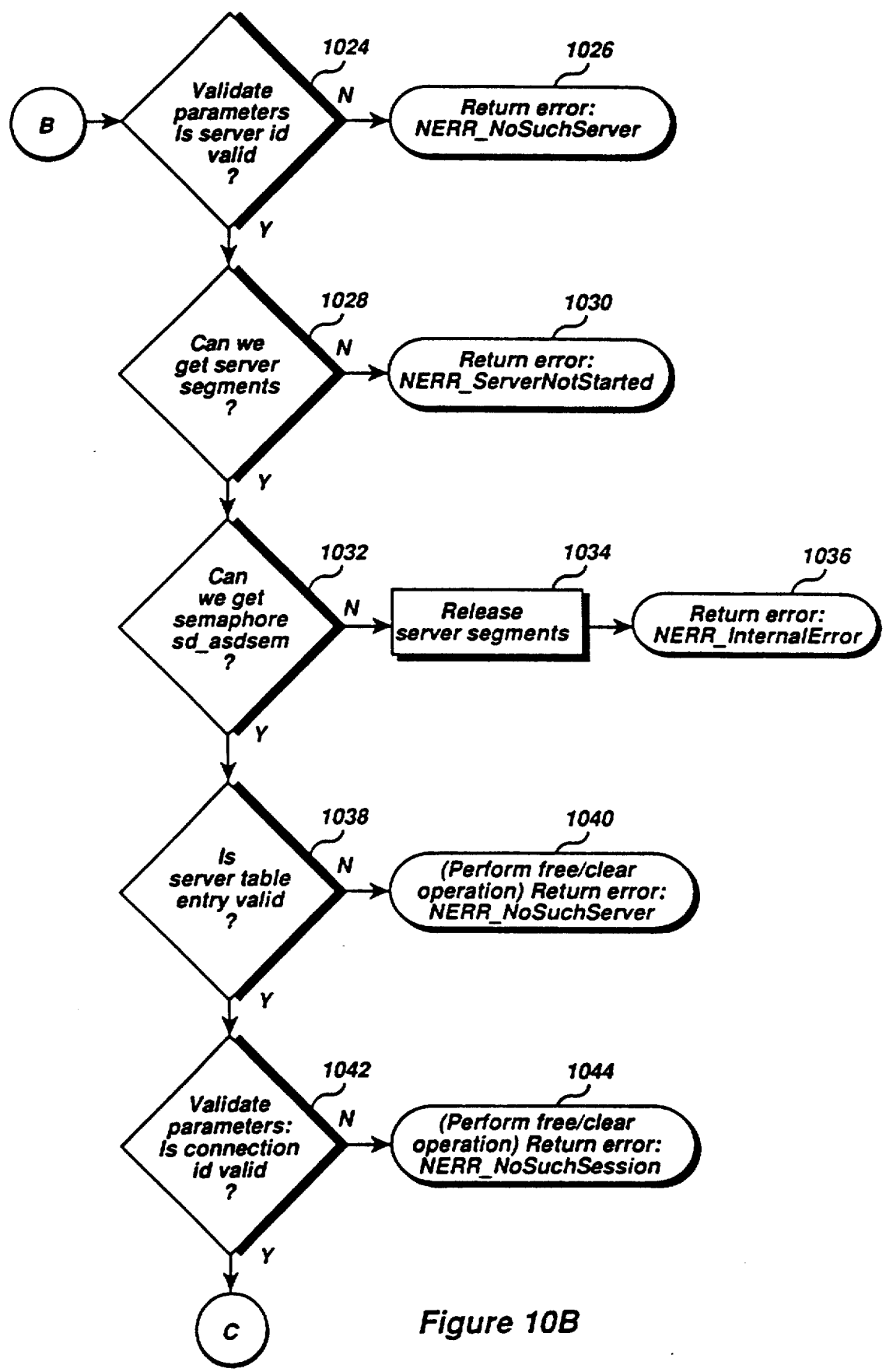
Figure 10C:
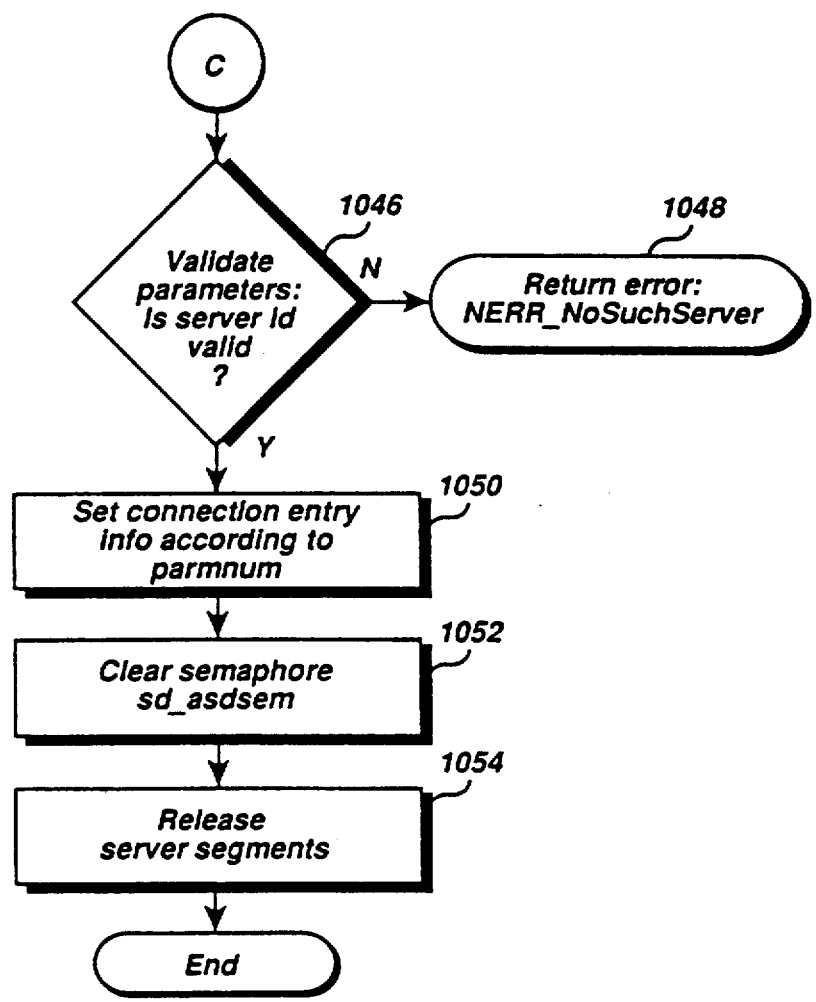

Referring now to FIGS. 10A to 10C, the I_NetConnectionEntrySetInfo API is called to set information about a connection entry and for setting the status of a connection. The data structure for this API is set forth below.

```
I_NetConnectionEntrySetInfo (admin, Server)
This API sets the information for the connection either by setting all of the setable
fields of the connection entry or the ones specified by parmnum. At the same time it
updates the information in the owning session and the server that serves this
connection.
#include <netcons.h>
include <shares.h>
unsigned far pascal
I_NetConnectionSetInfo (server_id, conn_id, level,
buf, buflen, parmnum)
unsigned short                          server_id;
unsigned short                          conn_id;
short                                   level;
char far*                               buf;
unsigned short                          buflen;
unsigned shortparmnum;
where:
server_id is an integer that specifies the server that is requesting to set the
information about the entry in the table.
conn_id specifies the connections whose information is going to be set.
level is the level of detail of the structure being passed (must be 1 in this release).
buf is a pointer to the structure that contains the information being passed.
buflen is an integer that specifies the length of the buffer containing the information
being passed.
parmnum specifies if a particular component of connection_info_1 structure or the
whole structure will be set. A value of 0 specifies the whole sturcture is being
passed. Otherwise parmnumpasses the ordinal position value for one of the
following connection_info_1 data structure components, as defined in share.h:
Manifest                        Value           Component
CON1_USERS_PARMNUM              4               coni1_num_users
CON1_TIME_PARMNUM               5               coni1_time
Return Codes
NERR_Success                                    No errors encountered
ERROR_INVALID_LEVEL                             Invalid level specified.
ERROR_INVALID_PARAMETER                         Invalid parameter specified.
NERR_NetNotStarted                              Device driver not installed
NERR_ServerNotStarted                           server service not installed
NERR_NoSuchConnection                           Entry id is invalid
NERR_NoSuchServer                               No entry for such server
```

When invoked, the process 1000 begins with item 1002, performs error checking on the parameters passed to the central server, to determine whether the parameters reference is a legal location within memory. Decision 1004 then determines whether the network is installed and active. If not, a NERR_NetNotStarted error code is returned to the caller in termination block 1006. If decision 1004 determines the network is installed and active, control passes to decision 1008, which determines whether the caller has authority to invoke the API 1000. If not, a ERROR_NETWORK_ACCESS_DENIED error code is returned to the caller in termination block 1010. If decision 1008 determines the caller has authority to proceed in the API 1000, control passes to decision 1012, which determines whether the data structure level of detail is valid. If not, error ERROR_INVALID_LEVEL is returned by termination block 1014. Decision 1016 determines whether the parmnum parameter is valid. If not, termination block 1018 returns error ERROR_INVALID_PARAMETER. If the parmnum parameter is valid, decision 1020 determines whether the buffer length parameter passed to the API is correct. If not, error NERR_BufTooSmall is returned by termination block 1022. Control then passes to decision 1024, which determines whether the foreign server identification number value is within a valid range. If the foreign server identification number is not within a valid range, NERR_NoSuchServer is returned by termination block 1026. Decision 1028 determines whether the caller can access the central server memory. If not, error NERR_ServerNotStarted is returned by termination block 1030. Decision 1032 determines whether the data structure that contains the entries for the foreign servers can be protected so that multiple access to the data structure is prohibited. If not, e.g., if the protection mechanism fails, item 1034 reverses the accessing of the server segments through an internal API call and NERR_InternalError is returned by termination block 1036. Decision 1038 determines whether foreign server I.D. entry in the alternate server table is valid. If not, NERR_NoSuchServer is returned by termination block 1040. Decision 1042 determines whether the connection I.D. parameter (conn_id) is valid. If not, a clear/free operation is performed and error NERR_NoSuchConnection is returned by termination block 1044. If decision 1042 determines the connection is valid, decision 1046 checks whether the connection table entry is valid. If not, termination block 1048 performs a clear/free operation and returns the error NERR_NoSuchConnection. Item 1050 sets connection information according to parameter parmnum. The connection information includes the number of open files owned by the connection. Item 1052 is invoked to release a semaphore to relinquish control of the data structure. Item 1054 is invoked to release server segments by calling an internal API.

Figure 11A:
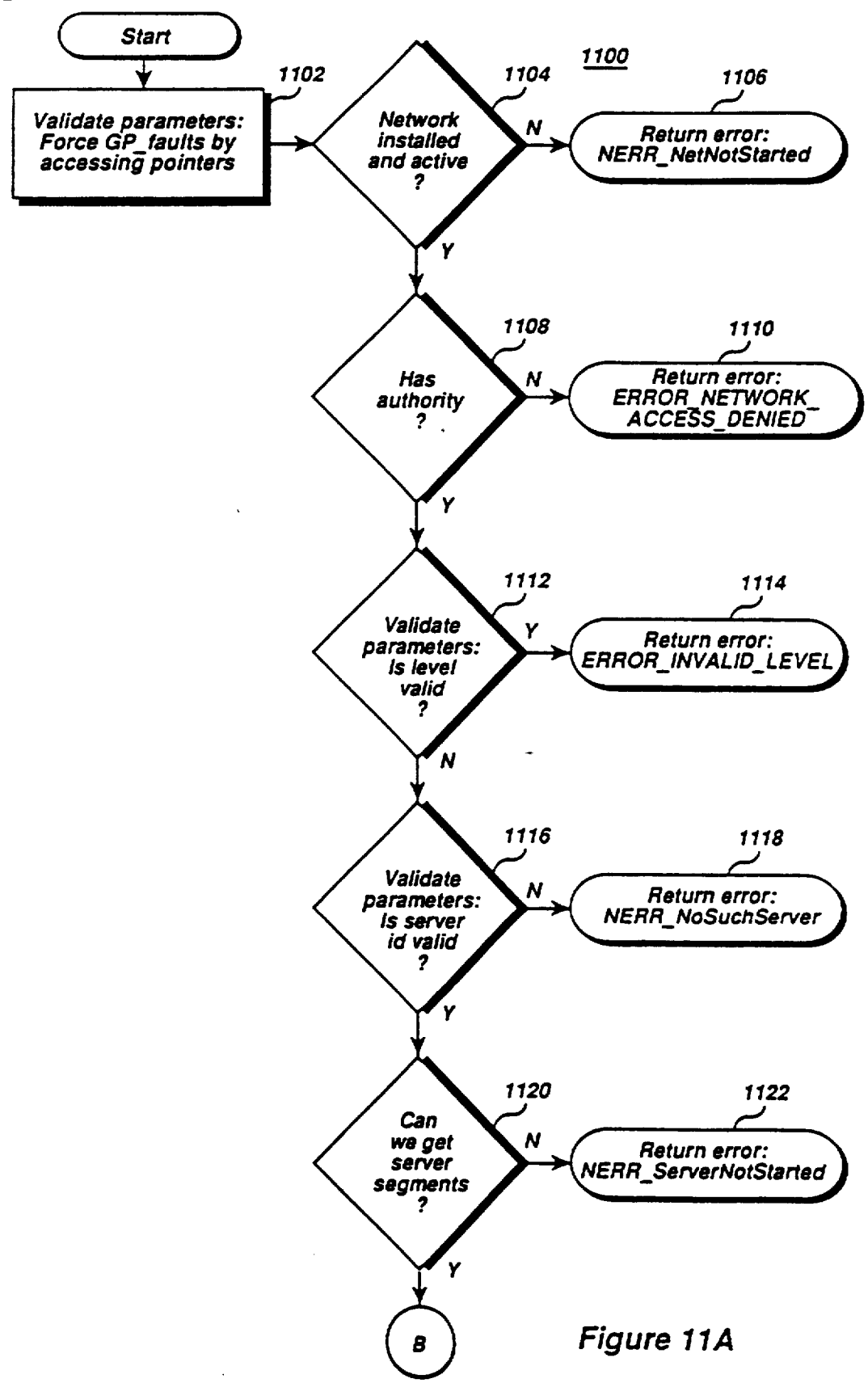
FIGS. 11A and 11B are flow diagrams of the I_NetConnectionEntryGetInfo API of the present invention.
Figure 11B:
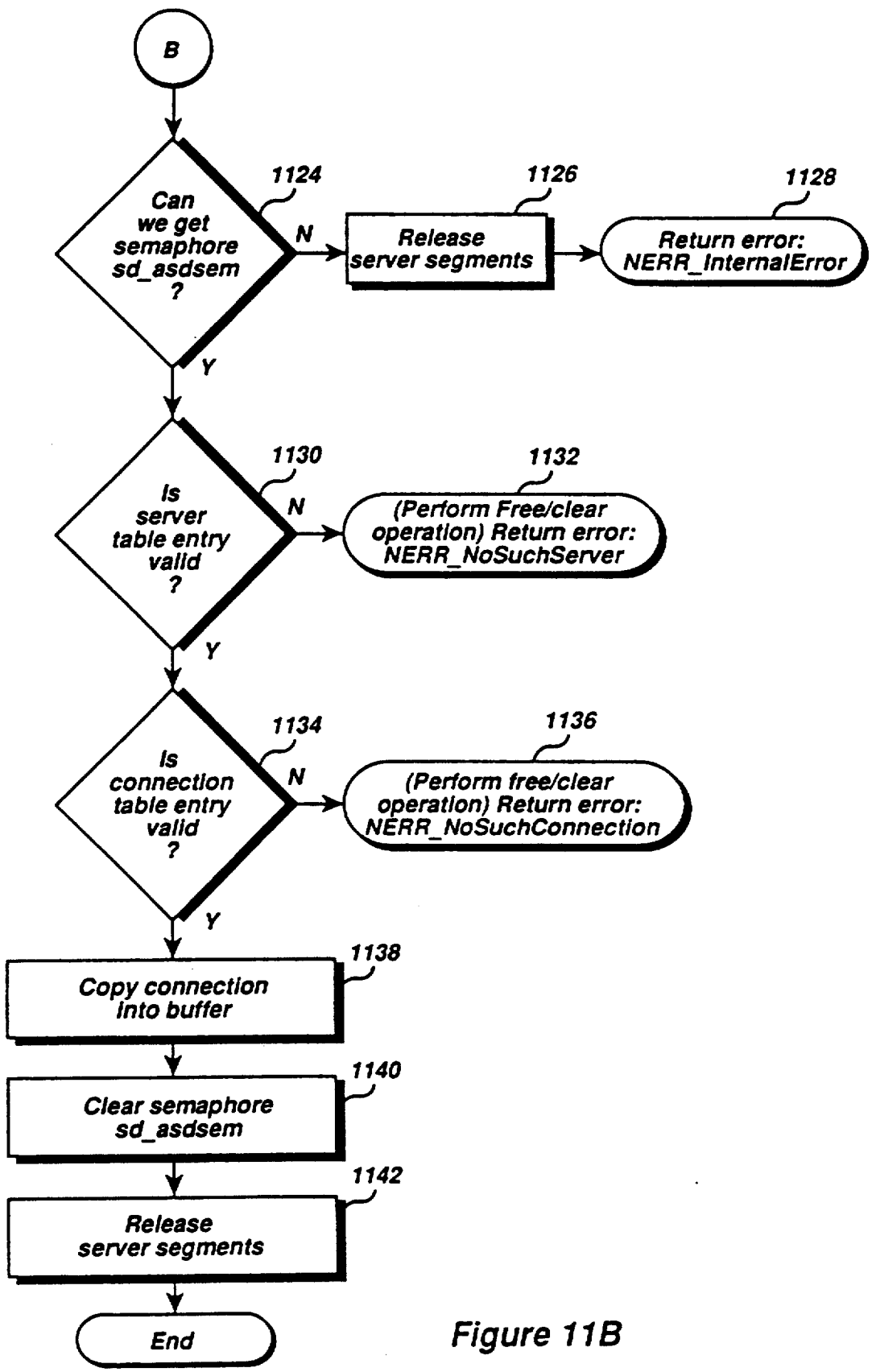

Referring now to FIGS. 11A and 11B, I_NetConnectionGetInfo API 1100 is used to retrieve information about a connection and for determining the status of a connection. The data structure for this API is set forth below:

1106. If decision 1104 determines the network is installed and active, control passes to decision 1108 which determines whether the caller has authority to invoke the API 1100. If not, a ERROR_NETWORK_ACCESS_DENIED error code is returned to the caller in termination block 1110. If decision 1108 determines the caller has authority to proceed in the API 200, control passes to decision 1112, which determines whether the data structure level of detail is zero. If not, error ERROR_INVALID_LEVEL is returned by termination block 1114. Decision 1116 determines whether the parameter server_id (server identification code) is valid. If not, termination block 118 returns NERR_NoSuchServer. Decision 1120 determines whether the caller can access the central server memory. If not, error NERR_ServerNotStarted is returned by termination block 1122. Decision 1124 determines whether the data structure that contains the entries for the foreign servers can be protected so that multiple access to the data structure is prohibited. If not, e.g., if the protection mechanism fails, item 1126 reverses the accessing of the server segments through an internal API call and NERR_InternalError is returned by termination block 1128. Decision 1130 determines Whether the server table entry is valid. If not, termination block 1132 performs a clear/free operation and returns error NERR_NoSuchServer. Decision 1134 determines whether the connection I.D. is valid. If not, termination block 1136 performs a clear/free operation and returns error NERR_NoSuchConnection. Decision 1138 determines whether the connection table entry is valid. If not, ter-

```
I_NetConnectionEntryGetInfo (admin, Server)
    #include <netcons.h>
    #include <shares.h>
    unsigned far pascal
    I_NetConnectionEntryGetInfo (server_id, conn_id,
    level, buf, buflen, totalavail)
        unsigned short        server_id;
        unsigned short        conn_id;
        short                 level;
        char far*             buf;
        unsigned short        buflen;
        unsigned short far*   totalavail;
    where:
        server_id is an integer that specifies the server that is requesting to get
        the information about the entry in the table.
        conn_id specifies the connection whose information is sought.
        level is the level of detail of the structure be ing sought (must be 1
        in this release).
        buf is a pointer to the memory location where the information will be
        stored.
        buflen is an integer that specifies the length of the buffer.
        totalavail points to an unsigned short integer telling how many bytes of
        information are available.
    Return Codes
        NERR_Success                   No errors encountered
        ERROR_INVALID_PARAMETER        Invalid parameter specified
        ERROR_INVALID_LEVEL            Invalid level parameter
        ERROR_MORE_DATA                More data available, buffer too
                                       small
        NERR_NetNotStarted             Device driver not installed
        NERR_ServerNotStarted          server service not installed
        NERR_BufTooSmall               Buf too small for fixed-length data
        NERR_NoSuchConnection          Entry id is invalid
        NERR_NoSuchServer              No entry for such server
```

When invoked, the process 1100 begins with item 1102, which performs error checking on the parameters passed to the central server, to determine whether the parameters reference is a legal location within memory. Decision 1104 then determines whether the network is installed and active. If not, a NERR_NetNotStarted error code is returned to the caller in termination block mination block 1140 performs a clear/free operation and returns error NERR_NoSuchConnection. Item 1142 is invoked to release a semaphore to relinquish control of the data structure. Item 1144 then copies connection information to the parameter (buf) according to a level specified in parameter level. Item 1146 is invoked to release server segments by calling an internal API.

Figure 12A:
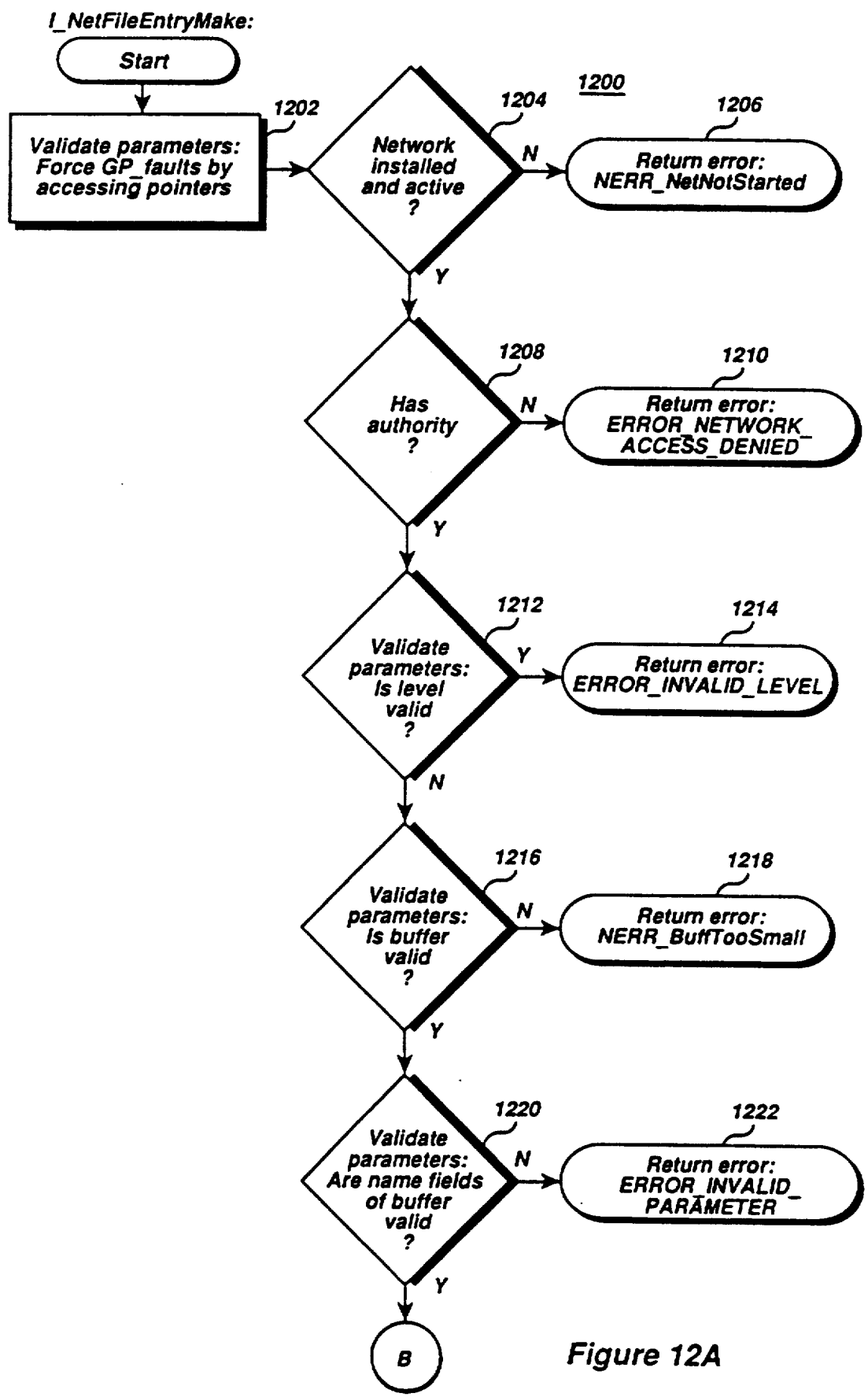
FIGS. 12A to 12C are flow diagrams of the I_NetFileEntryMake API of the present invention.
Figure 12B:
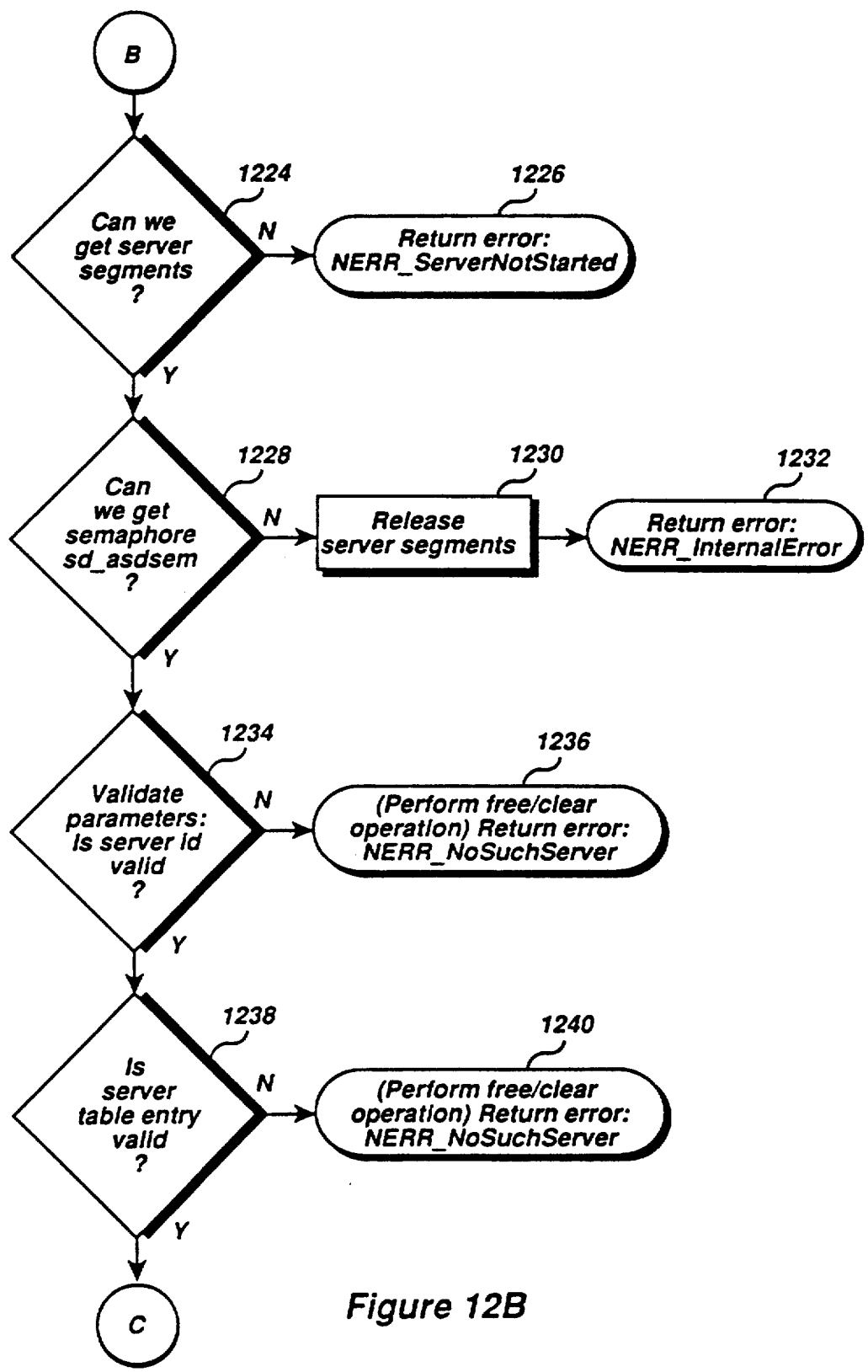
Figure 12C:
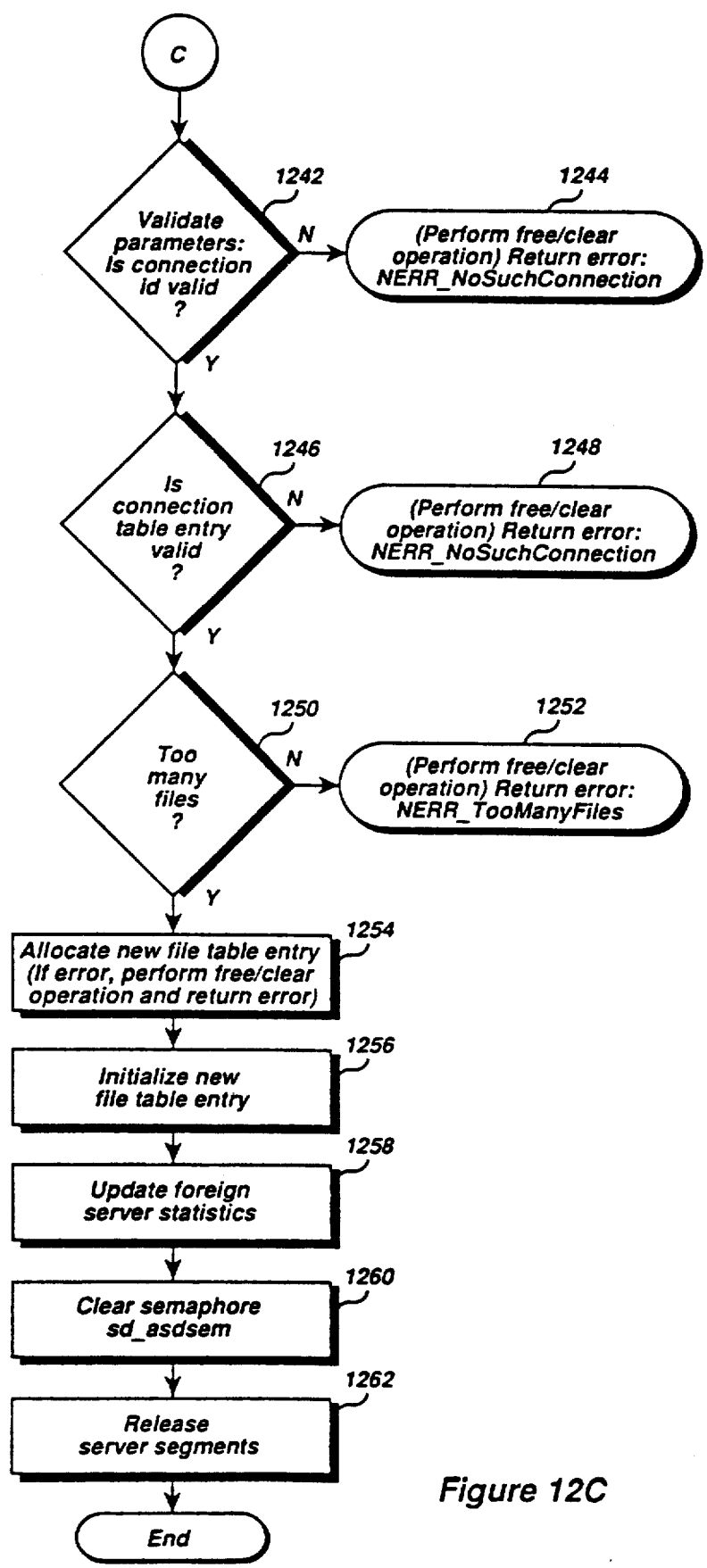

Referring now to FIGS. 12A to 12C, the I__NetFileEntryMake API 1200 informs the central server that a new file entry has been established. It is used whenever a foreign server opens a file on the central server system. The data structure is set forth below:

---

I__NetFileEntryMake (admin, Server)
    This API will create a file entry for the specified file and will return a file__id (to
    be used to reference this file). It also updates the statistics about the owning
    connection, session and server (there is no need to call I__NetSessionEntrySetinfo or
    I__NetConnectionEntrySetinfo).
        #include <netcons.h>
        #include <shares.h>
        unsigned far pascal
        I__NetFileEntryMake (server__id, conn__id, level, buf, buflen, file__id)
        unsigned short    server__id;
        unsigned short    conn__id;
        short                level;
        char far*          buf;
        unsigned short    buflen;
        unsigned long far*  file__id;
    where:
            server__id is a number that was assigned to this server when
            I__NetServerRegister was called.
            conn__id is an integer specifying the connection that owns this file entry.
            level is the level of detail of the structure being passed (must be 3 in this
            release).
            buf is a pointer to a memory location that contains the information
            about the file entry.
            buflen is the size of the buffer in which the file information is being
            stored.
    file__id is an integer that can be used to reference the entry in the file table. This
    integer will be unique for all the servers that are running
    Return Codes

| | |
|---|---|
| NERR__Success | No errors encountered |
| ERROR__INVALID__PARAMETER | Invalid parameter specified |
| ERROR__INVALID__LEVEL | Invalid level parameter |
| NERR__NetNotStarted | Device driver not installed |
| NERR__ServerNotStarted | server service not installed |
| NERR__NoSuchServer | No entry for such server |
| NERR__NoSuchConnection | Owner connection does not exist |

---

When invoked, the process 1200 begins with item 1202, which performs error checking on the parameters passed to the central server, to determine whether the parameters reference is a legal location within memory. Decision 1204 then determines whether the network is installed and active. If not, a NERR__NetNotStarted error code is returned to the caller in termination block 1206. If decision 1204 determines the network is installed and active, control passes to decision 1208, which determines whether the caller has authority to invoke the API 1200. If not, a ERROR__NETWORK__ACCESS__DENIED error code is returned to the caller in termination block 1210. If decision 1208 determines the caller has authority to proceed in the API 1200, control passes to decision 1216, which determines whether the data structure level of detail is zero. If not, error ERROR__INVALID__LEVEL is returned by termination block 1218. Decision 1220 determines whether the data strings within the buffer buf, and passed in as a parameter, are valid. If not, termination block 1120 returns ERROR__INVALID__PARAMETER. Decision 1224 determines whether the caller can access the central server memory. If not, error NERR__ServerNotStarted is returned by termination block 1226. Decision 1228 determines whether the data structure that contains the entries for the foreign servers can be protected so that multiple access to the data structure is prohibited. If not, e.g., if the protection mechanism fails, item 1230 reverses the accessing of the server segments through an internal API call and NERR__InternalError is returned by termination block 1232. Decision 1234 determines whether the parameter server__id (server identification code) is valid. If not, termination block 1236 returns NERR__NoSuchServer. Decision 1238 determines whether the server table entry is valid. If not, termination block 1240 performs a clear/free operation and returns error NERR__NoSuchServer. Decision 1242 determines whether the connection I.D. is valid. If not, termination block 1243 performs a clear/free operation and returns error NERR__NoSuchConnection. Decision 1246 determines whether the connection table entry is valid. If not, termination block 1248 performs a clear/free operation and returns error NERR__NoSuchConnection. Decision 1250 determines whether the number of files exceed a predetermined maximum value. If so, termination block 1252 performs a clear/free operation and returns NERR__TooManyFiles. If the number of files is less than a predetermined maximum value, item 1254 allocates a new file table entry. If the allocation fails, item 1254 first logs the error, performs a clear/free operation and returns ERROR__NOT__ENOUGH__MEMORY. Item 1256 then initializes the file table entry. Item 1258 then updates the foreign server statistics. Item 1260 is invoked to release a semaphore to relinquish control of the data structure. Item 1262 is invoked to release server segments by calling an internal API.

Figure 13A:
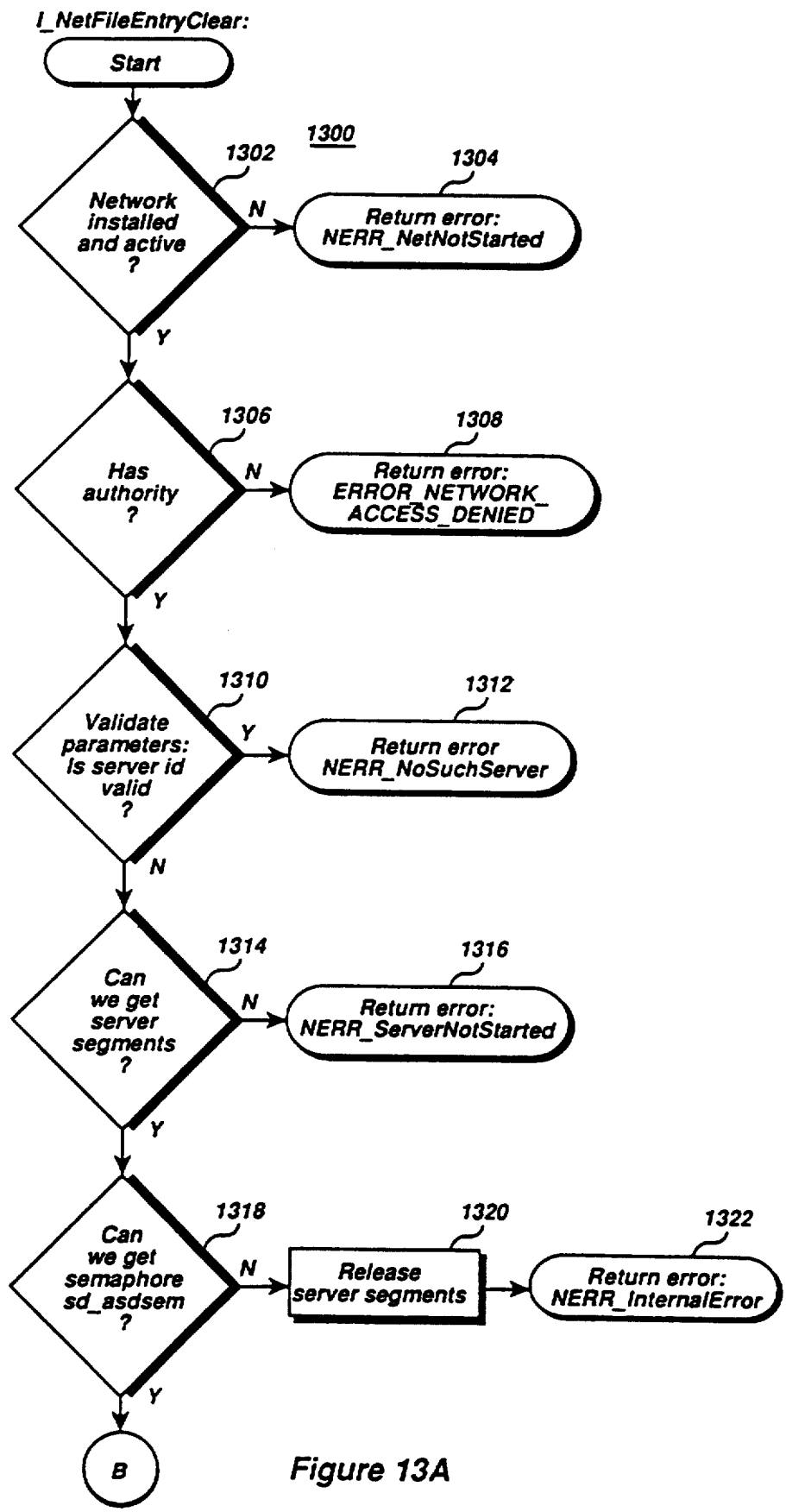
FIGS. 13A and 13B are flow diagrams of the I_NetFileEntryClear API of the present invention.
Figure 13B:
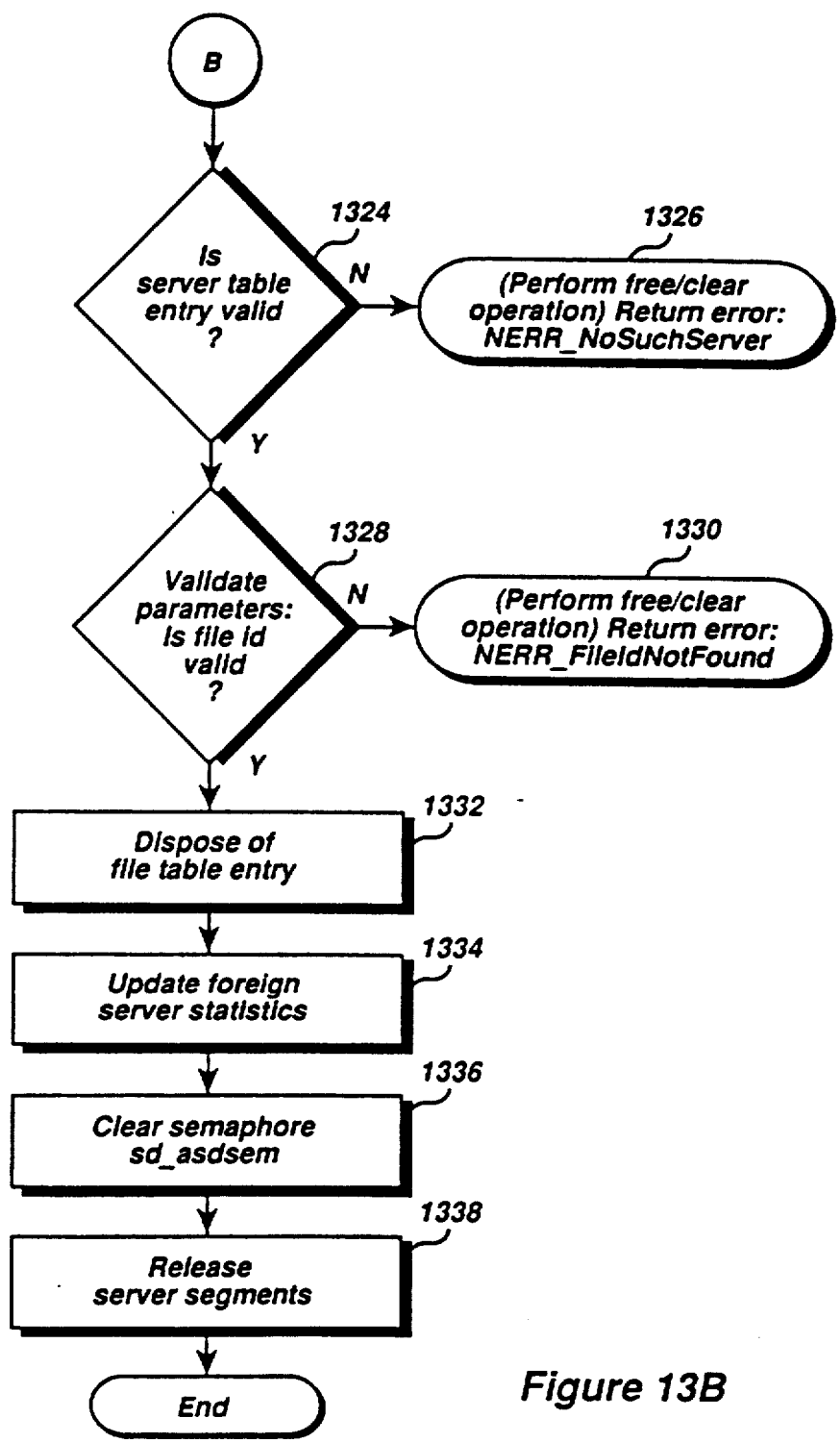

Referring now to FIGS. 13A and 13B, the I__NetFileEntryClear API 1300 removes a file entry from the file table. It is used to inform the central server that a particular file entry is no longer of interest. The data structures used with this API are set forth below:

```
l_NetFile EntryClear (admin, Server)
    This API disposes of the file entry for the file specified by file_id and it updates the
    information stored for the owning connection, session and server.
        #include <netcons.h>
        #include <shares.h>
        unsigned far pascal
        l_NetFileEntryClear (server_id, file_id)
        unsigned short    server_id;
        unsigned long     file_id;
        where:
                server_id is a number that was assigned to this server when
                l_NetServerRegister was called.
                file_id is a long integer that specifies which entry in the file
                table to be deleted.
        Return Codes
            NERR_Success              No errors encountered
            NERR_NetNotStarted        Device driver not installed
            NERR_ServerNotStarted     server service not installed
            NERR_FileIdNotFound       Entry id is invalid
            NERR_NoSuchServer         No entry for such server
```

When invoked, decision 1302 determines whether the network is installed and active. If not, a NERR_NetNotStarted error code is returned to the caller in termination block 1304. If decision 1302 determines the network is installed and active, control passes to decision 1306, which determines whether the caller has authority to invoke the API 1300. If not, a ERROR_NETWORK_ACCESS_DENIED error code is returned to the caller in termination block 1308. If decision 1306 determines the caller has authority to proceed in the API 1300, control passes to decision 1310, which determines whether the parameter server_id (server identification code) is valid. If not, termination block 1312 returns NERR_NoSuchServer. Decision 1314 determines whether the caller can access the central server memory. If not, error NERR_ServerNotStarted is returned by termination block 1316. Decision 1318 determines whether the data structure that contains the entries for the foreign servers can be protected so that multiple access to the data structure is prohibited. If not, e.g., if the protection mechanism fails, item 1320 reverses the accessing of the server segments through an internal API call and NERR_InternalError is returned by termination block 1322. Decision 1324 determines whether the server table entry is valid. If not, termination block 1326 performs a clear/free operation and returns error NERR_NoSuchServer. Decision 1328 determines whether the file identification number is valid. If not, termination block 1330 performs a clear/free operation and returns error NERR_FileIdNotFound. Otherwise, item 1332 deletes the file table entry, as the file is no longer active. Item 1334 then updates the foreign server statistics in the relevant tables, e.g., in the session and communication tables, etc. Item 1336 is invoked to release a semaphore to relinquish control of the data structure. Item 1338 is invoked to release server segments by calling an internal API call.

Figure 14A:
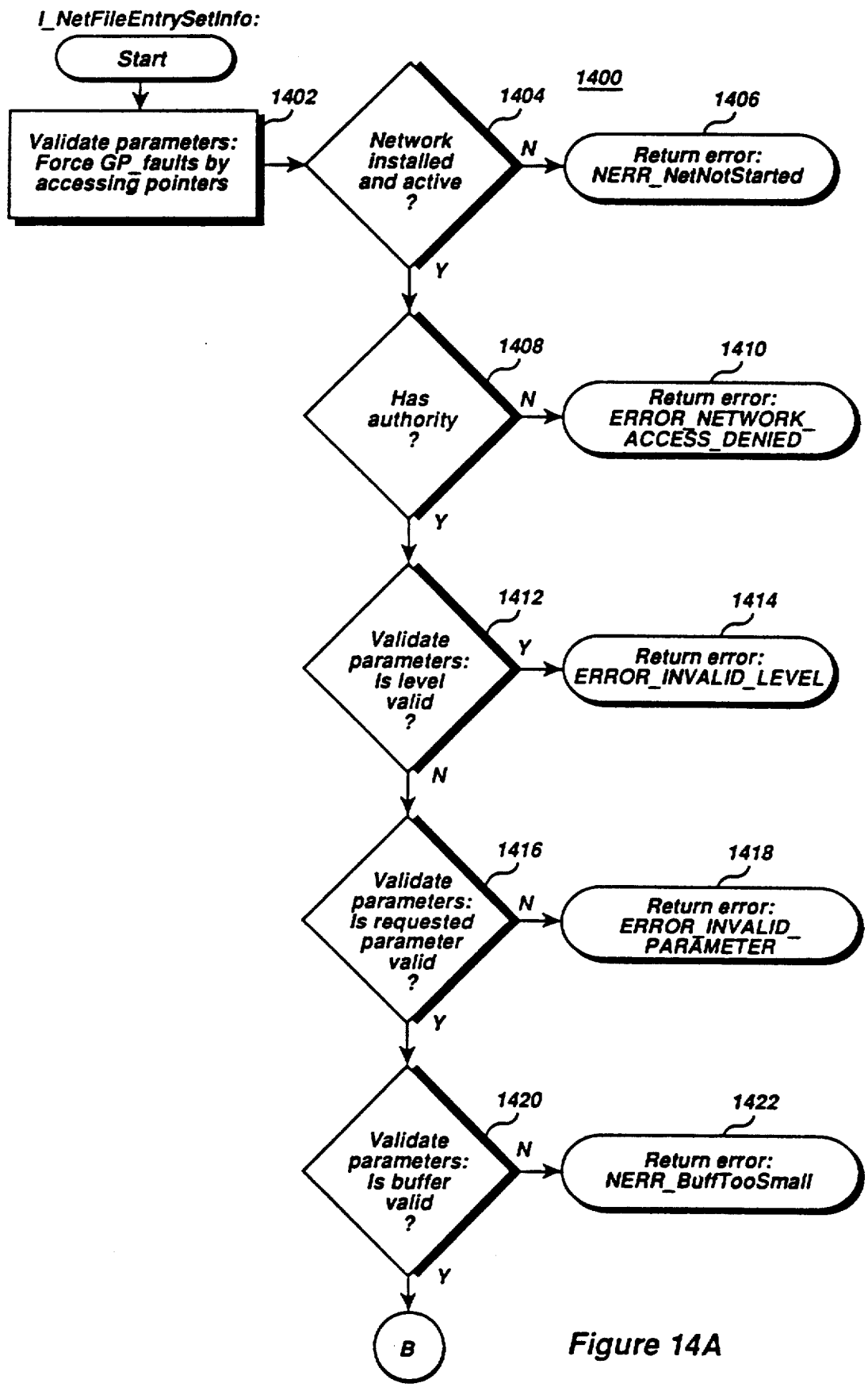
FIGS. 14A to 14C are flow diagrams of the I_NetFileEntrySetInfo API of the present invention.
Figure 14B:
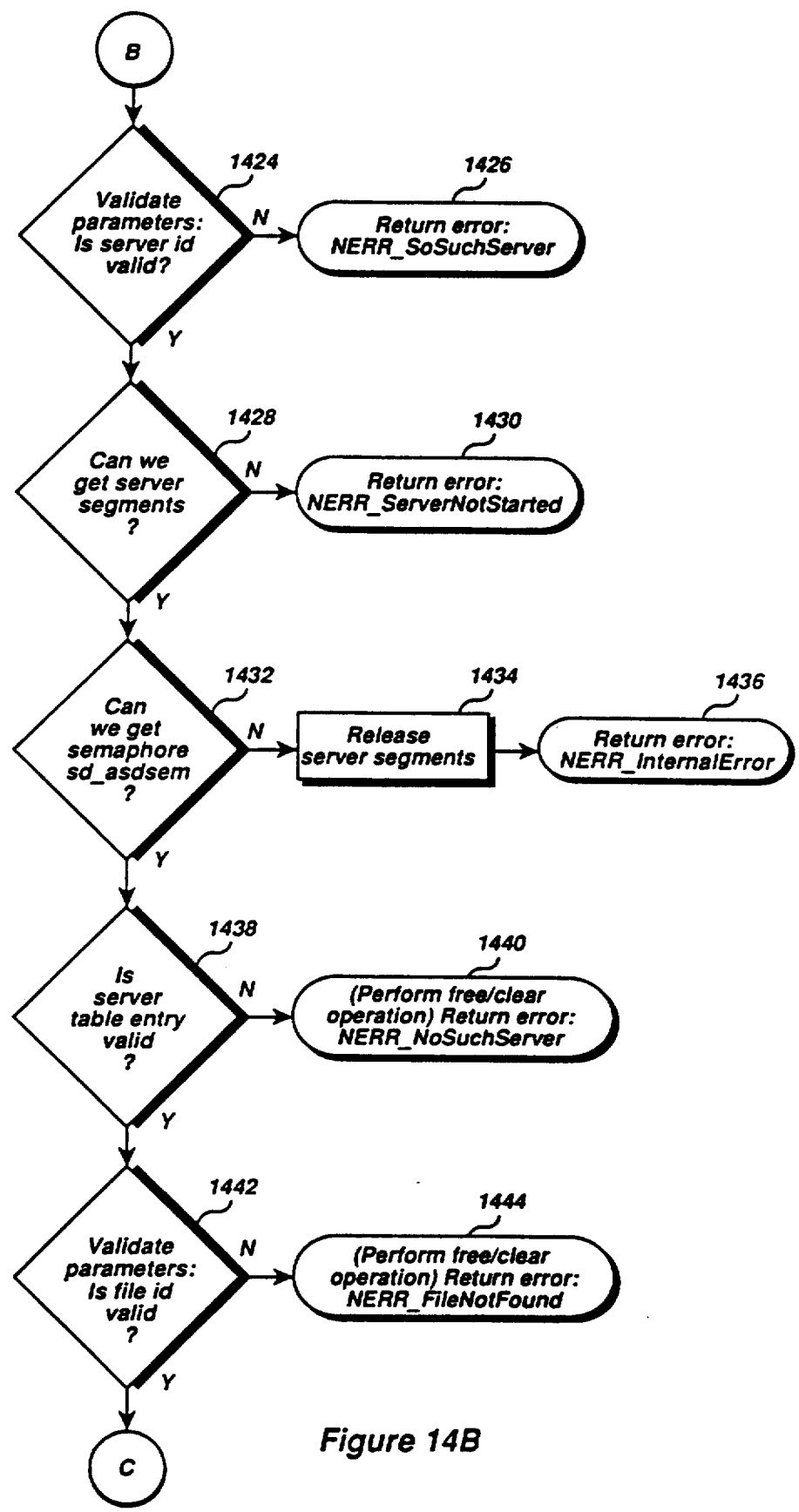
Figure 14C:
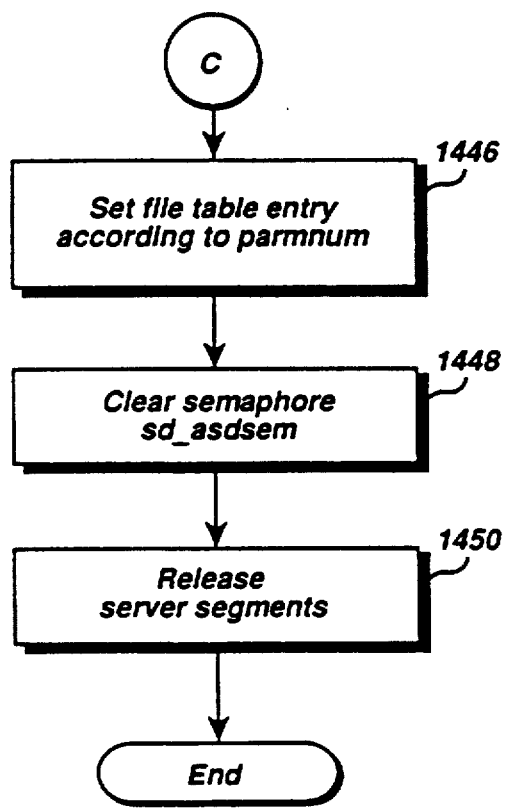

Referring now to FIGS. 14A to 14C, the l_NetFileEntrySetInfo API 1400 allows a foreign server to set file table information in the central server. This is typically used to set information, such as the number of locks on a file, or to set the user level of a file. The data structure for this API is set forth below:

```
l_NetFileEntrySetInfo (admin, Server)
    This API sets either all of the setable fields or the named field of the file specified by
    file_id.
        #include <netcons.h>
        #include <shares.h>
        unsigned far pascal
        l_NetFileEntrySetinfo (server_id, file_id, level, buf, buflen, parmnum)
        unsigned short    server_id;
        unsigned long     file_id;
        short             level;
        char far*         buf;
        unsigned short    buflen;
        unsigned short    parmnum;
        where:
                server_id is an integer that specifies the server that is requesting to set
                the information about the entry in the table.
                file_id specifies the file whose information is being set.
                level is the level of detail of the structure being passed (must be 3 in this
                release).
                buf is a pointer to the structure that contains the information for the file
                id.
                buflen is an integer that specifies the length of the buffer containing the
                information being passed.
                parmnum specifies if a particular component of the file_info_3 structure
                or the whole structure will be set. A value of 0 specifies the whole
                structure is being passed. Otherwise parmnum must pass the ordinal
                position value for one of the following file_info_3 data structure
                components, as defined in shares.h:
                Manifest           Value Component
                FILI_LOCKS_PARMNUM    3  fi3_num_locks
        Return Codes
```

-continued

| | |
|---|---|
| NERR_Success | No errors encountered |
| ERROR_INVALID_LEVEL | Invalid level specified |
| ERROR_INVALID_PARAMETER | Invalid parameter specified. |
| NERR_NetNotStarted | Device driver not installed |
| NERR_ServerNotStarted | server device not installed |
| NERR_FileIdNotFound | Entry id is invalid |
| NERR_NoSuchServer | No entry for such server |

When invoked, the process 1400 begins with item 1402, which performs error checking on the parameters passed to the central server, to determine whether the parameters reference is a legal location within memory. Decision 1404 then determines whether the network is installed and active. If not, a NERR_NetNotStarted error code is returned to the caller in termination block 1406. If decision 1404 determines the network is installed and active, control passes to decision 1408, which determines whether the caller has authority to invoke the API 1400. If not, a ERROR_NETWORK_ACCESS_DENIED error code is returned to the caller in termination block 1410. If decision 1408 determines the caller has authority to proceed in the API 1400, control passes to decision 1412, which determines whether the data structure level of detail is zero. If not, error ERROR_INVALID_LEVEL is returned by termination block 1414. Decision 1416 then determines whether the parameter parmnum (parameter number) is valid. If not, termination block 1418 returns error ERROR_INVALID_PARAMETER. Decision 1420 determines whether the buffer length parameter passed to the API is correct. If not, error NERR_BufTooSmall is returned by termination block 1422. Decision 1424 determined whether the parameter server_id (server identification code) is valid. If not, termination block 1426 returns NERR_NoSuchServer. Decision 1428 determined whether the caller can access the central server memory. If not, error NERR_ServerNotStarted is returned by termination block 1430. Decision 1432 determines whether the data structure that contains the entries for the foreign servers can be protected so that multiple access to the data structure is prohibited. If not, e.g., if the protection mechanism fails, item 1434 reverses the accessing of the server segments through an internal API call, and NERR_InternalError is returned by termination block 1436. Decision 1438 determines whether the server table entry is valid. If not, termination block 1440 performs a clear/free operation and returns error NERR_NoSuchServer. Decision 1442 determined whether the file identification number is valid. If not, termination block 1444 performs a clear/free operation and returns error NERR_FileIdNotFound. Otherwise, item 1446 sets the file table entry according to the parameter (parmnum). Item 1448 is invoked to release a semaphore to relinquish control of the data structure. Item 1450 is invoked to release server segments by calling an internal API.

Figure 15A:
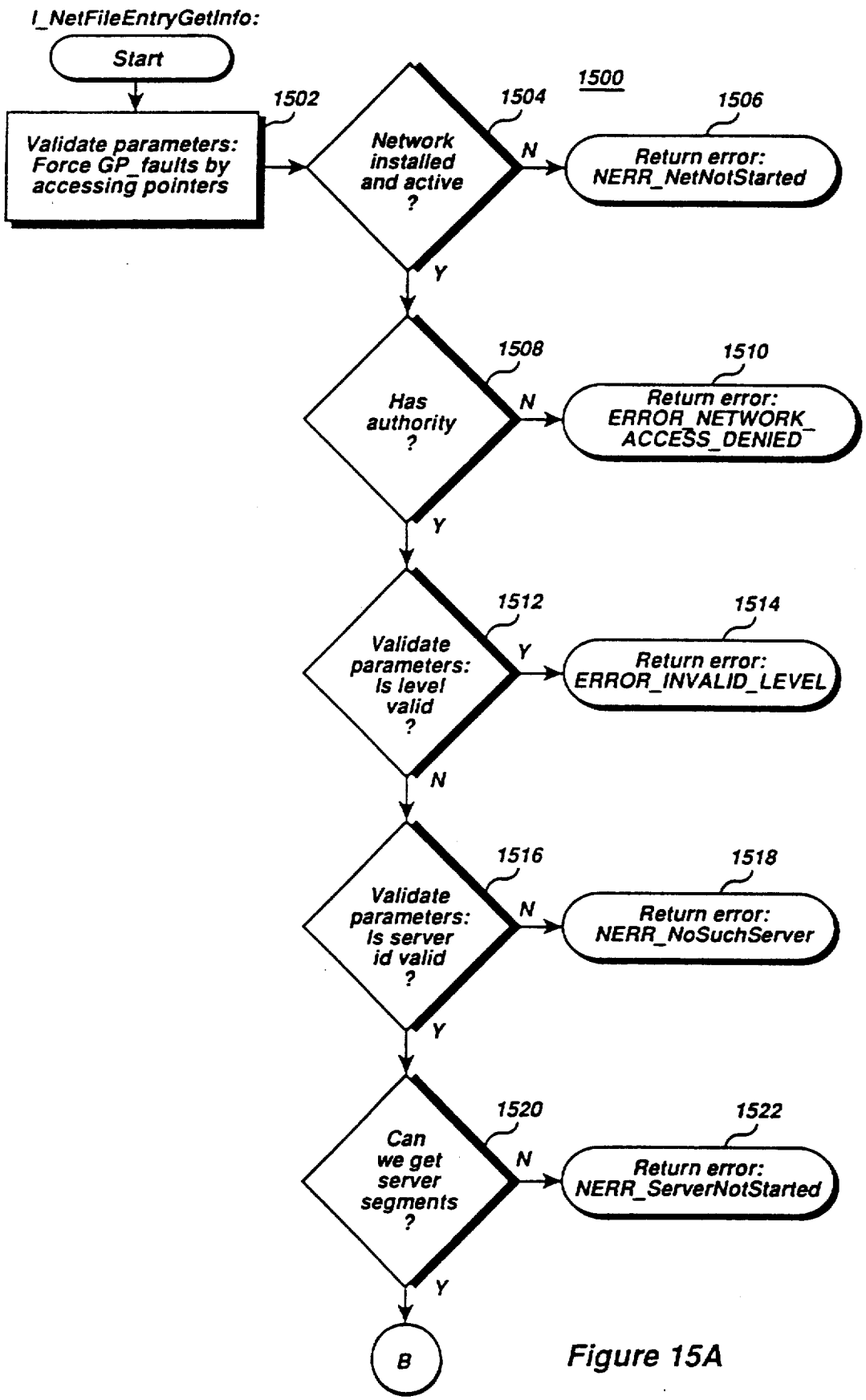
FIGS. 15A to 15B are flow diagrams of the I_NetFileEntryGetInfo API of the present invention.
Figure 15B:
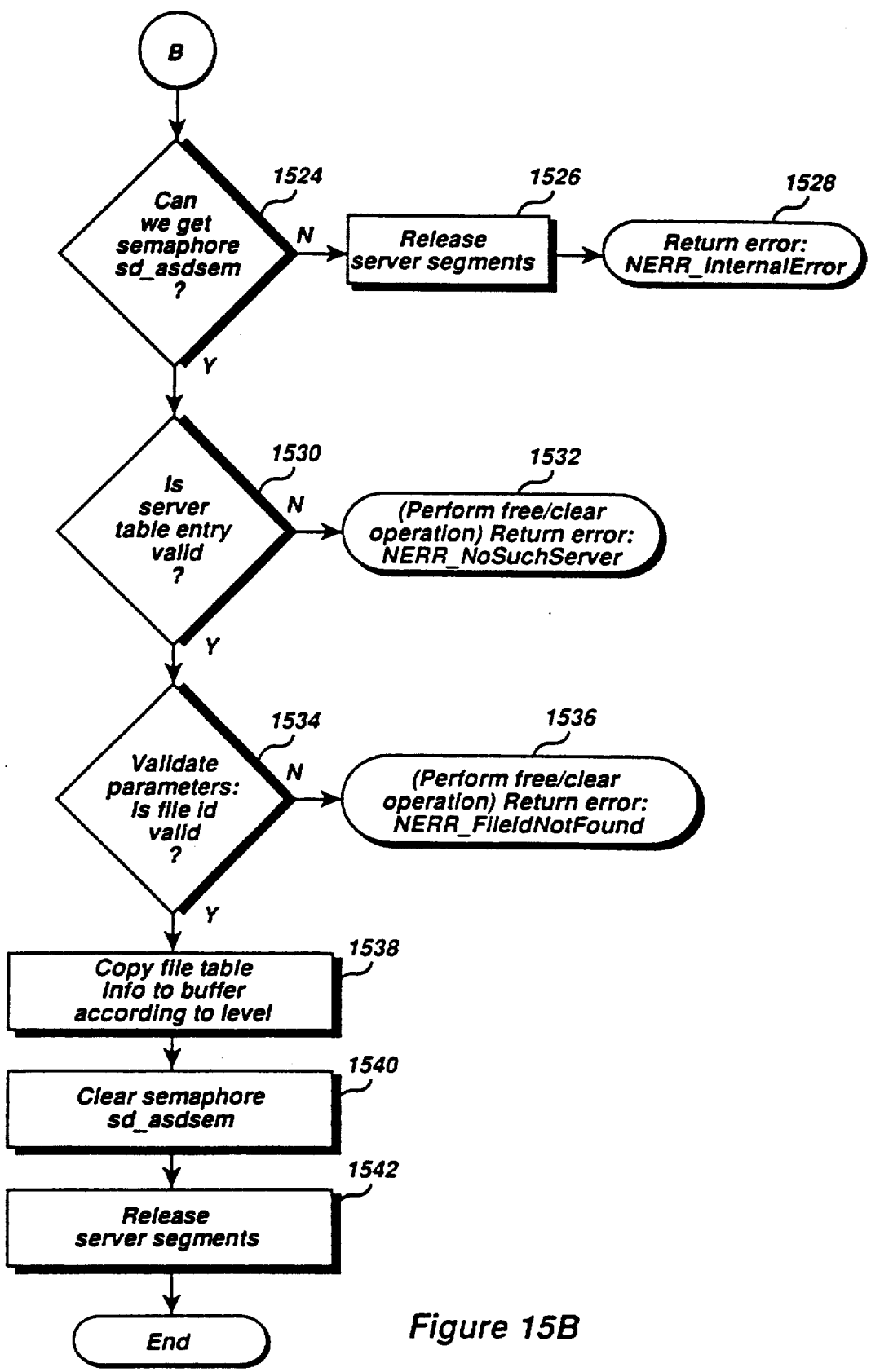

Referring now to FIGS. 15A and 15B, the I_NetFileEntryGetInfo API 1500 is used to retrieve file table information from the central servers file table to determine the status of a file on the central server. The data structures used by this API are set forth below:

```
I_NetFileEntryGetInfo (admin, Server)
    This API returns the stored information about the specified file_id.
        #include <netcons.h>
        #include <shares.h>
        unsigned far pascal
        I_NetFileEntryGetinfo (server_id, file_id, level, buf, buflen, totalavail)
        unsigned short       server_id;
        unsigned long        file_id;
        short                level;
        char far*            buf;
        unsigned short       buflen;
        unsigned short far*  totalavail;
        where:
            server_id is an integer that specifies the server that is requesting to get
            the information about the entry in the table.
            file_id specifies the file whose information is requested.
            level is the level of detail of the structure being sought.
            buf is a pointer where the returned information is to be stored.
            buflen is an integer that specifies the length of the buffer.
            totalavail points to an unsigned short integer telling how many bytes of
            information is available.
        Return Codes
```

| | |
|---|---|
| NERR_Success | No errors encountered |
| ERROR_INVALID_PARAMETER | Invalid parameter specified |
| ERROR_INVALID_LEVEL | Invalid level parameter |
| ERROR_MORE_DATA | More data available, buffer too small |
| NERR_NetNotStarted | Device driver not installed |
| NERR_ServerNotStarted | Server service not installed |
| NERR_BufTooSmall | Buf too small for fixed-length data |
| NERR_FileIdNotFound | Entry id is invalid |
| NERR_NoSuchServer | No entry for such server |

When invoked, the process 1500 begins with item 1502, which performs error checking on the parameters passed to the central server, to determine whether the parameters reference is a legal location within memory. Decision 1504 then determines whether the network is installed and active. If not, a NERR_NetNotStarted error code is returned to the caller in termination block 1506. If decision 1504 determines the network is installed and active, control passes to decision 1508, which determines whether the caller has authority to invoke the API 1500. If not, a ERROR_NETWORK_ACCESS_DENIED error code is returned to the caller in termination block 1510. If decision 1508 determines the caller has authority to proceed in the API 1500, control passes to decision 1512, which determines whether the data structure level of detail is zero. If not, error ERROR_INVALID_LEVEL is returned by termination block 1514. Decision 1516 determines whether the parameter server_id (server identification code) is valid. If not, termination block 1518 returns NERR_NoSuchServer. Decision 1520 determines whether the caller can access the central server memory. If not, error NERR_ServerNotStarted is returned by termination block 1522. Decision 1524 determines whether the data structure that contains the entries for the foreign servers can be protected so that multiple access to the data structure is prohibited. If not, e.g., if the protection mechanism fails, item 1526 reverses the accessing of the server segments through an internal API call, and NERR_InternalError is returned by termination bock 1528. Decision 1530 determines whether the server table entry is valid. If not, termination block 1532 performs a clear/free operation and returns error NERR_NoSuchServer. Decision 1534 determines whether the file identification number is valid. If not, termination block 1536 performs a clear/free operation and returns error NERR_FileIdNotFound. Item 1538 is invoked to release a semaphore to relinquish control of the data structure. Item 1540 copies the file information stored in the file table maintained by the central server to buffer buf, according to the specified level (level). Item 1542 is invoked to release server segments by calling an internal API.

Figure 16:
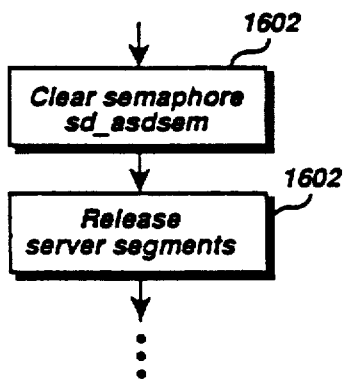
FIG. 16 is a flow diagram of the clear/save function called by various APIs of the present invention.

FIG. 16 is a flow diagram of the clear/save operation performed by various APIs of the present invention. This operation is performed to reverse any actions of an API which fails during any point in its execution. Item 1602 is invoked to release a semaphore sd_asdsem to relinquish control of the foreign server data structure 1600. Item 1604 is invoked to release server segments by calling an internal API.

Figure 17:
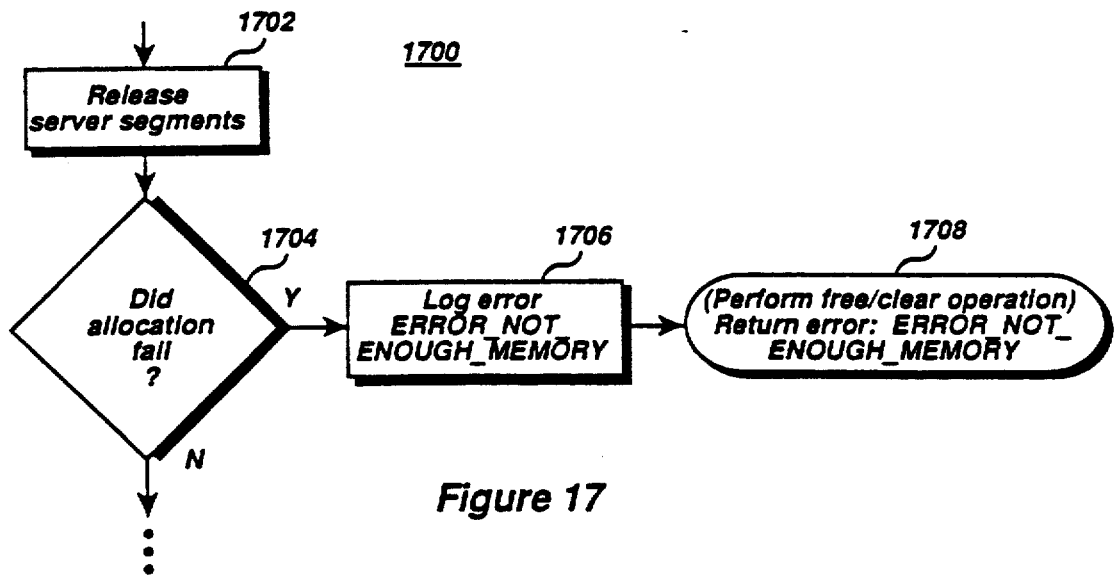
FIG. 17 is a flow diagram of the allocate function called by various APIs of the present invention.

FIG. 17 is a flow diagram of the allocate operation performed by various APIs of the present invention. When invoked, item 1702 allocates a new data structure, such as a table entry. Decision 1704 determines whether the allocation attempt of item 1702 failed. If decision 1704 fails, i.e., the allocation attempt of item 1702 fails, item 1706 logs the error ERROR_NOT_ENOUGH_MEMORY for the user. Item 1708 then performs the clear/free operation 1600 and returns error ERROR_NOT_ENOUGH_MEMORY. If decision 1704 succeeds, i.e., the allocation attempt of item 1702 succeeds, control flow then passes to the relevant point in the API which calls process 1700.

In summary, an improved method and means for networking computers having varying file architectures has been described. In accordance with the principles of the present invention, a file server network comprises a central file server and one or more foreign servers. Each of the respective central and foreign file servers is provided with its own file system. The file system of the central server is available to and directly accessed by the foreign servers without any interaction from the central file server. The present invention further includes a method and means for advising the central file server of activities of the foreign servers wherein the central file server may be used for both system administration and system monitoring functions. Accordingly, other uses and modifications of the present invention will be apparent to persons of ordinary skill in the art and all of such uses and modifications are anticipated by the appended claims.

I claim:

1. An improved, distributed network comprising:
   (a) a central server having a central server file system, said central server including means for communicating with central server clients in accordance with a central server network protocol, means for converting central server network file service requests in said central server network protocol, communicated form said central server clients, into central server file system commands, and means for sending said central server file system commands to said central server file system; and
   (b) a foreign server, said foreign server including means for communicating with foreign server clients in accordance with a foreign server network protocol, means for converting foreign server network file service requests in said foreign server network protocol, communicated from said foreign server clients, into central server file system commands, and means for sending said central server file system commands directly to said central server file system without routing the commands through the central server.

2. The distributed network of claim 1, further comprising means for informing said central server of central file system commands sent by said foreign file server to said central server file system, thereby operatively connecting said central server to said foreign server.

3. The distributed network of claim 2 wherein the central server further comprises a foreign server data structure containing status information from the informing means regarding central server file system commands.

4. The distributed network of claim 3 wherein the foreign server data structure includes connection information describing a connection between the foreign server and the central server file system.

5. The distributed network of claim 3 wherein the foreign server data structure includes file information describing central server files opened by foreign servers.

6. The distributed network of claim 3 wherein the foreign server data structure includes client information describing a client type.

7. The distributed network of claim 3 wherein the foreign server data structure includes session information describing periods during which foreign servers communicate with the central server file system.

8. The distributed network of claim 1 wherein the foreign server includes a mapping means for directly converting foreign server network file service requests in said foreign server protocol, communicated from foreign server clients, into central server file system commands.

9. A method for accessing files in a central server file system of a network, the network including a central server, central server clients, a foreign server, and foreign server clients, the method comprising the steps of:
   communicating central server network file service requests in a central server network protocol from central server clients to the central server;

converting the central server network file service requests to central server file system commands;

sending the converted central server file system commands to the central server file system;

transferring foreign server network file service requests in a foreign server protocol to the foreign server;

translating the foreign server network file service requests into central server file system commands; and forwarding the translated central server file system commands to the central server file system by the foreign server without routing the commands through the central server.

10. The method of claim 9 for accessing files in a central server file system, further comprising the step of informing the central server of central server file system commands forwarded by the foreign server to the central server file system.

11. The method of claim 9 wherein the step of translating further includes mapping foreign server network file service requests directly into central server file system commands.

12. The method of claim 9, further comprising the step of storing status information regarding central server file system commands in one of a foreign server table and a foreign server data structure in the central server.

13. The method of claim 9, further comprising the step of storing connection information describing a connection between the foreign server and the central server file system in one of a foreign server table and a foreign server data structure in the central server.

14. The method of claim 9, further comprising the step of storing file information describing central server files opened by foreign servers in one of a foreign server table and a foreign server data structure in the central server.

15. The method of claim 9, further comprising the step of storing client information describing a client type in one of a foreign server table and a foreign server data structure in the central server.

16. A method for accessing files in a central server file system of a network, the network including a central server, central server clients, a foreign server, and foreign server clients, the central server for receiving central server network file service requests in a central server network protocol from central server clients, for converting the central server network file service requests to central server file system commands, and for sending the converted central server file system commands to the central server file system, the method comprising the steps of:

transferring foreign server network file service requests in a foreign server protocol to the foreign server;

translating the foreign server network file service requests into central server file system commands; and forwarding the translated central server file system commands to the central server file system by the foreign server without routing the commands through the central server.

* * * * *

UNITED STATES PATENT AND TRADEMARK OFFICE
CERTIFICATE OF CORRECTION

PATENT NO. : 5,218,697

DATED : June 8, 1993

INVENTOR(S) : William H. Chung

It is certified that error appears in the above-identified patent and that said Letters Patent is hereby corrected as shown below:

In column 42, claim 1, line 14, please delete "form" and substitute therefor --from--.

Signed and Sealed this

Sixteenth Day of August, 1994

Attest:

BRUCE LEHMAN

Attesting Officer

Commissioner of Patents and Trademarks